US012125984B2

(12) United States Patent
Zagars et al.

(10) Patent No.: US 12,125,984 B2
(45) Date of Patent: Oct. 22, 2024

(54) METHODS OF CONTINUOUS AND SEMI-CONTINUOUS PRODUCTION OF ELECTROCHEMICAL CELLS

(71) Applicant: 24M Technologies, Inc., Cambridge, MA (US)

(72) Inventors: Raymond Zagars, Quincy, MA (US); Matthew R. Tyler, New York, NY (US); Neil Axelsen, Cambridge, MA (US); Nathan Costa, Brighton, MA (US); Madeleine Finkenaur, Cambridge, MA (US); Gregory Mehos, Westford, MA (US); Hasan Siddiqui, Boston, MA (US); Glenn Jordan, Harvard, MA (US)

(73) Assignee: 24M Technologies, Inc., Cambridge, MA (US)

( * ) Notice: Subject to any disclaimer, the term of this patent is extended or adjusted under 35 U.S.C. 154(b) by 0 days.

(21) Appl. No.: 17/498,996

(22) Filed: Oct. 12, 2021

(65) Prior Publication Data

US 2022/0115710 A1    Apr. 14, 2022

Related U.S. Application Data

(60) Provisional application No. 63/115,293, filed on Nov. 18, 2020, provisional application No. 63/089,957, filed on Oct. 9, 2020.

(51) Int. Cl.
*H01M 10/0585* (2010.01)
*H01M 4/04* (2006.01)
(Continued)

(52) U.S. Cl.
CPC ....... *H01M 10/0585* (2013.01); *H01M 4/043* (2013.01); *H01M 4/139* (2013.01); *H01M 50/105* (2021.01); *H01M 50/406* (2021.01)

(58) Field of Classification Search
CPC .. H01M 50/105; H01M 50/406; H01M 4/043; H01M 4/139; H01M 50/0585; H01M 4/04; H01M 4/0404; H01M 4/0435
See application file for complete search history.

(56) References Cited

U.S. PATENT DOCUMENTS

| 5,044,307 A | 9/1991 | Takahashi et al. |
| 5,582,623 A | 12/1996 | Chu |

(Continued)

FOREIGN PATENT DOCUMENTS

| CN | 1274955 A | 11/2000 |
| CN | 104704653 A | 6/2015 |

(Continued)

OTHER PUBLICATIONS

First Examination Report for Indian Application No. 202117001891, mailed Dec. 9, 2022, 6 pages.

(Continued)

*Primary Examiner* — Cynthia H Kelly
*Assistant Examiner* — Niara Trant
(74) *Attorney, Agent, or Firm* — Cooley LLP

(57) ABSTRACT

Embodiments described herein relate generally to systems and methods for continuously and/or semi-continuously manufacturing electrochemical cells with semi-solid electrodes. In some embodiments, a method can include mixing an active material, a conductive material, and an electrolyte to form a semi-solid electrode material. The method further includes drawing a vacuum on the semi-solid electrode material, compressing the semi-solid electrode material to form an electrode brick, and dispensing a portion of the electrode brick onto a current collector via a dispensation device to form an electrode. In some embodiments, the current collector is disposed on a pouch material. In some embodiments, the dispensation device includes a top blade (Continued)

for top edge control and two side plates for side edge control. In some embodiments, the method can further include conveying the electrode through the top blade and the two side plates to shape the electrode.

17 Claims, 24 Drawing Sheets

(51) Int. Cl.
*H01M 4/139* (2010.01)
*H01M 50/105* (2021.01)
*H01M 50/406* (2021.01)

(56) References Cited

U.S. PATENT DOCUMENTS

| | | | |
|---|---|---|---|
| 6,379,403 B1 | 4/2002 | Fukumura et al. |
| 6,423,446 B1 | 7/2002 | Miyazaki et al. |
| 6,444,357 B1 | 9/2002 | Kambe et al. |
| 8,722,226 B2 | 5/2014 | Chiang et al. |
| 8,722,227 B2 | 5/2014 | Chiang et al. |
| 8,778,552 B2 | 7/2014 | Chiang et al. |
| 8,993,159 B2 | 3/2015 | Chiang et al. |
| 9,153,833 B2 | 10/2015 | Chiang et al. |
| 9,178,200 B2 | 11/2015 | Bazzarella et al. |
| 9,184,464 B2 | 11/2015 | Chiang et al. |
| 9,203,092 B2 | 12/2015 | Slocum et al. |
| 9,293,781 B2 | 3/2016 | Chiang et al. |
| 9,362,583 B2 | 6/2016 | Chiang et al. |
| 9,385,392 B2 | 7/2016 | Chiang et al. |
| 9,401,501 B2 | 7/2016 | Bazzarella et al. |
| 9,437,864 B2 | 9/2016 | Tan et al. |
| 9,484,569 B2 | 11/2016 | Doherty et al. |
| 9,583,780 B2 | 2/2017 | Chiang et al. |
| 9,614,231 B2 | 4/2017 | Carter et al. |
| 9,694,445 B2 * | 7/2017 | Chen ............... B23K 37/00 |
| 9,786,944 B2 | 10/2017 | Chiang et al. |
| 9,812,674 B2 | 11/2017 | Bazzarella et al. |
| 9,825,280 B2 | 11/2017 | Chiang et al. |
| 9,831,518 B2 | 11/2017 | Chiang et al. |
| 9,831,519 B2 | 11/2017 | Chiang et al. |
| 9,831,522 B2 | 11/2017 | Tan et al. |
| 10,038,193 B1 | 7/2018 | Schroder et al. |
| 10,115,970 B2 | 10/2018 | Ota et al. |
| 10,122,044 B2 | 11/2018 | Tan et al. |
| 10,153,651 B2 | 12/2018 | Taylor et al. |
| 10,181,587 B2 | 1/2019 | Ota et al. |
| 10,230,128 B2 | 3/2019 | Chiang et al. |
| 10,236,518 B2 | 3/2019 | Chiang et al. |
| 10,411,310 B2 | 9/2019 | Chiang et al. |
| 10,483,582 B2 | 11/2019 | Chiang et al. |
| 10,497,935 B2 | 12/2019 | Ota et al. |
| 10,522,870 B2 | 12/2019 | Tan et al. |
| 10,566,581 B2 | 2/2020 | Bazzarella et al. |
| 10,566,603 B2 | 2/2020 | Slocum et al. |
| 10,593,952 B2 | 3/2020 | Ota et al. |
| 10,601,239 B2 | 3/2020 | Taylor et al. |
| 10,637,038 B2 | 4/2020 | Zagars et al. |
| 10,734,672 B2 | 8/2020 | Chen et al. |
| 10,777,852 B2 | 9/2020 | Woodford et al. |
| 10,854,869 B2 | 12/2020 | Bazzarella et al. |
| 10,886,521 B2 | 1/2021 | Zagars et al. |
| 10,910,858 B2 | 2/2021 | Taylor et al. |
| 10,957,940 B2 | 3/2021 | Tan et al. |
| 10,964,973 B2 | 3/2021 | Tan et al. |
| 11,005,087 B2 | 5/2021 | Ota et al. |
| 11,018,365 B2 | 5/2021 | Chiang et al. |
| 11,024,903 B2 | 6/2021 | Ota et al. |
| 11,094,487 B2 | 8/2021 | Lawrence et al. |
| 11,094,976 B2 | 8/2021 | Chiang et al. |
| 11,121,437 B2 | 9/2021 | Bazzarella et al. |
| 11,139,467 B2 | 10/2021 | Zagars et al. |
| 11,145,909 B2 | 10/2021 | Chiang et al. |
| 11,309,531 B2 | 4/2022 | Slocum et al. |
| 11,342,567 B2 | 5/2022 | Chiang et al. |
| 11,394,049 B2 | 7/2022 | Tan et al. |
| 11,462,722 B2 | 10/2022 | Aranami et al. |
| 11,469,065 B2 | 10/2022 | Lawrence et al. |
| 11,476,551 B2 | 10/2022 | Tyler et al. |
| 11,552,368 B2 | 1/2023 | Holman et al. |
| 11,575,146 B2 | 2/2023 | Taylor et al. |
| 11,594,793 B2 | 2/2023 | Bazzarella et al. |
| 11,611,061 B2 | 3/2023 | Zagars et al. |
| 11,631,920 B2 | 4/2023 | Bazzarella et al. |
| 11,646,437 B2 | 5/2023 | Bazzarella et al. |
| 11,652,203 B2 | 5/2023 | Zagars et al. |
| 11,742,525 B2 | 8/2023 | Aranami et al. |
| 11,749,804 B2 | 9/2023 | Chen et al. |
| 11,757,129 B2 | 9/2023 | Tan et al. |
| 11,764,353 B2 | 9/2023 | Ota et al. |
| 11,804,595 B2 | 10/2023 | Ota et al. |
| 11,811,119 B2 | 11/2023 | Chiang et al. |
| 11,831,026 B2 | 11/2023 | Ota et al. |
| 11,855,250 B2 | 12/2023 | Taylor et al. |
| 2008/0050653 A1 | 2/2008 | Berkowitz |
| 2010/0047671 A1 | 2/2010 | Chiang et al. |
| 2010/0323264 A1 | 12/2010 | Chiang et al. |
| 2011/0189520 A1 | 8/2011 | Carter et al. |
| 2011/0200848 A1 | 8/2011 | Chiang et al. |
| 2011/0274948 A1 | 11/2011 | Duduta et al. |
| 2012/0164499 A1 | 6/2012 | Chiang et al. |
| 2013/0055559 A1 | 3/2013 | Slocum et al. |
| 2013/0065122 A1 | 3/2013 | Chiang et al. |
| 2013/0309547 A1 | 11/2013 | Bazzarella et al. |
| 2013/0337319 A1 | 12/2013 | Doherty et al. |
| 2013/0344367 A1 | 12/2013 | Chiang et al. |
| 2014/0004437 A1 | 1/2014 | Slocum et al. |
| 2014/0030623 A1 | 1/2014 | Chiang et al. |
| 2014/0039710 A1 | 2/2014 | Carter et al. |
| 2014/0099538 A1 | 4/2014 | Johnson |
| 2014/0154546 A1 | 6/2014 | Carter et al. |
| 2014/0170524 A1 | 6/2014 | Chiang et al. |
| 2014/0248521 A1 | 9/2014 | Chiang et al. |
| 2014/0315097 A1 | 10/2014 | Tan et al. |
| 2015/0024279 A1 | 1/2015 | Tan et al. |
| 2015/0129081 A1 | 5/2015 | Chiang et al. |
| 2015/0140371 A1 | 5/2015 | Slocum et al. |
| 2015/0171406 A1 | 6/2015 | Bazzarella et al. |
| 2015/0249258 A1 | 9/2015 | Wolf |
| 2015/0280267 A1 | 10/2015 | Chiang et al. |
| 2015/0295272 A1 | 10/2015 | Chiang et al. |
| 2015/0340702 A1 | 11/2015 | Sanada |
| 2015/0357626 A1 | 12/2015 | Holman et al. |
| 2016/0013507 A1 | 1/2016 | Chiang et al. |
| 2016/0056490 A1 | 2/2016 | Chiang et al. |
| 2016/0056491 A1 | 2/2016 | Chiang et al. |
| 2016/0105042 A1 | 4/2016 | Taylor et al. |
| 2016/0126543 A1 | 5/2016 | Ota et al. |
| 2016/0133916 A1 | 5/2016 | Zagars et al. |
| 2016/0190544 A1 | 6/2016 | Slocum et al. |
| 2016/0211498 A1 | 7/2016 | Kim |
| 2016/0218375 A1 | 7/2016 | Chiang et al. |
| 2016/0268621 A1 | 9/2016 | Chiang et al. |
| 2016/0308218 A1 | 10/2016 | Ota et al. |
| 2016/0344006 A1 | 11/2016 | Ota et al. |
| 2016/0372802 A1 | 12/2016 | Chiang et al. |
| 2017/0018798 A1 | 1/2017 | Tan et al. |
| 2017/0025646 A1 | 1/2017 | Ota et al. |
| 2017/0025674 A1 | 1/2017 | Tan et al. |
| 2017/0033389 A1 | 2/2017 | Chiang et al. |
| 2017/0033390 A1 | 2/2017 | Chiang et al. |
| 2017/0077464 A1 | 3/2017 | Bazzarella et al. |
| 2017/0104204 A1 | 4/2017 | Zhamu et al. |
| 2017/0149100 A1 | 5/2017 | Ishii |
| 2017/0162863 A1 | 6/2017 | Doherty et al. |
| 2017/0214034 A1 | 7/2017 | Ota et al. |
| 2017/0222254 A1 | 8/2017 | Sakamoto et al. |
| 2017/0237111 A1 | 8/2017 | Holman et al. |
| 2017/0237112 A1 | 8/2017 | Holman et al. |
| 2017/0288281 A1 | 10/2017 | Chiang et al. |
| 2018/0019493 A1 | 1/2018 | Jakus et al. |
| 2018/0034090 A1 | 2/2018 | Chiang et al. |
| 2018/0175365 A1 * | 6/2018 | Ueda ............... H01M 4/139 |

(56) References Cited

U.S. PATENT DOCUMENTS

| | | |
|---|---|---|
| 2018/0175428 A1 | 6/2018 | Chiang et al. |
| 2018/0175445 A1 | 6/2018 | Tan et al. |
| 2018/0233708 A1 | 8/2018 | Bazzarella et al. |
| 2018/0233722 A1 | 8/2018 | Holman et al. |
| 2018/0287220 A1 | 10/2018 | Woodford et al. |
| 2019/0036101 A1 | 1/2019 | Tyler et al. |
| 2019/0058184 A1 | 2/2019 | Bazzarella et al. |
| 2019/0245242 A1 | 8/2019 | Tan et al. |
| 2019/0319460 A1 | 10/2019 | Taylor et al. |
| 2019/0326562 A1 | 10/2019 | Ota et al. |
| 2019/0348705 A1 | 11/2019 | Chen et al. |
| 2019/0355998 A1 | 11/2019 | Chiang et al. |
| 2019/0363351 A1 | 11/2019 | Ota et al. |
| 2019/0393477 A1 | 12/2019 | Lawrence et al. |
| 2020/0014025 A1 | 1/2020 | Zagars et al. |
| 2020/0044296 A1 | 2/2020 | Chiang et al. |
| 2020/0106094 A1 | 4/2020 | Ota et al. |
| 2020/0161688 A1 | 5/2020 | Chaing et al. |
| 2020/0168889 A1* | 5/2020 | Tanaka ............ B29C 43/58 |
| 2020/0220118 A1 | 7/2020 | Bazzarella et al. |
| 2020/0220204 A1 | 7/2020 | Tan et al. |
| 2020/0259338 A1 | 8/2020 | Taylor et al. |
| 2020/0321597 A1 | 10/2020 | Zagars et al. |
| 2020/0321601 A1 | 10/2020 | Slocum et al. |
| 2020/0358129 A1 | 11/2020 | Chen et al. |
| 2020/0411825 A1 | 12/2020 | Bazzarella et al. |
| 2021/0091366 A1 | 3/2021 | Bazzarella et al. |
| 2021/0098814 A1 | 4/2021 | Lee |
| 2021/0098817 A1 | 4/2021 | Lee |
| 2021/0167351 A1 | 6/2021 | Zagars et al. |
| 2021/0193986 A1* | 6/2021 | Gayden ............ H01M 4/0402 |
| 2021/0226192 A1 | 7/2021 | Aranami et al. |
| 2021/0249678 A1 | 8/2021 | Chiang et al. |
| 2021/0249695 A1 | 8/2021 | Aranami et al. |
| 2021/0265631 A1 | 8/2021 | Chen et al. |
| 2021/0359527 A1 | 11/2021 | Taylor et al. |
| 2021/0376380 A1 | 12/2021 | Tan et al. |
| 2021/0384516 A1 | 12/2021 | Lawrence et al. |
| 2022/0021019 A1 | 1/2022 | Tan et al. |
| 2022/0029207 A1 | 1/2022 | Chiang et al. |
| 2022/0037749 A1 | 2/2022 | Bazzarella et al. |
| 2022/0052403 A1 | 2/2022 | Chen et al. |
| 2022/0069412 A1* | 3/2022 | Masada ............ B26D 1/24 |
| 2022/0077445 A1 | 3/2022 | Ota et al. |
| 2022/0085440 A1 | 3/2022 | Ota et al. |
| 2022/0093929 A1 | 3/2022 | Chen et al. |
| 2022/0115710 A1 | 4/2022 | Zagars et al. |
| 2022/0172916 A1 | 6/2022 | Lawrence et al. |
| 2022/0173446 A1 | 6/2022 | Chiang et al. |
| 2022/0200306 A1 | 6/2022 | Kusachi et al. |
| 2022/0231274 A1 | 7/2022 | Zagars et al. |
| 2022/0238923 A1 | 7/2022 | Chen et al. |
| 2022/0263104 A1 | 8/2022 | Chiang et al. |
| 2022/0263193 A1 | 8/2022 | Chen et al. |
| 2022/0278427 A1 | 9/2022 | Lawrence et al. |
| 2022/0285669 A1 | 9/2022 | Doherty et al. |
| 2022/0352597 A1 | 11/2022 | Chen et al. |
| 2023/0018078 A1 | 1/2023 | Slocum et al. |
| 2023/0022329 A1 | 1/2023 | Chen et al. |
| 2023/0085181 A1 | 3/2023 | Tan et al. |
| 2023/0090853 A1 | 3/2023 | Tyler et al. |
| 2023/0118961 A1 | 4/2023 | Chen et al. |
| 2023/0133464 A1 | 5/2023 | Ota et al. |
| 2023/0170169 A1 | 6/2023 | Lawrence et al. |
| 2023/0178707 A1 | 6/2023 | Aranami et al. |
| 2023/0238562 A1 | 7/2023 | Kusachi et al. |
| 2023/0282906 A1 | 9/2023 | Chen et al. |
| 2023/0291063 A1 | 9/2023 | Holman et al. |
| 2023/0307803 A1 | 9/2023 | Bazzarella et al. |
| 2023/0327068 A1 | 10/2023 | Tyler et al. |
| 2023/0327077 A1 | 10/2023 | Zagars et al. |
| 2023/0327178 A1 | 10/2023 | Taylor et al. |
| 2023/0335748 A1 | 10/2023 | Chen et al. |
| 2023/0352755 A1 | 11/2023 | Aragon et al. |
| 2023/0369603 A1 | 11/2023 | Ota et al. |
| 2023/0369719 A1 | 11/2023 | Bazzarella et al. |
| 2023/0378512 A1 | 11/2023 | Bazzarella et al. |
| 2023/0395771 A1 | 12/2023 | Zagars et al. |

FOREIGN PATENT DOCUMENTS

| | | |
|---|---|---|
| CN | 104953090 A | 9/2015 |
| CN | 105531855 A | 4/2016 |
| CN | 107112444 A | 8/2017 |
| EP | 3168914 A1 | 5/2017 |
| JP | H09274908 A | 10/1997 |
| JP | H10144303 A | 5/1998 |
| JP | 2002313328 A | 10/2002 |
| JP | 2005190787 A | 7/2005 |
| JP | 2010277798 A | 12/2010 |
| JP | 2015-187943 A | 10/2015 |
| JP | 2017533548 A | 11/2017 |
| JP | 2017228429 A | 12/2017 |
| KR | 20090103838 A | 10/2009 |
| WO | WO-2015145806 A1 | 10/2015 |
| WO | WO-2017045846 A2 | 3/2017 |
| WO | WO-2020014268 A1 | 1/2020 |
| WO | WO-2020203114 A1 | 10/2020 |
| WO | WO-2020203118 A1 | 10/2020 |
| WO | WO 2021/087465 A1 | 5/2021 |
| WO | WO-2021262996 A1 | 12/2021 |
| WO | WO2022076946 A1 | 4/2022 |
| WO | WO-2023201253 A1 | 10/2023 |

OTHER PUBLICATIONS

International Preliminary Report on Patentability for International Application No. PCT/US2021/054509 dated Apr. 20, 2023, 13 pages.

Notice of Allowance for U.S. Appl. No. 17/410,696, dated Jan. 5, 2023, 9 pages.

Search Report and Written Opinion for Brazilian Application No. BR112020024196-2, mailed Nov. 29, 2022, 7 pages.

Invitation to Pay Additional Fees for International Application No. PCT/US2021/054509, mailed Jan. 5, 2022, 6 pages.

International Search Report and Written Opinion for International Application No. PCT/US2021/054509, mailed Feb. 28, 2022, 18 pages.

Office Action for U.S. Appl. No. 16/506,414, mailed Dec. 7, 2020, 13 pages.

International Search Report and Written Opinion for International Application No. PCT/US2019/041061, mailed Nov. 26, 2019, 13 pages.

International Search Report and Written Opinion for International Application No. PCT/US2023/065664, mailed Jul. 12, 2023, 12 pages.

Office Action and search report for Chinese Application No. CN20198039898 mailed Jul. 18, 2023, 17 pages.

* cited by examiner

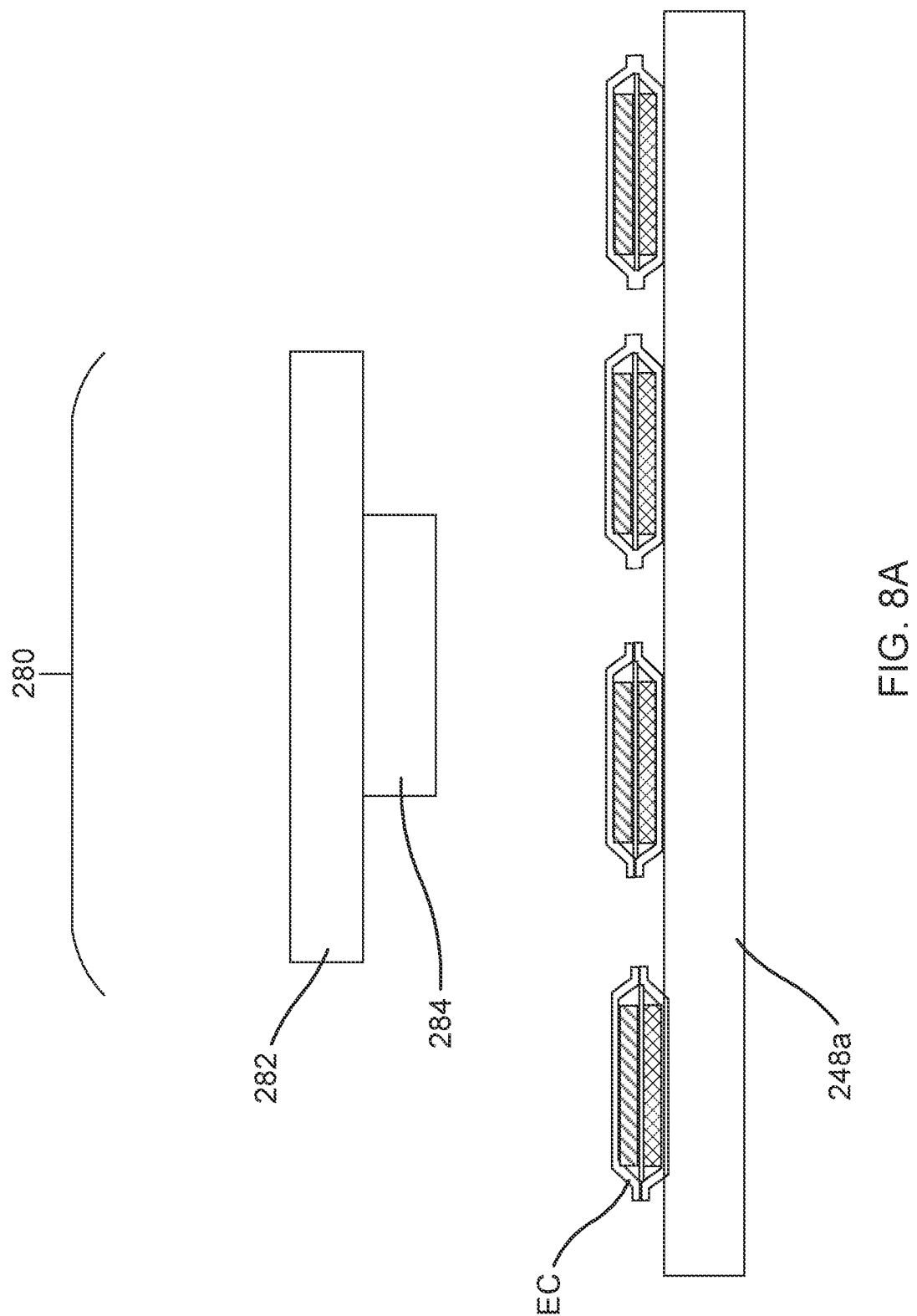

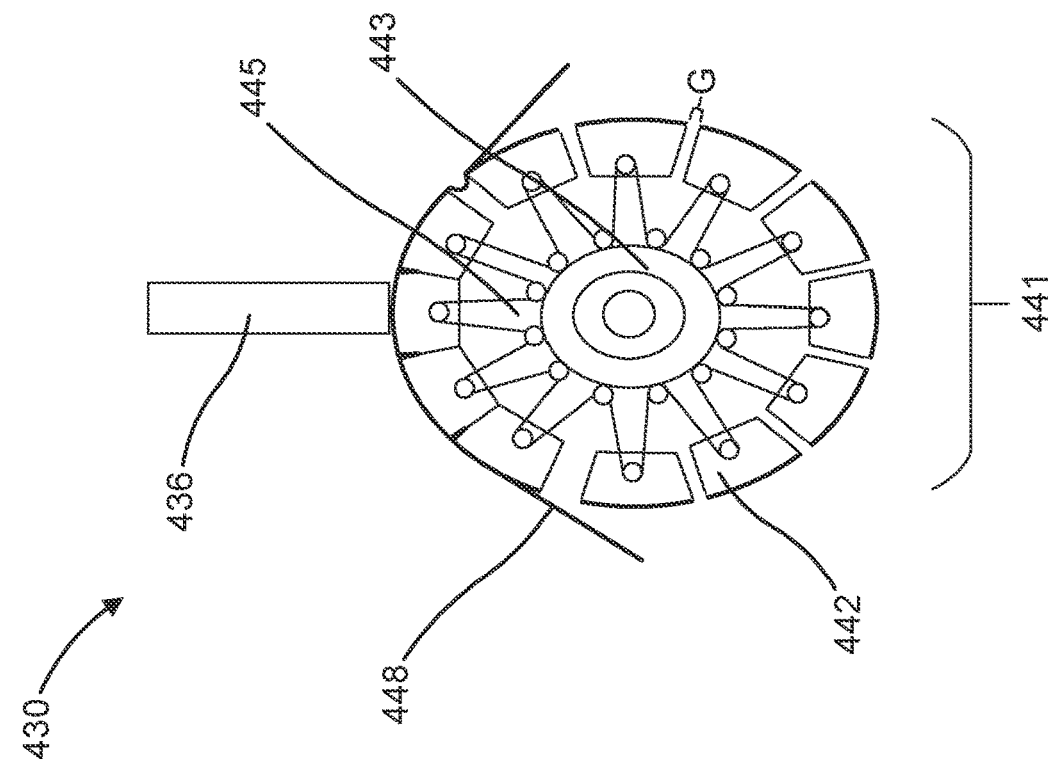
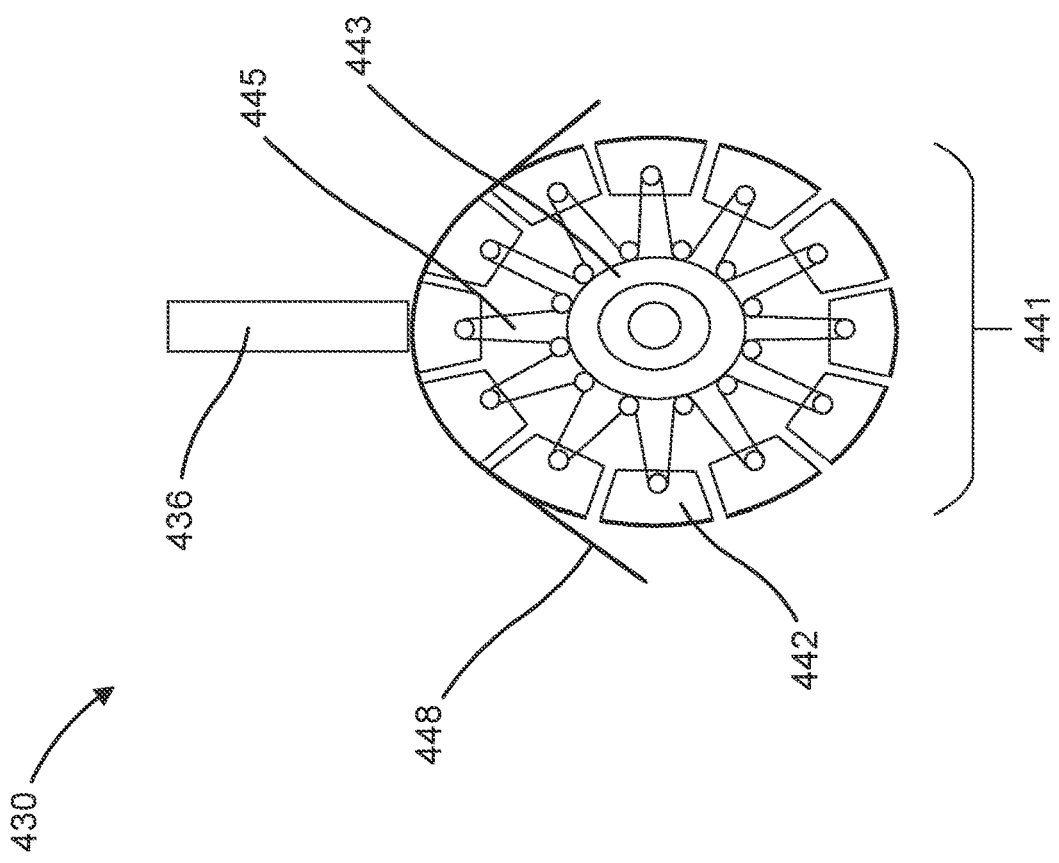
FIG. 12A
FIG. 12B

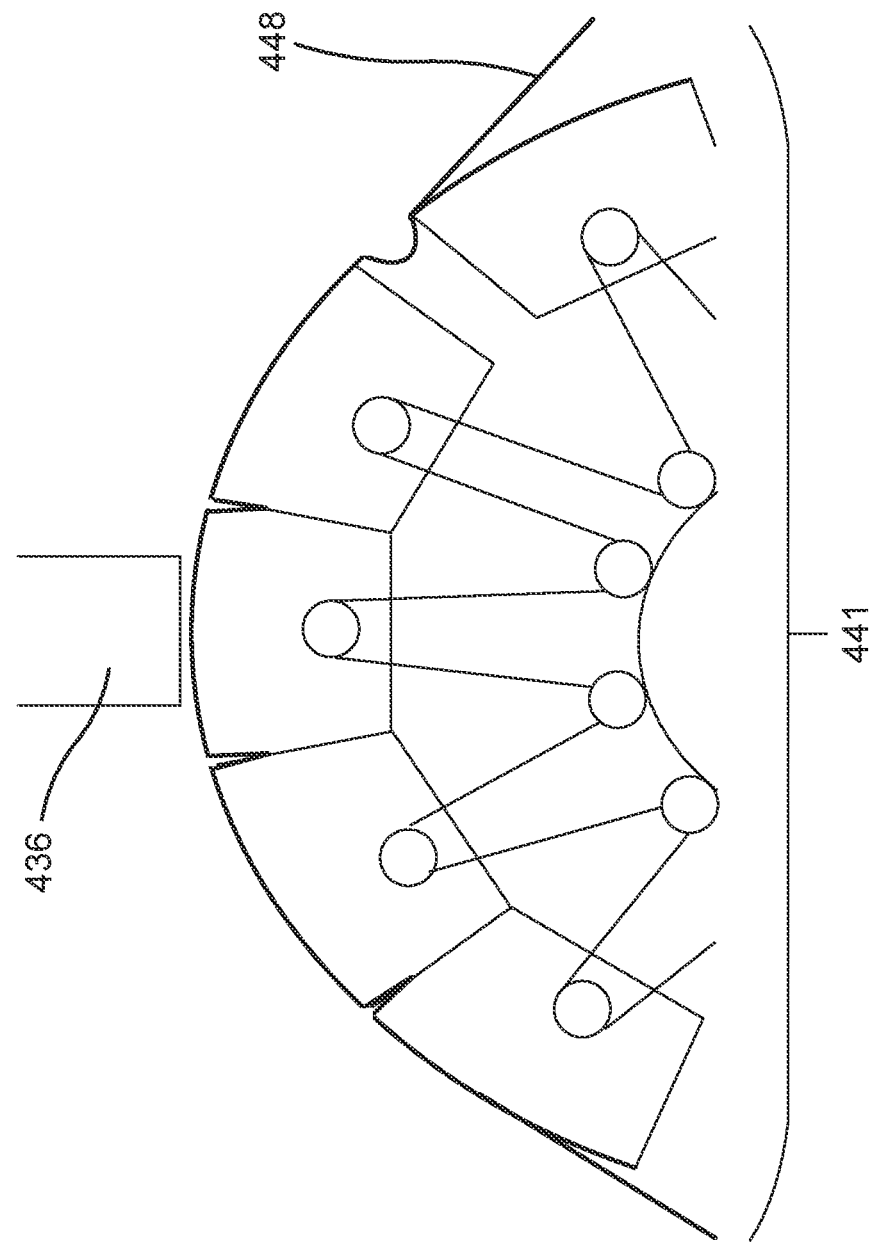

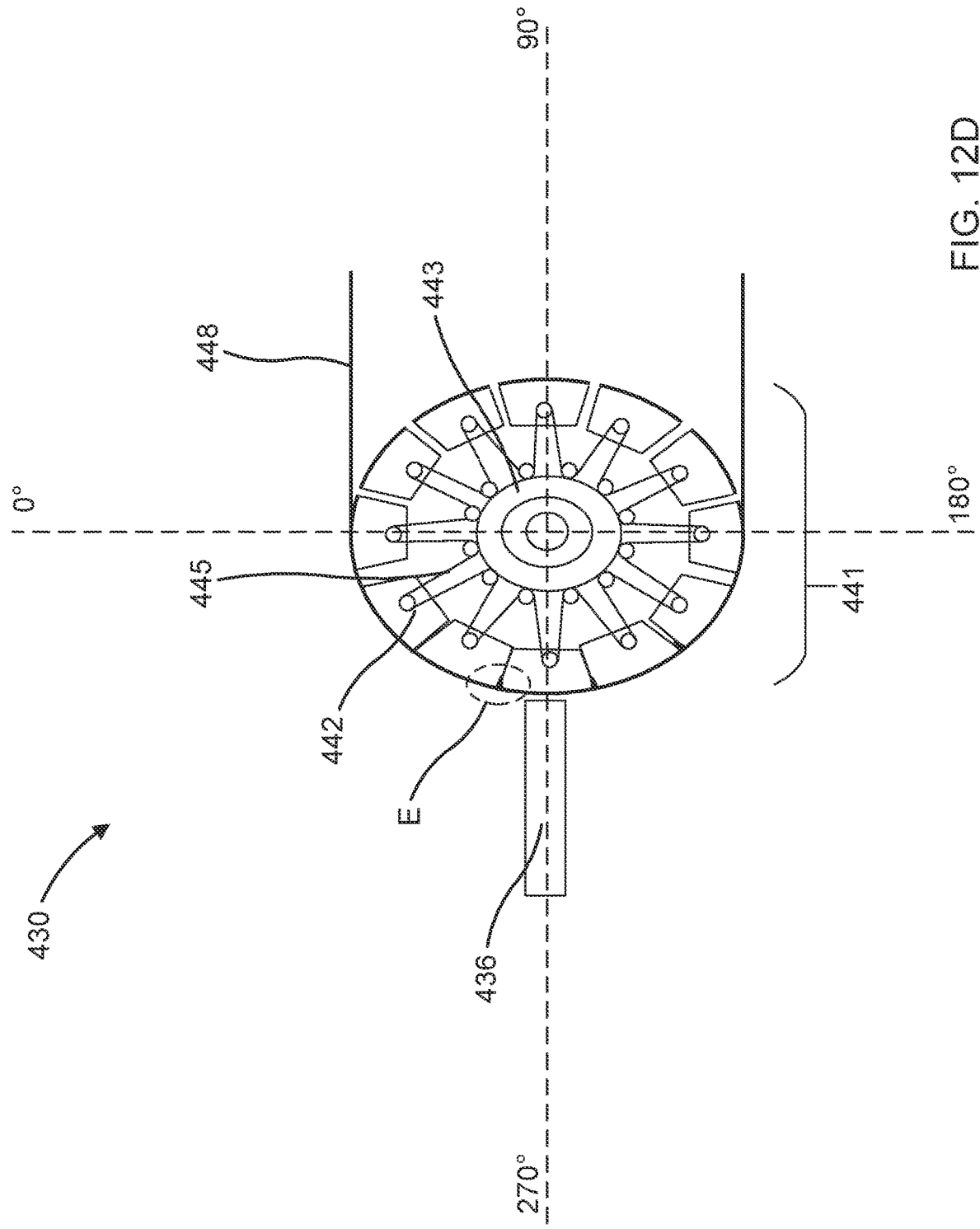

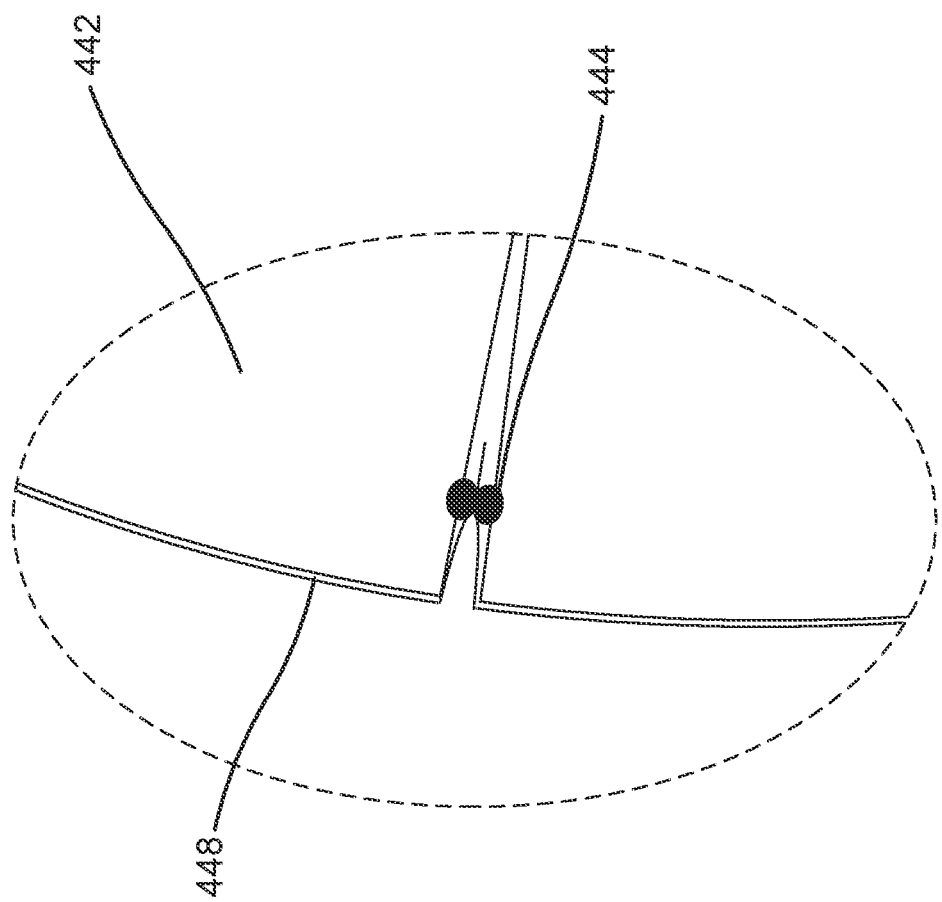

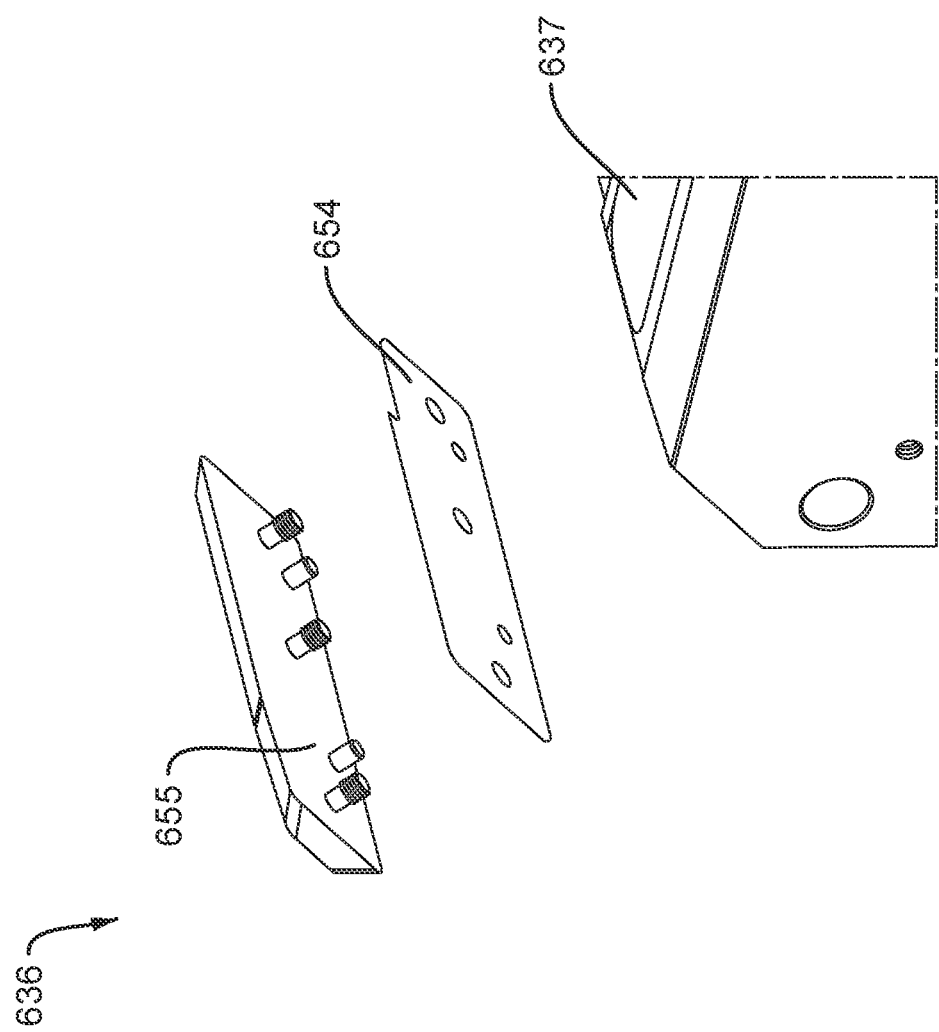

METHODS OF CONTINUOUS AND SEMI-CONTINUOUS PRODUCTION OF ELECTROCHEMICAL CELLS

CROSS-REFERENCE TO RELATED APPLICATIONS

This application claims priority and benefit of U.S. Provisional Application No. 63/089,957, filed Oct. 9, 2020 and entitled "Methods of Continuous and Semi-Continuous Production of Electrochemical Cells" and U.S. Provisional Application No. 63/115,293, filed Nov. 18, 2020 and entitled "Methods of Continuous and Semi-Continuous Production of Electrochemical Cells," the disclosures of which are hereby incorporated by reference in their entireties.

BACKGROUND

Embodiments described herein relate generally to systems and methods for continuously and/or semi-continuously manufacturing electrochemical cells with semi-solid electrodes. Battery manufacturing methods typically include coating a conductive substrate (i.e., a current collector) with a slurry that includes an active material, a conductive additive, and a binding agent dissolved or dispersed in a solvent. After the slurry is coated onto the metallic substrate, the slurry is dried (e.g., by evaporating the solvent) and calendered to a specified thickness. The manufacture of battery electrodes can also commonly include material mixing, casting, calendering, drying, slitting, and working (bending, rolling, etc.) according to the battery architecture being built. Because the electrode is manipulated during assembly, and to ensure conductive networks are in place, all components are compressed into a cohesive assembly, for example, by use of the binding agent. However, binding agents themselves occupy space, can add processing complexity, and can impede ionic and electronic conductivity. Production of semi-solid electrodes with little or no binder can address some of these issues. However, several issues can arise during the production of semi-solid electrodes First, edge control of semi-solid electrodes can be difficult. Stencils and masks often shape the edges of semi-solid electrodes. Stencils and masks are often inefficient and can lead to less defined edges (i.e., crumbling of edges). Loss of electrolyte and/or electrolyte solvent via evaporation can occur during processing, leading to inefficient battery performance. Small batch processes of electrode production can lead to various concentration gradients in the electrodes or lack of homogeneity. Additionally, cutting of current collectors via mechanical means can also lead to inefficiencies, as worn tooling has to be replaced frequently.

SUMMARY

Embodiments described herein relate generally to systems and methods for continuously and/or semi-continuously manufacturing electrochemical cells with semi-solid electrodes. In some embodiments, a method can include mixing an active material, a conductive material, and an electrolyte to form a semi-solid electrode material. The method further includes drawing a vacuum on the semi-solid electrode material, compressing the semi-solid electrode material to form an electrode brick, and dispensing a portion of the electrode brick onto a current collector via a dispensation device to form an electrode. In some embodiments, the current collector is disposed on a pouch material. In some embodiments, the dispensation device includes a top blade for thickness control and two side plates for side edge control. In some embodiments, the method can further include conveying the electrode through the top blade and the two side plates to shape the electrode. In some embodiments, the dispensation device can apply a downward force onto the pouch, such that the two side plates form a seal with the pouch.

BRIEF DESCRIPTION OF THE DRAWINGS

FIGS. 8A-8B are illustrations of a sealing device, according to an embodiment.

FIGS. 12A-12E are illustrations of an extrusion system, according to an embodiment.

FIGS. 14A-14C show a cartridge, and various components thereof, according to an embodiment.

DETAILED DESCRIPTION

Figure 1:
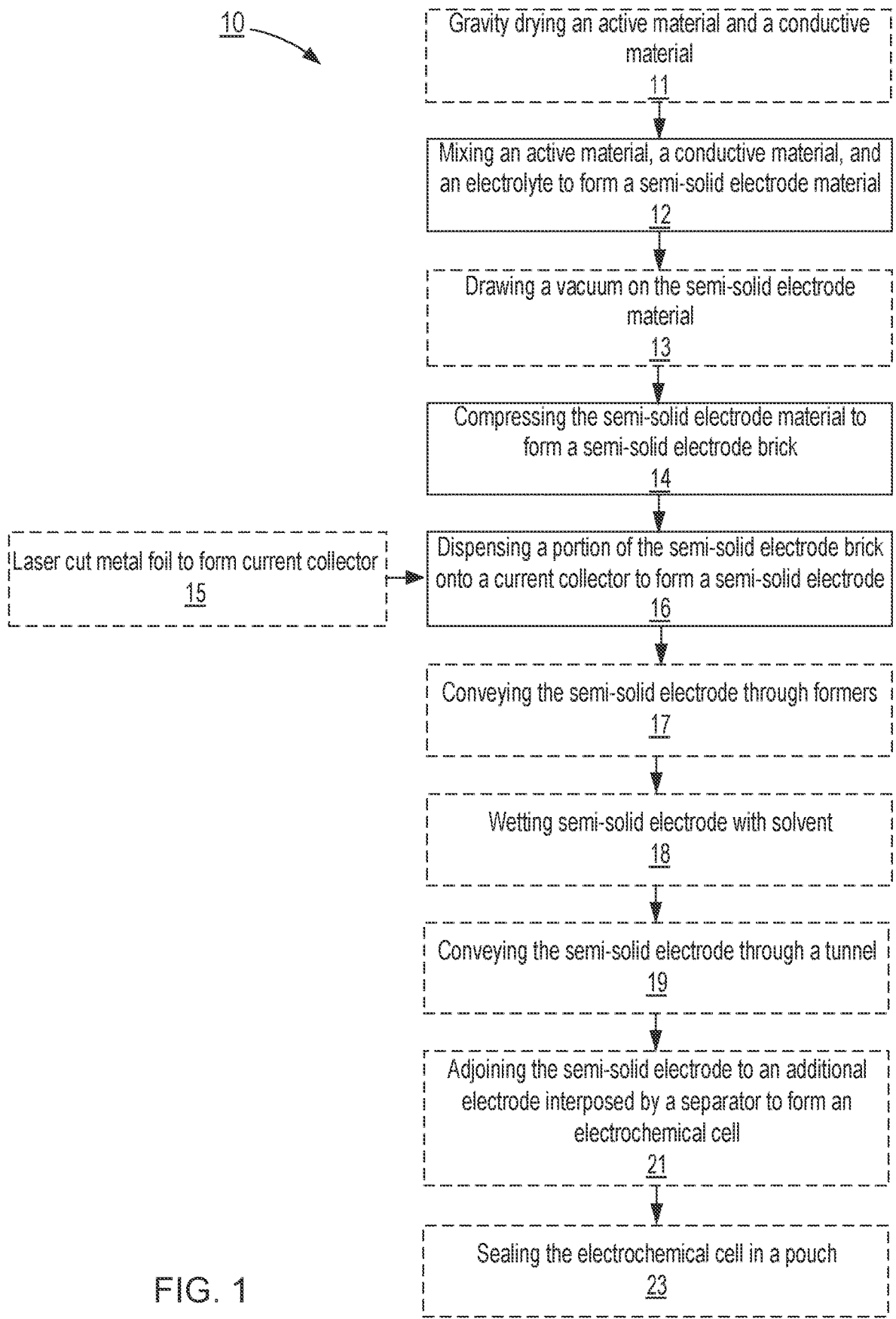
FIG. 1 is a schematic diagram of a method of semi-continuous or continuous manufacturing of a semi-solid electrode, according to an embodiment.

Embodiments described herein relate generally to systems and methods for continuously and/or semi-continuously manufacturing electrochemical cells with semi-solid electrodes. In some embodiments, an electrode brick can be formed from an active material, a conductive material, and an electrolyte. In some embodiments, the brick can be substantially large, such that more than about 100 semi-solid electrodes can be formed from the material of a single electrode brick. In some embodiments, the brick can be formed of densified semi-solid electrode material. Examples of densified semi-solid electrodes and methods of manufacturing the same are described in U.S. Provisional Patent Publication No. 2021/0226192, entitled "Apparatuses and Processes for Forming a Semi-Solid Electrode Having High Active Solids Loading and Electrochemical Cells Including The Same," filed Jan. 21, 2020 (the '192 publication), the entire disclosure of which is hereby incorporated by reference. In some embodiments, the electrode brick can be infused with electrolyte. Examples of infusion processes are described in U.S. Pat. No. 11,005,087, entitled "Systems and Methods for Infusion Mixing a Slurry-Based Electrode,"

filed Jan. 17, 2017 (the '087 patent), the entire disclosure of which is hereby incorporated by reference.

In some embodiments, pre-processing treatments (e.g., drying) can be applied to the active material and the conductive material. After formation of the electrode brick, the electrode brick can be disposed into a cartridge. In some embodiments, the brick can have a high level of homogeneity. From the cartridge, a portion of the electrode brick is dispensed onto a current collector to form a semi-solid electrode. In some embodiments, the semi-solid electrode can then be shaped by both a top blade and side plates. In some embodiments, the electrode can be wetted by a solvent (e.g., an electrolyte or an electrolyte solvent). In some embodiments, the electrode can be a first electrode, and can be adjoined to a second electrode with a separator disposed therebetween to form an electrochemical cell. In some embodiments, pouch material on the outside of the electrochemical cell can be sealed in a single step. Other possible processing steps are described in U.S. Patent Publication No. 2020/0014025, entitled "Continuous and Semi-Continuous Methods of Semi-Solid Electrode and Battery Manufacturing," filed Jul. 9, 2019 (the '025 publication), the entire disclosure of which is hereby incorporated by reference As used in this specification, the singular forms "a," "an," and "the" include plural referents unless the context clearly dictates otherwise. Thus, for example, the term "a member" is intended to mean a single member or a combination of members, "a material" is intended to mean one or more materials, or a combination thereof.

The term "substantially" when used in connection with "cylindrical," "linear," and/or other geometric relationships is intended to convey that the structure so defined is nominally cylindrical, linear or the like. As one example, a portion of a support member that is described as being "substantially linear" is intended to convey that, although linearity of the portion is desirable, some non-linearity can occur in a "substantially linear" portion. Such non-linearity can result from manufacturing tolerances, or other practical considerations (such as, for example, the pressure or force applied to the support member). Thus, a geometric construction modified by the term "substantially" includes such geometric properties within a tolerance of plus or minus 5% of the stated geometric construction. For example, a "substantially linear" portion is a portion that defines an axis or center line that is within plus or minus 5% of being linear.

As used herein, the term "set" and "plurality" can refer to multiple features or a singular feature with multiple parts. For example, when referring to a set of electrodes, the set of electrodes can be considered as one electrode with multiple portions, or the set of electrodes can be considered as multiple, distinct electrodes. Additionally, for example, when referring to a plurality of electrochemical cells, the plurality of electrochemical cells can be considered as multiple, distinct electrochemical cells or as one electrochemical cell with multiple portions. Thus, a set of portions or a plurality of portions may include multiple portions that are either continuous or discontinuous from each other. A plurality of particles or a plurality of materials can also be fabricated from multiple items that are produced separately and are later joined together (e.g., via mixing, an adhesive, or any suitable method).

As used herein, the term "z-direction" generally means the third direction where longitudinal and transverse are the first and second directions. In other words, the z-direction refers to the depth or thickness of a feature as opposed to length and width.

As used herein, the term "about" and "approximately" generally mean plus or minus 10% of the value stated, e.g., about 250 μm would include 225 μm to 275 μm, about 1,000 μm would include 900 μm to 1,100 μm.

As used herein, the term "semi-solid" refers to a material that is a mixture of liquid and solid phases, for example, such as particle suspension, colloidal suspension, emulsion, gel, or micelle.

As used herein, the terms "activated carbon network" and "networked carbon" relate to a general qualitative state of an electrode. For example, an electrode with an activated carbon network (or networked carbon) is such that the carbon particles within the electrode assume an individual particle morphology and arrangement with respect to each other that facilitates electrical contact and electrical conductivity between particles. Conversely, the terms "unactivated carbon network" and "unnetworked carbon" relate to an electrode wherein the carbon particles either exist as individual particle islands or multi-particle agglomerate islands that may not be sufficiently connected to provide adequate electrical conduction through the electrode.

FIG. 1 is a schematic diagram of a method 10 of semi-continuous or continuous manufacturing of a semi-solid electrode, according to an embodiment. As shown, the method 10 optionally includes gravity drying an active material and a conductive material at step 11. The method 10 then includes mixing an active material, a conductive material, and an electrolyte to form a semi-solid electrode material at step 12. The method 10 optionally includes drawing a vacuum on the semi-solid electrode material at step 13. The method 10 further includes compressing the semi-solid electrode material to form a semi-solid electrode brick at step 14 and dispensing a portion of the semi-solid electrode brick onto a current collector to form a semi-solid electrode at step 16. The method 10 then optionally includes conveying the electrode through formers at step 17, wetting the semi-solid electrode with a solvent at step 18, conveying the semi-solid electrode through a tunnel at step 19, adjoining the semi-solid electrode to an additional electrode interposed by a separator to form an electrochemical cell at step 21, and sealing the electrochemical cell in a pouch at step 23.

At step 11, a drying step can be employed to remove excess moisture from either of the materials used for manufacturing the semi-solid electrode. In some embodiments, a powder is subjected to a drying step. In some embodiments, the powder can include active material. In some embodiments, the powder can include conductive material. In some embodiments, the powder can include both active material and conductive material. In some embodiments, step 11 can include a gravity drying step. In some embodiments, the gravity drying can include allowing the powder to fall (i.e., via gravity) through a drying vessel. In some embodiments, a drying gas can flow through the drying vessel while the powder is falling vertically through the drying vessel. The use of a gravity drying process can be more effective and efficient than a simple drying oven or a drying oven with a conveyor. As one advantage, the powder can move in three dimensions when falling through a vessel. In other words, the powder moves downward with gravity, can spread out front-to-back, and can spread out left-to-right. This is in contrast to a simple drying oven where the powder does not move, of a conveyor, in which the powder simply moves in one dimension along the conveyor. This freedom of motion can help the powder spread out and have more surface area exposed to the drying gas. Also, the use of gravity to move the powder can be more energy efficient than the use of a pneumatic stream. Additionally, the drying gas can flow perpendicular or counter-current to the movement of the powder, thus increasing the efficiency of heat exchange (i.e., counter-current heat exchange is more effective than parallel flow heat exchange). In some embodiments, the drying gas can include air, argon, helium, nitrogen, or any non-reactive gas or combinations thereof. In some embodiments, the drying gas can have a moisture content of less than about 1 ppm, less than about 0.9 ppm, less than about 0.8 ppm, less than about 0.7 ppm, less than about 0.6 ppm, less than about 0.5 ppm, less than about 0.4 ppm, less than about 0.3 ppm, less than about 0.2 ppm, less than about 0.1 ppm, less than about 0.09 ppm, less than about 0.08 ppm, less than about 0.07 ppm, less than about 0.06 ppm, less than about 0.05 ppm, less than about 0.04 ppm, less than about 0.03 ppm, less than about 0.02 ppm, or less than about 0.01 ppm, inclusive of all values and ranges therebetween.

In some embodiments, step 11 can occur at ambient temperature. In some embodiments, step 11 can include the application of heat. In some embodiments, the drying vessel in step 11 can be maintained at a temperature of at least about 25° C., at least about 30° C., at least about 35° C., at least about 40° C., at least about 45° C., at least about 50° C., at least about 55° C., at least about 60° C., at least about 65° C., at least about 70° C., at least about 75° C., at least about 80° C., at least about 85° C., at least about 90° C., or at least about 95° C. In some embodiments, the drying vessel in step 11 can be maintained at a temperature of no more than about 100° C., no more than about 95° C., no more than about 90° C., no more than about 85° C., no more than about 80° C., no more than about 75° C., no more than about 70° C., no more than about 65° C., no more than about 60° C., no more than about 55° C., no more than about 50° C., no more than about 45° C., no more than about 40° C., no more than about 35° C., or no more than about 30° C. Combinations of the above-referenced temperatures of the drying vessel in step 11 are also possible (e.g., at least about 25° C. and no more than about 100° C. or at least about 50° C. and no more than about 75° C.), inclusive of all values and ranges therebetween. In some embodiments, the drying vessel in step 11 can be maintained at a temperature of about 25° C., about 30° C., about 35° C., about 40° C., about 45° C., about 50° C., about 55° C., about 60° C., about 65° C., about 70° C., about 75° C., about 80° C., about 85° C., about 90° C., about 95° C., or about 100° C.

In some embodiments, the powder can have a moisture content of less than about 10 ppm, less than about 9 ppm, less than about 8 ppm, less than about 7 ppm, less than about 6 ppm, less than about 5 ppm, less than about 4 ppm, less than about 3 ppm, less than about 2 ppm, less than about 1 ppm, less than about 0.9 ppm, less than about 0.8 ppm, less than about 0.7 ppm, less than about 0.6 ppm, less than about 0.5 ppm, less than about 0.4 ppm, less than about 0.3 ppm, less than about 0.2 ppm, or less than about 0.1 ppm by weight after step 11, inclusive of all values and ranges therebetween.

At step 12, the active material, the conductive material, and an electrolyte are mixed together to form a semi-solid electrode material. In some embodiments, the active material, the conductive material, and the electrolyte are mixed without a binder. In some embodiments, the semi-solid electrode material can be binderless or substantially binderless. In some embodiments, the mixing can be via a continuous process. In some embodiments, the mixing can be in a continuous mixer. In some embodiments, the mixing can be in a twin-screw extruder. Further examples of mixing methods and compositions are described in U.S. Pat. No. 9,484,569, entitled "Electrochemical Slurry Compositions and Methods for Preparing the Same," filed Mar. 15, 2013 (the '569 patent), the entire disclosure of which is hereby incorporated by reference in its entirety. In some embodiments, the electrolyte can be incorporated into the active material and the conductive material via an infusion process. In some embodiments, the infusion process can include drawing a vacuum. In some embodiments, the semi-solid electrode can be mixed substantially, such that the semi-solid electrode material has a high level of homogeneity. Further examples of infusion processes are described in the '087 patent. In some embodiments, electrochemical cells described herein can include separators with separator seals. Further examples of separators with separator seals are described in greater detail in International Patent Application No. PCT/US2020/058564, entitled "Electrochemical Cells with Separator Seals, and Methods of Manufacturing The Same," filed Nov. 2, 2020 (the '564 application), the entire disclosure of which is hereby incorporated by reference in its entirety.

In some embodiments, the amount of semi-solid electrode material mixed together can be enough to form a large number of semi-solid electrodes. Mixing together a large amount of material can promote a more continuous production process, as semi-solid electrode materials do not have to be refilled as frequently. In some embodiments, the amount of semi-solid electrode material mixed together can be enough to form at least about 50 semi-solid electrodes, at least about 60 semi-solid electrodes, at least about 70 semi-solid electrodes, at least about 80 semi-solid electrodes, at least about 90 semi-solid electrodes, at least about 100 semi-solid electrodes, at least about 150 semi-solid electrodes, at least about 200 semi-solid electrodes, at least about 250 semi-solid electrodes, at least about 300 semi-solid electrodes, at least about 350 semi-solid electrodes, at least about 400 semi-solid electrodes, at least about 450 semi-solid electrodes, at least about 500 semi-solid electrodes, at least about 550 semi-solid electrodes, at least about 600 semi-solid electrodes, at least about 650 semi-solid electrodes, at least about 700 semi-solid electrodes, at least about 750 semi-solid electrodes, at least about 800 semi-solid electrodes, at least about 850 semi-solid electrodes, at least about 900 semi-solid electrodes, at least about 950 semi-solid electrodes, or at least about 1,000 semi-solid electrodes, inclusive of all values and ranges therebetween.

In the optional step 13, a vacuum can be applied to the semi-solid electrode material to de-gas the semi-solid electrode material. In some embodiments, the vacuum can be applied prior to addition of the electrolyte. In some embodiments, the vacuum can be applied after the addition of the electrolyte. In some embodiments, the vacuum can be applied concurrently with the mixing (i.e., at step 12). In some embodiments, the vacuum can occur in the same vessel as the mixing. In some embodiments, the vacuum can occur in a different vessel from the mixer. In some embodiments, the vacuum can reduce the pressure in a vessel containing the semi-solid electrode material by at least about 0.05 bar, at least about 0.1 bar, at least about 0.15 bar, at least about 0.2 bar, at least about 0.25 bar, at least about 0.3 bar, at least about 0.35 bar, at least about 0.4 bar, at least about 0.45 bar, at least about 0.5 bar, at least about 0.55 bar, at least about 0.6 bar, at least about 0.65 bar, at least about 0.7 bar, at least about 0.75 bar, at least about 0.80 bar, at least about 0.85 bar, at least about 0.90 bar, at least about 0.95 bar, or at least about 1 bar, inclusive of all values and ranges therebetween.

At step 14, the semi-solid electrode material is compressed to form a semi-solid electrode brick. In some embodiments, the compressing can be in the same vessel as the mixing (i.e., step 12). In some embodiments, the compressing can be in the same vessel as the vacuum (i.e., step 13). In some embodiments, the compressing can be in a different vessel from the mixing. In some embodiments, the compressing can be in a different vessel from the vacuum. In some embodiments, the compressing can increase the density of the semi-solid electrode material by a factor of at least about 1, at least about 1.1, at least about 1.2, at least about 1.3, at least about 1.4, at least about 1.5, at least about 1.6, at least about 1.7, at least about 1.8, at least about 1.9, or at least about 2, inclusive of all values and ranges therebetween. In some embodiments, the compressing can reduce the electrolyte content in the semi-solid electrode material by a factor of at least about 1, at least about 1.1, at least about 1.2, at least about 1.3, at least about 1.4, at least about 1.5, at least about 1.6, at least about 1.7, at least about 1.8, at least about 1.9, or at least about 2, inclusive of all values and ranges therebetween. In some embodiments, the compressing can include any of the methods described in the '192 publication.

In some embodiments, the semi-solid electrode brick formed in step 14 can include a sufficient amount of semi-solid electrode material to form at least about 50 semi-solid electrodes, at least about 60 semi-solid electrodes, at least about 70 semi-solid electrodes, at least about 80 semi-solid electrodes, at least about 90 semi-solid electrodes, at least about 100 semi-solid electrodes, at least about 150 semi-solid electrodes, at least about 200 semi-solid electrodes, at least about 250 semi-solid electrodes, at least about 300 semi-solid electrodes, at least about 350 semi-solid electrodes, at least about 400 semi-solid electrodes, at least about 450 semi-solid electrodes, at least about 500 semi-solid electrodes, at least about 550 semi-solid electrodes, at least about 600 semi-solid electrodes, at least about 650 semi-solid electrodes, at least about 700 semi-solid electrodes, at least about 750 semi-solid electrodes, at least about 800 semi-solid electrodes, at least about 850 semi-solid electrodes, at least about 900 semi-solid electrodes, at least about 950 semi-solid electrodes, or at least about 1,000 semi-solid electrodes, inclusive of all values and ranges therebetween.

In some embodiments, the electrode brick can stand on its own without crumbling. In other words, the electrode brick can have sufficient cohesive properties and/or structural stability such that it stands on a surface without supports and without crumbling. In some embodiments, the electrode brick can stand with its longest dimension vertical without supports and without crumbling. In some embodiments, the electrode brick can have a length of at least about 10 cm, at least about 15 cm, at least about 20 cm, at least about 25 cm, at least about 30 cm, at least about 35 cm, at least about 40 cm, at least about 45 cm, at least about 50 cm, at least about 55 cm, at least about 60 cm, at least about 65 cm, at least about 70 cm, at least about 75 cm, or at least about 80 cm. In some embodiments, the electrode brick can have a width of at least about 5 cm, at least about 10 cm, at least about 15 cm, at least about 20 cm, at least about 25 cm, at least about 30 cm, at least about 35 cm, at least about 40 cm, at least about 45 cm, at least about 50 cm, at least about 55 cm, or at least about 60 cm. In some embodiments, the electrode brick can have a thickness of at least about 0.5 cm, at least about 1 cm, at least about 1.5 cm, at least about 2 cm, at least about 2.5 cm, at least about 3 cm, at least about 3.5 cm, at least about 4 cm, at least about 4.5 cm, or at least about 5 cm.

In some embodiments, the electrode brick can have a density of at least about 1 $g/cm^3$, at least about 1.5 $g/cm^3$, at least about 2 $g/cm^3$, at least about 2.5 $g/cm^3$, at least about 3 $g/cm^3$, at least about 3.5 $g/cm^3$, at least about 4 $g/cm^3$, or at least about 4.5 $g/cm^3$. In some embodiments, the electrode brick can have a density of no more than about 5 $g/cm^3$, no more than about 4.5 $g/cm^3$, no more than about 4 $g/cm^3$, no more than about 3.5 $g/cm^3$, no more than about 3 $g/cm^3$, no more than about 2.5 $g/cm^3$, no more than about 2 $g/cm^3$, or no more than about 1.5 $g/cm^3$. Combinations of the above-referenced densities of the electrode brick are also possible (e.g., at least about 1 $g/cm^3$ and no more than about 5 $g/cm^3$ or at least about 2 $g/cm^3$ and no more than about 4 $g/cm^3$), inclusive of all values and ranges therebetween. In some embodiments, the electrode brick can have a density of at least about 1 $g/cm^3$, at least about 1.5 $g/cm^3$, at least about 2 $g/cm^3$, at least about 2.5 $g/cm^3$, at least about 3 $g/cm^3$, at least about 3.5 $g/cm^3$, at least about 4 $g/cm^3$, at least about 4.5 $g/cm^3$, or about 5 $g/cm^3$.

The method 10 optionally includes step 15, laser cutting metal foil to form a current collector. In some embodiments, step 15 occurs as part of a different process from step 12, 13, and 14. In some embodiments, step 15 occurs on a different conveyor or conveyance system from the other steps of the method 10. Laser cutting is a beneficial method of current collector formation, as blades and rotary tools can often wear out over time. In step 15, a foil is applied to a pouch material or a film material. The laser cutting process is then applied to the foil to form the current collector. In some embodiments, the laser cutting process can include a kiss-cutting process. In some embodiments, the precision of the laser cutting process can minimize any cutting of the pouch material. In other words, the margin of error of the laser cutting process can be small enough such that the foil is completely cut without any significant cutting of the pouch material. In some embodiments, the laser cutting can be to a precision (i.e., margin of error) of less than about 500 nm, less than about 450 nm, less than about 400 nm, less than about 350 nm, less than about 300 nm, less than about 250 nm, less than about 200 nm, less than about 150 nm, less than about 100 nm, less than about 90 nm, less than about 80 nm, less than about 70 nm, less than about 60 nm, less than about 50 nm, less than about 40 nm, less than about 30 nm, less than about 20 nm, or less than about 10 nm.

In some embodiments, the foil (and subsequently the current collector) can have a thickness of at least about 500 nm, at least about 1 μm, at least about 1.5 μm, at least about 2 μm, at least about 2.5 μm, at least about 3 μm, at least about 3.5 μm, at least about 4 μm, at least about 4.5 μm, at least about 5 μm, at least about 5.5 μm, at least about 6 μm, at least about 6.5 μm, at least about 7 μm, at least about 7.5 μm, at least about 8 μm, at least about 8.5 μm, at least about 9 μm, or at least about 9.5 μm. In some embodiments, the foil can have a thickness of no more than about 10 μm, no more than about 9.5 μm, no more than about 9 μm, no more than about 8.5 μm, no more than about 8 μm, no more than about 7.5 μm, no more than about 7 μm, no more than about 6.5 μm, no more than about 6 μm, no more than about 5.5 μm, no more than about 5 μm, no more than about 4.5 μm, no more than about 4 μm, no more than about 3.5 μm, no more than about 3 μm no more than about 2.5 μm, no more than about 2 μm, no more than about 1.5 μm, or no more than about 1 μm. Combinations of the above-reference ranges for foil thicknesses are also possible (e.g., at least about 500 nm and no more than about 10 μm or at least about 1 μm and no more than about 5 μm), inclusive of all values and ranges therebetween. In some embodiments, the foil can have a thickness of about 500 nm, about 1 μm, about 1.5 μm, about 2 μm, about 2.5 μm, about 3 μm, about 3.5 μm, about 4 μm, about 4.5 μm, about 5 μm, about 5.5 μm, about 6 μm, about 6.5 μm, about 7 μm, about 7.5 μm, about 8 μm, about 8.5 μm, about 9 μm, about 9.5 μm, or about 10 μm.

At step 16, a portion of the semi-solid electrode brick is dispensed onto the current collector to form a semi-solid electrode. In some embodiments, the dispensing of the portion of the semi-solid electrode brick can be from the same vessel where the compressing occurred (i.e., step 14). In some embodiments, the dispensing can be from a different vessel from where the compressing occurred. In some embodiments, the dispensing can be from a cartridge with a nozzle. In some embodiments, the dispensing can be onto a conveyor or a conveyance system.

At step 17, the semi-solid electrode is conveyed (e.g., via a conveyor belt) through formers. In some embodiments, the formers can be affixed to the same device that performs the dispensing at step 16. In some embodiments, the formers can include a top blade that controls the thickness of the semi-solid electrode. In some embodiments, the formers can include one or more side plates to control the width of the semi-solid electrode. Rigid control of the edges of the semi-solid electrode can improve edge integrity and reduce crumbling. In some embodiments, the side plates can form a seal with the conveyor, the pouch material, or the current collector so that no semi-solid electrode material leaks out or is pushed out through a bottom region of the semi-solid electrode. In some embodiments, the transverse edges of the semi-solid electrode can be controlled by pinching the pouch material between adjacent plates on the conveyor. In some embodiments, step 17 can include high speed micron-level adjustments of the top blade in the z-direction (i.e., toward and away from the conveyor). In some embodiments, x-ray gauges and/or beta gauges can be used to monitor electrode thickness for consistency. In some embodiments, a closed loop algorithm can be employed with the x-ray gauges and/or the beta gauges to narrow the margin of error in semi-solid electrode thickness from one semi-solid electrode to the next. In other words, the margin of error of the electrode thickness can be narrowed in situ. In some embodiments, the algorithm can be applied to smooth movements of the top blade in the z-direction (i.e., making adjustments gradual to avoid unsmooth surfaces on semi-solid electrodes).

The method 10 optionally includes wetting the semi-solid electrode with a solvent at step 18. Solvent (i.e., electrolyte solvent) can evaporate during any part of the method 10. This can reduce the movement of electroactive species through the semi-solid electrode and subsequent electrochemical cell. Thus, replacement of this solvent can aid in reducing the probability of such occurrences. In some embodiments, the wetting at step 18 can include spraying. In some embodiments, step 18 can include spraying a solvent. In some embodiments, step 18 can include spraying an electrolyte. In some embodiments, step 18 can include spraying a solvent and spraying an electrolyte. In some embodiments, step 18 can include spraying a solvent onto the semi-solid electrode. In some embodiments step 18 can include spraying an electrolyte onto the semi-solid electrode. In some embodiments, step 18 can include spraying both a solvent and an electrolyte onto the semi-solid electrode. In some embodiments, step 18 can include ink jet printing the solvent for high precision application. Ink jet printing can limit or completely eliminate overspray. In some embodiments, a separator can be disposed onto the semi-solid electrode prior to step 18 and the spraying can be onto the separator. In some embodiments, step 18 can include spraying a solvent onto the separator. In some embodiments step 18 can include spraying an electrolyte onto the separator. In some embodiments, step 18 can include spraying both a solvent and an electrolyte onto the separator. In some embodiments, step 18 can include ink jet printing the solvent for high precision application.

In some embodiments, step 18 can include spraying hard carbon. In some embodiments, step 18 can include spraying a hard carbon suspension. In some embodiments, step 18 can include applying a hard carbon suspension onto the semi-solid electrode. In some embodiments, step 18 can include spraying a hard carbon suspension onto the semi-solid electrode. In some embodiments, step 18 can include applying a hard carbon suspension onto the separator. In some embodiments, step 18 can include spraying a hard carbon suspension onto the separator. Examples of electrodes, separators, and electrochemical cells that incorporate hard carbon are described in International Patent Application No. PCT/US2021/038921, entitled "Electrochemical Cells with Multi-Layered Electrodes and Coated Separators and Methods of Making the Same," filed Jun. 24, 2021 (the '921 application), the entire disclosure of which is hereby incorporated by reference in its entirety. In some embodiments, spraying the separator with solvent can make the solvent adhere to the semi-solid electrode more easily. In some embodiments, the spraying can be onto the semi-solid electrode. In some embodiments, the solvent can include an electrolyte salt. In some embodiments, the solvent can be without the electrolyte salt. In some embodiments, the solvent can be added (e.g., via spraying) to a conventional electrode (i.e., a solid electrode) with an electrolyte salt. Wetting a large format conventional electrode can be difficult. Wetting the large area of the conventional electrode with an electrolyte and/or solvent before assembly can be beneficial in conventional electrochemical cell manufacture (e.g., conventional Li ion electrochemical cell manufacturing).

At step 19, the semi-solid electrode can optionally be conveyed through a tunnel. The tunnel can aid in preventing evaporation of the solvent. In other words, the tunnel can reduce the venting effect of the semi-solid electrode being exposed to the surrounding environment. Any portion of the conveyor or the conveyance system can include a tunnel overhead. In other words, the tunnel can be deployed during any part of the method 10 (e.g., before step 18).

At step 21, the semi-solid electrode can optionally be adjoined to an additional electrode (i.e., an adjoining electrode) interposed by a separator to form an electrochemical cell. In some embodiments, the adjoining electrode can come from a different conveyor or conveyance system from the semi-solid electrode. In some embodiments, the adjoining electrode can be placed on top of the semi-solid electrode from above. In some embodiments, the adjoining electrode can be a conventional electrode. In some embodiments, the adjoining electrode can be an additional semi-solid electrode. Further examples of adjoining methods and adjoining systems are described in the '025 publication.

At step 23, the electrochemical cell can optionally be sealed in a pouch. In some embodiments, the sealing of the pouch can be via impulse heating. Sealing methods of pouches often use a sealing device with constant heat applied to the sealing device. In the presence of such heat, pouch materials can warp and wrinkle. Additionally, electrolyte from the semi-solid electrode can evaporate in such heat. With the use of impulse heating, the application of heat is very quick, such that the surrounding environment does not significantly increase in temperature. In addition, the sealing at step 23 can be via a single sealing apparatus. In other words, a single apparatus can seal all around the perimeter of the pouch in one motion, rather than sealing just one side at a time via multiple passes or multiple sealing devices.

Figure 2:
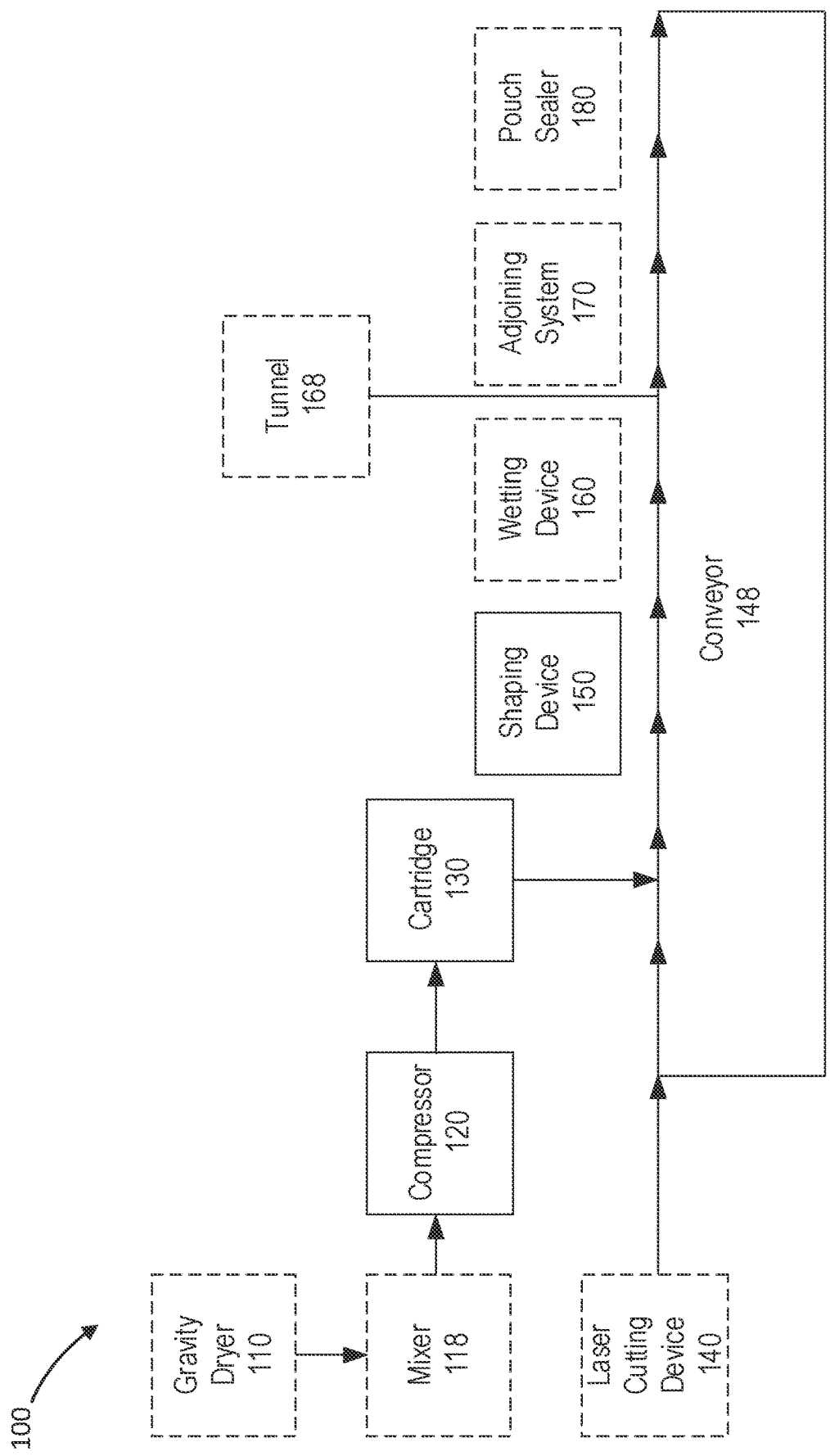
FIG. 2 is a schematic diagram of a system for semi-continuous or continuous manufacture of a semi-solid electrode, according to an embodiment.

FIG. 2 is a schematic diagram of a system 100 for semi-continuous or continuous manufacture of a semi-solid electrode, according to an embodiment. As shown, the system 100 includes a compressor 120, a cartridge 130, a conveyor 148, and a shaping device 150. In some embodiments, the system 100 can include a gravity dryer 110, a mixer 118, a laser cutting device 140, a wetting device 160, a tunnel 168, an adjoining system 170, and a pouch sealer 180. In some embodiments, the system 100 can be used for implementing the method 10, as described above with reference to FIG. 1.

In some embodiments, the gravity dryer 110 can include a vessel, through which a powder can be conveyed via gravity. In some embodiments, the gravity dryer can include a gas inlet and a gas outlet for drying gas. In some embodiments, the gravity dryer 110 can be maintained at a moisture content of less than about 1 ppm, less than about 0.9 ppm, less than about 0.8 ppm, less than about 0.7 ppm, less than about 0.6 ppm, less than about 0.5 ppm, less than about 0.4 ppm, less than about 0.3 ppm, less than about 0.2 ppm, less than about 0.1 ppm, less than about 0.09 ppm, less than about 0.08 ppm, less than about 0.07 ppm, less than about 0.06 ppm, less than about 0.05 ppm, less than about 0.04 ppm, less than about 0.03 ppm, less than about 0.02 ppm, or less than about 0.01 ppm, inclusive of all values and ranges therebetween.

The mixer 118 mixes active material, conductive material, and electrolyte to form a semi-solid electrode material. In some embodiments, the mixer 118 can include a twin-screw extruder. In some embodiments, the mixer 118 can include a twin-screw kneader. In some embodiments, the mixer can include any of the mixers mentioned in the '569 patent. In some embodiments, the mixer 118 can be fluidically coupled to the gravity dryer 110 such that material can flow continuously from the gravity dryer 110 to the mixer 118.

The compressor 120 forms the semi-solid electrode material into a semi-solid electrode brick. In some embodiments, the compressor 120 can be fluidically coupled to the mixer 118, such that the semi-solid electrode material can flow continuously from the mixer 118 to the compressor 120. In some embodiments, the compressor 120 can be fluidically coupled to a vacuum. In some embodiments, the compressor 120 can include a piston for compressing. In some embodiments, the compressor 120 can be part of the same apparatus as the mixer 118. In other words, the same apparatus can both mix and compress the electrode material.

The cartridge 130 contains semi-solid electrode bricks and dispenses portions of the semi-solid electrode bricks onto current collectors to form semi-solid electrodes. In some embodiments, the cartridge 130 can include a nozzle for dispensation. In some embodiments, the cartridge 130 can be part of the same structure or apparatus as the compressor 120 and/or the mixer 118.

The laser cutting device 140 cuts foil to form current collectors. In some embodiments, the laser cutting device 140 can perform kiss cutting. In some embodiments, the laser cutting device 140 can be to a precision (i.e., margin of error) of less than about 500 nm, less than about 450 nm, less than about 400 nm, less than about 350 nm, less than about 300 nm, less than about 250 nm, less than about 200 nm, less than about 150 nm, less than about 100 nm, less than about 90 nm, less than about 80 nm, less than about 70 nm, less than about 60 nm, less than about 50 nm, less than about 40 nm, less than about 30 nm, less than about 20 nm, or less than about 10 nm.

The conveyor 148 moves semi-solid electrodes through the additional process units of the system 100. In some embodiments, the system can include multiple conveyors (not shown). In some embodiments, multiple conveyors can be used to put multiple electrodes together, as described in the '025 publication.

The shaping device 150 shapes the edges of the semi-solid electrode. In other words, the shaping device 150 controls the edges of the semi-solid electrode. In some embodiments, the shaping device 150 can include a single frame for shaping the outside edges of the semi-solid electrode. In some embodiments, the shaping device 150 can include a top blade for controlling the thickness of the semi-solid electrode and side plates for controlling the width of the semi-solid electrodes. In some embodiments, the shaping device 150 can adjust with micron level precision. In some embodiments, the shaping device 150 can learn in closed loop process algorithms. In some embodiments, the shaping device 150 can be part of the same structure as the cartridge 130. In other words, the top blade and the side plates can be attached to the cartridge 130.

The wetting device 160 wets the semi-solid electrode with electrolyte solvent to replace electrolyte solvent lost during production. In some embodiments, the wetting device can include a sprayer. In some embodiments, the tunnel 168 can be disposed throughout the conveyor 148. In some embodiments, the tunnel 168 can be disposed adjacent to the wetting device 160 to reduce evaporation of the electrolyte from the semi-solid electrode.

In some embodiments, the adjoining system 170 can bring an additional electrode together with the semi-solid electrode to form an electrochemical cell. In some embodiments, the adjoining system 170 can include a second conveyor. Further examples of adjoining systems are described in the '025 publication.

In some embodiments, the pouch sealer 180 seals the pouch around the outside edges of the electrochemical cell. In some embodiments, the pouch sealer 180 can include an impulse heater. In some embodiments, the pouch sealer 180 can have a shape, such that it can seal around the outside edge of the electrochemical cell in a single step.

In some embodiments, the system 100 can be enclosed in a main enclosure, which controls the environment, in which each of the electrodes are produced, and the electrochemical cells are assembled. In some embodiments, the system 100 can include multiple conveyors 148. In some embodiments, the system 100 can include an anode casting station and a cathode casting station. In some embodiments, the anode casting station can include a first conveyor and the cathode casting station can include a second conveyor. In some embodiments, the anode casting station and/or the cathode casting station can include a cartridge that dispenses materials onto transverse steering platforms. In some embodiments, the cartridge at the anode casting station dispenses an anode material, while the cartridge at the cathode casting station dispenses a cathode material. In some embodiments, the cartridges can dispense portions of semi-solid electrode bricks. In some embodiments, each of the anode and cathode casting stations can include optical measurement devices as well as x-rays. The optical measurement devices and x-rays can be used for quality control to confirm the thickness of the semi-solid electrodes after being formed. In some embodiments, the anode can be formed at the anode casting station with the anode material disposed on a current collector and/or a pouch material. In some embodiments, the cathode can be formed at the cathode casting station with the cathode material disposed on a current collector and/or a pouch material.

After being formed at the cathode forming station, the cathode material can be passed through a spray enclosure. In some embodiments, the wetting device 160 and/or the tunnel 168 can be inside the spray enclosure. In some embodiments, solvents can be sprayed on the anode material and/or the cathode material in the spray enclosure. In some embodiments, the solvents sprayed on the cathode material can be flammable. The use of a spray enclosure can aid in preventing ignition by keeping concentration levels of flammable materials outside of an ignitable range. In some embodiments, the spray enclosure includes an exhaust to vent the spray enclosure to the surrounding environment and keep the concentration of flammable materials below a flammable limit. In some embodiments, the spray enclosure can be explosion proof. In some embodiments, the cathode material can pass through a spray enclosure. In some embodiments, the anode material can pass through a spray enclosure. In some embodiments, the anode material can pass through a first spray enclosure and the cathode material can pass through a second spray enclosure. In some embodiments, the anode material and the cathode material can pass through the same spray enclosure.

In some embodiments, the spray enclosure can be purged of oxygen to reduce the risk of ignition inside the enclosure. In some embodiments, the purging of oxygen can be via vacuuming the spray enclosure. In some embodiments, the purging of oxygen can be via influx of inert gas (e.g., nitrogen, argon) into the spray enclosure. In some embodiments, the purging of oxygen can be via vacuuming the spray enclosure and influx of inert gas into the spray enclosure.

In some embodiments, the formed anode material, the formed cathode material, and a separator material can all be fed to a vacuum drum (not shown), where the anode material, the cathode material, and the separator are merged together. In some embodiments, each of the anode material, the cathode material, and the separator can wrap around the vacuum drum at different points along the vacuum drum to form the layers of the electrochemical cell. In some embodiments, the vacuum drum can apply a force to the electrodes to increase their densities. In some embodiments, the vacuum drum can apply a downward force on the electrodes, such that the electrodes experience a pressure of at least about 1 MPa, at least about 2 MPa, at least about 3 MPa, at least about 4 MPa, at least about 5 MPa, at least about 6 MPa, at least about 7 MPa, at least about 8 MPa, or at least about 9 MPa. In some embodiments, the vacuum drum can apply a downward force on the electrodes, such that the electrodes experience a pressure of no more than about 10 MPa, no more than about 9 MPA, no more than about 8 MPA, no more than about 7 MPA, no more than about 6 MPA, no more than about 5 MPA, no more than about 4 MPA, no more than about 3 MPA, or no more than about 2 MPA. Combinations of the above-referenced pressures experienced by the electrodes due to the downward force of the vacuum drum are also possible (e.g., at least about 1 MPa and no more than about 10 MPA or at least about 3 MPa and no more than about 7 MPa), inclusive of all values and ranges therebetween. In some embodiments, the vacuum drum can apply a downward force on the electrodes, such that the electrodes experience a pressure of about 1 MPa, about 2 MPa, about 3 MPa, about 4 MPa, about 5 MPa, about 6 MPa, about 7 MPa, about 8 MPa, about 9 MPa, or about 10 MPa.

In some embodiments, the vacuum drum can have a diameter of at least about 1 cm, at least about 5 cm, at least about 10 cm, at least about 20 cm, at least about 30 cm, at least about 40 cm, at least about 50 cm, at least about 60 cm, at least about 70 cm, at least about 80 cm, or at least about 90 cm. In some embodiments, the vacuum drum can have a diameter of no more than about 1 m, no more than about 90 cm, no more than about 80 cm, no more than about 70 cm, no more than about 60 cm, no more than about 50 cm, no more than about 40 cm, no more than about 30 cm, no more than about 20 cm, no more than about 10 cm, or no more than about 5 cm. Combinations of the above-referenced diameters of the vacuum drum are also possible (e.g., at least about 1 cm and no more than about 1 m or at least about 10 cm and no more than about 50 cm), inclusive of all values and ranges therebetween. In some embodiments, the vacuum drum can have a diameter of about 1 cm, about 5 cm, about 10 cm, about 20 cm, about 30 cm, about 40 cm, about 50 cm, about 60 cm, about 70 cm, about 80 cm, about 90 cm, or about 1 m.

In some embodiments, the vacuum drum can be held in place with a tack. In some embodiments, the vacuum drum can include multiple members disposed around a perimeter of the vacuum drum. In some embodiments, the members can include pallets. In some embodiments, the vacuum drum can include a central duct with a vacuum for removal of liquids from the material on the outside of the vacuum drum. After merging together, a laser cutter can cut the anode material, the cathode material, and the separator to form individual electrochemical cells. As shown, the individual electrochemical cells can be conveyed across a vacuum conveyor. In some embodiments, the vacuum conveyor can remove stray particles from the electrochemical cells. The individual electrochemical cells can be measured via optical measurement for quality control. The individual electrochemical cells can then selectively slide off of the vacuum conveyor, depending on whether they pass the quality control test.

In some embodiments, the system 100 can include a first vacuum drum that receives a feed of cathode material and separator material and a second vacuum drum that receives a feed of anode material. In some embodiments, the first vacuum drum presses the separator material and the cathode material to a conveyor, and then the second vacuum drum presses the anode material onto the cathode material and the separator.

In some embodiments, the anode casting station and/or the cathode casting station can include a densification station (not shown). In some embodiments, the densification station can employ any of the electrode densification methods described in the '192 publication.

In some embodiments, the system 100 can produce at least about 100, at least about 150, at least about 200, at least about 250, at least about 300, at least about 350, at least about 400, at least about 450, at least about 500, at least about 550, at least about 600, at least about 650, at least about 700, at least about 750, at least about 800, at least about 850, at least about 900, at least about 950, or at least about 1,000 electrodes per minute, inclusive of all values and ranges therebetween. In some embodiments, the system 100 can produce at least about 100, at least about 150, at least about 200, at least about 250, at least about 300, at least about 350, at least about 400, at least about 450, at least about 500, at least about 550, at least about 600, at least about 650, at least about 700, at least about 750, at least about 800, at least about 850, at least about 900, at least about 950, or at least about 1,000 electrochemical cells per minute, inclusive of all values and ranges therebetween.

Figure 3:
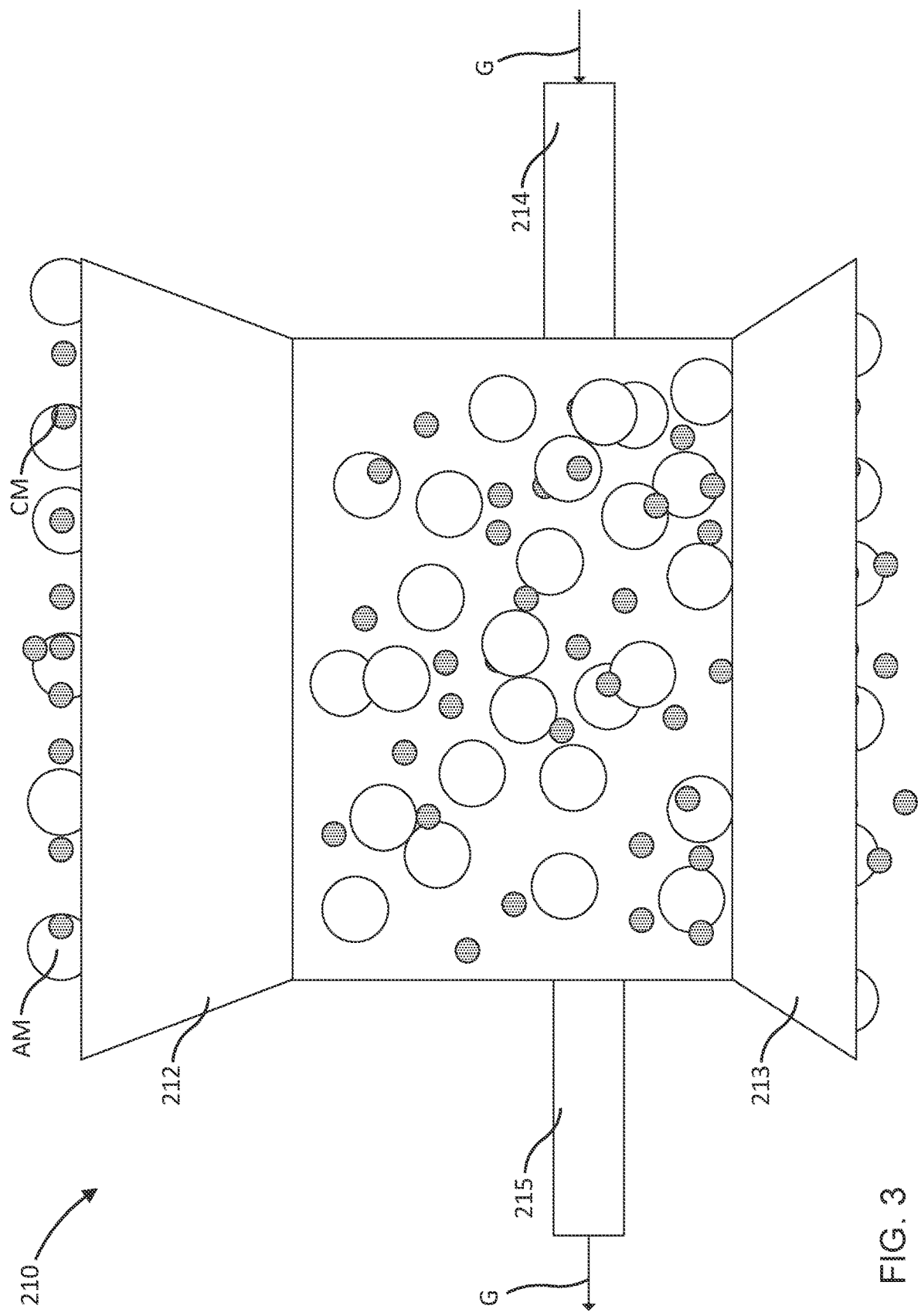
FIG. 3 is an illustration of a gravity dryer, according to an embodiment.

FIG. 3 illustrates a gravity dryer 210, according to an embodiment. In some embodiments, the gravity dryer 210 can be the same or substantially similar to the gravity dryer 110, as described above with reference to FIG. 2. Thus, certain aspects of the gravity dryer 210 are not described in greater detail herein. As shown, the gravity dryer 210 includes a powder loading port 212, a powder exhaust port 213, a gas inlet 214, and a gas outlet 215. As shown, the powder includes active material AM and conductive material CM, fed into the gravity dryer 210. The powder falls through the gravity dryer 210 while gas G is fed through the gravity dryer 210.

In some embodiments, the powder loading port 212 can include a mesh to filter out larger particles. In some embodiments, the powder loading port 212 can include a funneled opening for ease of pouring. The exit port 213 expels the powder from the gravity dryer. In some embodiments, the exit port 213 can be fluidically coupled to another process unit (e.g., a mixer). The gas G is fed into the gravity dryer 210 via the gas inlet. In some embodiments, the gas G can be fed at positive pressure. In some embodiments, the gas G can be fed at a pressure of at least about 1 bar, at least about 1.5 bar, at least about 2 bar, at least about 2.5 bar, at least about 3 bar, at least about 3.5 bar, at least about 4 bar, at least about 4.5 bar, at least about 5 bar, at least about 5.5 bar, at least about 6 bar, at least about 6.5 bar, at least about 7 bar, at least about 7.5 bar, at least about 8 bar, at least about 8.5 bar, at least about 9 bar, or at least about 9.5 bar. In some embodiments, the gas G can be fed at a pressure of no more than about 10 bar, no more than about 9.5 bar, no more than about 9 bar, no more than about 8.5 bar, no more than about 8 bar, no more than about 7.5 bar, no more than about 7 bar, no more than about 6.5 bar, no more than about 6 bar, no more than about 5.5 bar, no more than about 5 bar, no more than about 4.5 bar, no more than about 4 bar, no more than about 3.5 bar, no more than about 3 bar, no more than about 2.5 bar, no more than about 2 bar, or no more than about 1.5 bar. Combinations of the above referenced pressures of the gas G fed to the gravity dryer 210 are also possible (e.g., at least about 1 bar and no more than about 10 bar or at least about 2 bar and no more than about 5 bar), inclusive of all values and ranges therebetween. In some embodiments, the gas G can be fed at a pressure of about 1 bar, about 1.5 bar, about 2 bar, about 2.5 bar, about 3 bar, about 3.5 bar, about 4 bar, about 4.5 bar, about 5 bar, about 5.5 bar, about 6 bar, about 6.5 bar, about 7 bar, about 7.5 bar, about 8 bar, about 8.5 bar, about 9 bar, about 9.5 bar, or about 10 bar.

As shown, the gravity dryer 210 includes a single gas inlet 214 and a single gas outlet 215. In some embodiments, the gravity dryer 210 can include multiple gas inlets 214 and/or gas outlets 215. In some embodiments, the gravity dryer 210 can include at least about 2, at least about 3, at least about 4, at least about 5, at least about 6, at least about 7, at least about 8, at least about 9, or at least about 10 gas inlets 214 and/or gas outlets 215. As shown, the gas G flows perpendicular to the flow of the powder. In some embodiments, the gas G can flow counter current to the flow of the powder. In some embodiments, the gas G can flow parallel to the flow of the powder.

Figure 4:
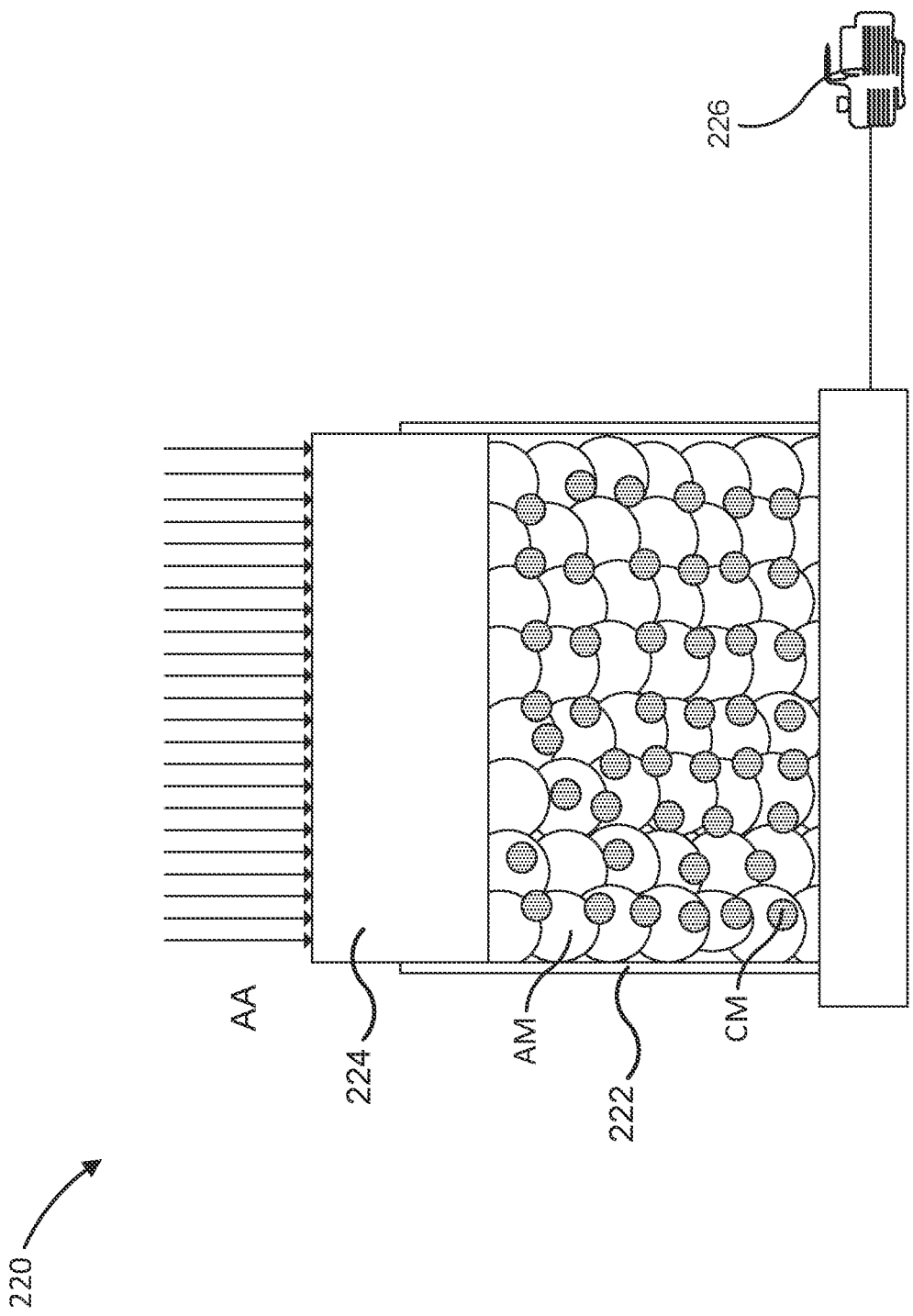
FIG. 4 is an illustration of a compressor, according to an embodiment.

FIG. 4 is an illustration of a compressor 220, according to an embodiment. In some embodiments, the compressor 220 can be the same or substantially similar to the compressor 120, as described above with reference to FIG. 2. Thus, certain aspects of the compressor 220 are not described in greater detail herein. The compressor 220 forms the semi-solid electrode material into a semi-solid electrode brick. As shown, the compressor 220 includes a container 222, a piston 224, and a pump 226. Conductive material CM and active material AM are shown being compressed. In some embodiments, electrolyte can be included in the material being compressed (i.e., the material in the compressor 220 can be a semi-solid electrode). In some embodiments, electrolyte can be added to the compressor 220. In some embodiments, the electrolyte can be infused into the compressor 220. Methods and apparatus for infusion are described in greater detail in the '087 patent.

The container 222 holds the semi-solid electrode material in place during compression. In some embodiments, the container 222 can have a cylindrical shape, a cube shape, a rectangular prism shape, or any other suitable shape. In some embodiments, the container 222 can have a volume of at least about 0.1 L, at least about 0.5 L, at least about 1 L, at least about 5 L, at least about 10 L, at least about 50 L, at least about 100 L, at least about 500 L, at least about 1 m$^3$, or at least about 5 m$^3$. In some embodiments, the container 222 can have a volume of no more than about 10 m$^3$, no more than about 5 m$^3$, no more than about 1 m$^3$, no more than about 500 L, no more than about 100 L, no more than about 50 L, no more than about 10 L, no more than about 5 L, no more than about 1 L, or no more than about 0.5 L. Combinations of the above-referenced volumes of the container 222 are also possible (e.g., at least about 0.1 L and no more than about 10 m$^3$ or at least about 5 L and no more than about 10 L), inclusive of all values and ranges therebetween. In some embodiments, the container 222 can have a volume of about 0.1 L, about 0.5 L, about 1 L, about 5 L, about 10 L, about 50 L, about 100 L, about 500 L, about 1 m$^3$, about 5 m$^3$, or about 10 m$^3$.

The piston 224 presses the semi-solid electrode material (i.e., by moving along lines AA) to form the semi-solid electrode brick. In some embodiments, the piston 224 can include a gasket around the edge to form a seal with the container 222. In some embodiments, the vacuum pump 226 can remove gas and/or electrolyte from the semi-solid electrode material in the container 222. In some embodiments, the vacuum pump can pull a vacuum of at least about 0.1 bar, at least about 0.2 bar, at least about 0.3 bar, at least about 0.4 bar, at least about 0.5 bar, at least about 0.6 bar, at least about 0.7 bar, at least about 0.8 bar, or at least about 0.9 bar, inclusive of all values and ranges therebetween.

Figure 5:
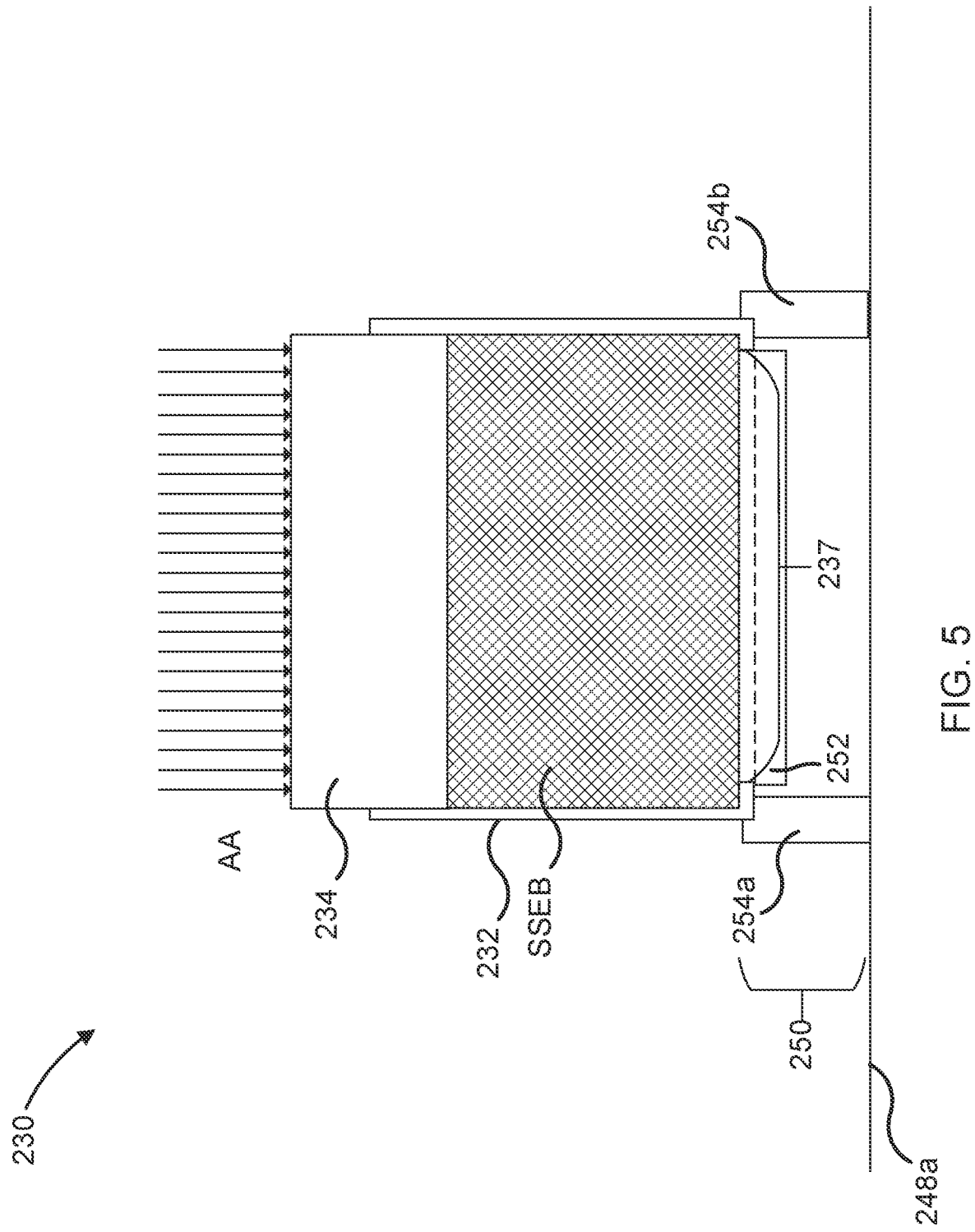
FIG. 5 is an illustration of a cartridge with a shaping device, according to an embodiment.

FIG. 5 is an illustration of a cartridge 230 with a shaping device 250, according to an embodiment. In some embodiments, the cartridge 230 and the shaping device 250 can be the same or substantially similar to the cartridge 130 and the shaping device 150, as described above with reference to FIG. 2. Thus, certain aspects of the cartridge 230 and the shaping device 250 are not described in greater detail herein. In some embodiments, the cartridge 230 can be part of the same structure as the compressor 220, as described above with reference to FIG. 4. In other words, a single apparatus can perform all of the functions of the compressor 230 and the cartridge 230. As shown, the cartridge 230 includes a container 232, a piston 234, and a nozzle opening 237, while the shaping device 250 (attached to the cartridge 230) includes a top blade 252 and side plates 254a, 254b (collectively referred to as side plates 254). As shown, the nozzle opening 237 is a broad opening obstructed by the top blade 252 and is thus depicted by a dotted line. The cartridge 230 can dispense portions of the semi-solid electrode brick SSEB onto a conveyor 248a.

The container 232 houses the semi-solid electrode brick SSEB. In some embodiments, the container 232 can have a cylindrical shape, a cube shape, a rectangular prism shape, or any other suitable shape. In some embodiments, the container 232 can have a volume of at least about 0.1 L, at least about 0.5 L, at least about 1 L, at least about 5 L, at least about 10 L, at least about 50 L, at least about 100 L, at least about 500 L, at least about 1 m$^3$, or at least about 5 m$^3$. In some embodiments, the container 232 can have a volume of no more than about 10 m$^3$, no more than about 5 m$^3$, no more than about 1 m$^3$, no more than about 500 L, no more than about 100 L, no more than about 50 L, no more than about 10 L, no more than about 5 L, no more than about 1 L, or no more than about 0.5 L. Combinations of the above-referenced volumes of the container 232 are also possible (e.g., at least about 0.1 L and no more than about 10 m$^3$ or at least about 5 L and no more than about 10 L), inclusive of all values and ranges therebetween. In some embodiments, the container 232 can have a volume of about 0.1 L, about 0.5 L, about 1 L, about 5 L, about 10 L, about 50 L, about 100 L, about 500 L, about 1 m$^3$, about 5 m$^3$, or about 10 m$^3$. The piston 234 pushes the semi-solid electrode brick SSEB, such that a portion of the semi-solid electrode brick SSEB exits the cartridge 230 via the nozzle opening 237.

As shown, the top blade 252 controls the thickness of the semi-solid electrode while the side plates 254 control the width of the semi-solid electrode. In some embodiments, the top blade 252 and/or the side plates 254 can adjust with micron level precision. In some embodiments, the top blade 252 and/or the side plates 254 can be controlled by an algorithm that can learn in closed loop process algorithms. In some embodiments, the side plates 254 can create seals with the conveyor 248a, to prevent portions of the semi-solid electrode from flowing sideways out the nozzle. In some embodiments, the side plates 254 can be clamped to the cartridge 230 via a clamp plate. In some embodiments, the side plates can be composed of polyethylene terephthalate (PET). In some embodiments, the side plates can have a thickness of about 0.15 mm, about 0.2 mm, or about 0.25 mm, inclusive of all values and ranges therebetween.

In some embodiments, supports can be placed below the conveyor 248a to prevent deflection of the conveyor 248a due to the force exerted from the casting of the semi-solid electrode brick SSEB onto the conveyor 248a. In some embodiments, the conveyor 248a can be supported from above (e.g., via beams hanging from a ceiling) to prevent deflection of the conveyor 248a due to the force exerted from the casting of the semi-solid electrode brick SSEB onto the conveyor 248a.

Figure 6:
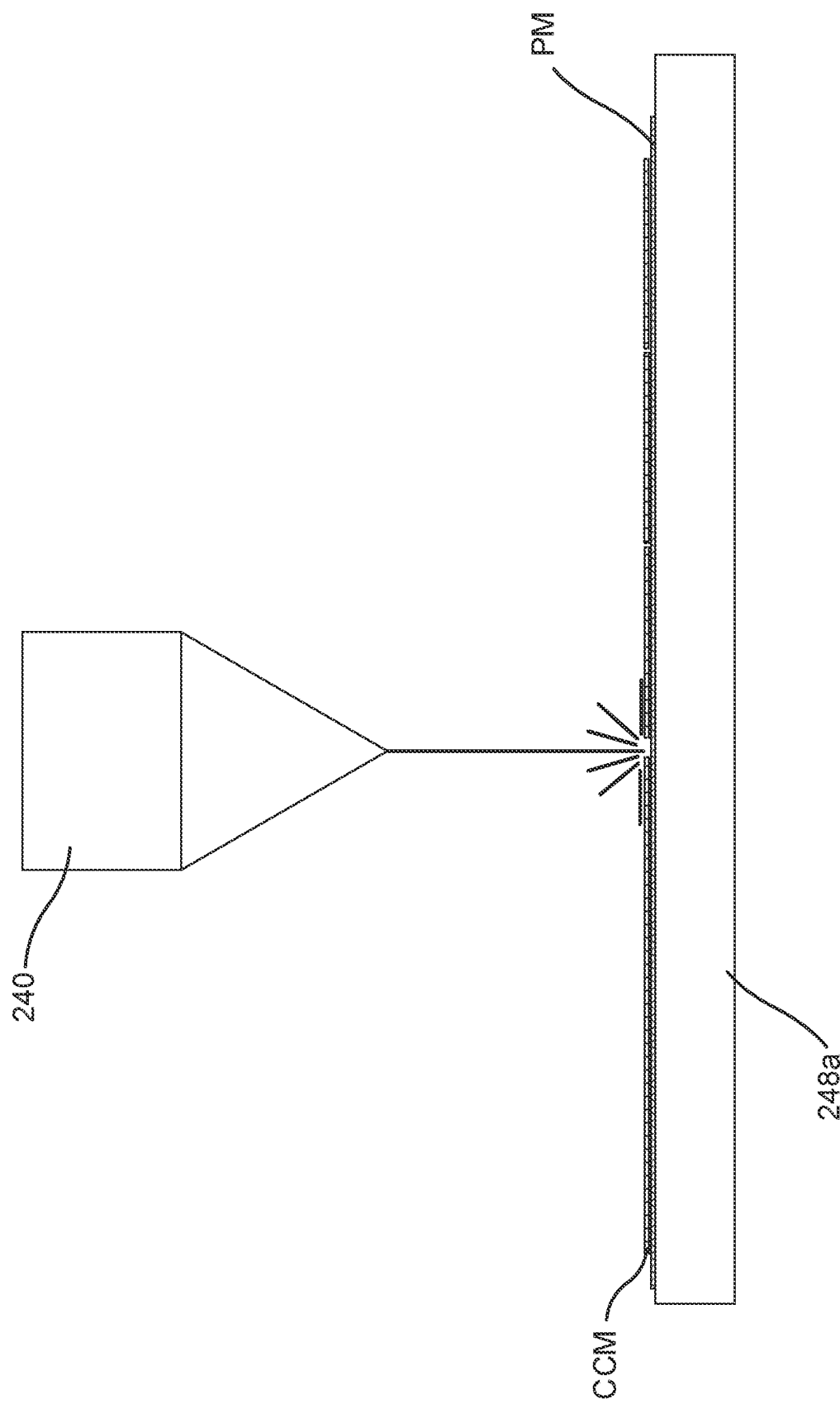
FIG. 6 is an illustration of a laser cutting device, according to an embodiment.

FIG. 6 illustrates a laser cutter 240, according to an embodiment. The laser cutter 240 cuts current collector material CCM being conveyed along a conveyor 248b. In some embodiments, the laser cutter 240 can be the same or substantially similar to the laser cutter 140, as described above with reference to FIG. 2. Thus, certain aspects of the laser cutter 240 are not described in greater detail herein. The current collector material CCM is applied to a pouch material PM and cut via the laser cutter 240. In some embodiments, portions of the current collector material CCM are removed to create a region of pouch material PM around the edge of the current collector material CCM for sealing. In some embodiments, the laser cutter 240 can have a precision (i.e., margin of error) of less than about 500 nm, less than about 450 nm, less than about 400 nm, less than about 350 nm, less than about 300 nm, less than about 250 nm, less than about 200 nm, less than about 150 nm, less than about 100 nm, less than about 90 nm, less than about 80 nm, less than about 70 nm, less than about 60 nm, less than about 50 nm, less than about 40 nm, less than about 30 nm, less than about 20 nm, or less than about 10 nm.

In some embodiments, the conveyor 248a can advance horizontally. In some embodiments, the conveyor 248a can include multiple members or pallets (not shown) arranged side-by-side, advancing in a horizontal direction. In some embodiments, rotating wheels or drums on either side of the conveyor 248a can facilitate movement of the conveyor 248a. In some embodiments, one or more tucking fingers can be housed inside the conveyor 248a to tuck portions of the current collector material CCM into gaps between the pallets. In some embodiments tucking fingers housed inside the conveyor 248a can include a vacuum therein, such that the tucking finger can contact the current collector material CCM (or a conveyor belt on which the current collector material CCM sits) and pull the current collector material CCM into the gaps between the pallets. In some embodiments, the pallets can come together to pinch the tucked portions of current collector material CCM. Tucking/pinching portions of the current collector material CCM prior to casting electrode material onto the conveyor 248a can aid in creating space between the electrode material, when the pallets are later released and spaced apart from each other once again. The electrode material can separate into discrete electrodes.

Figure 7:
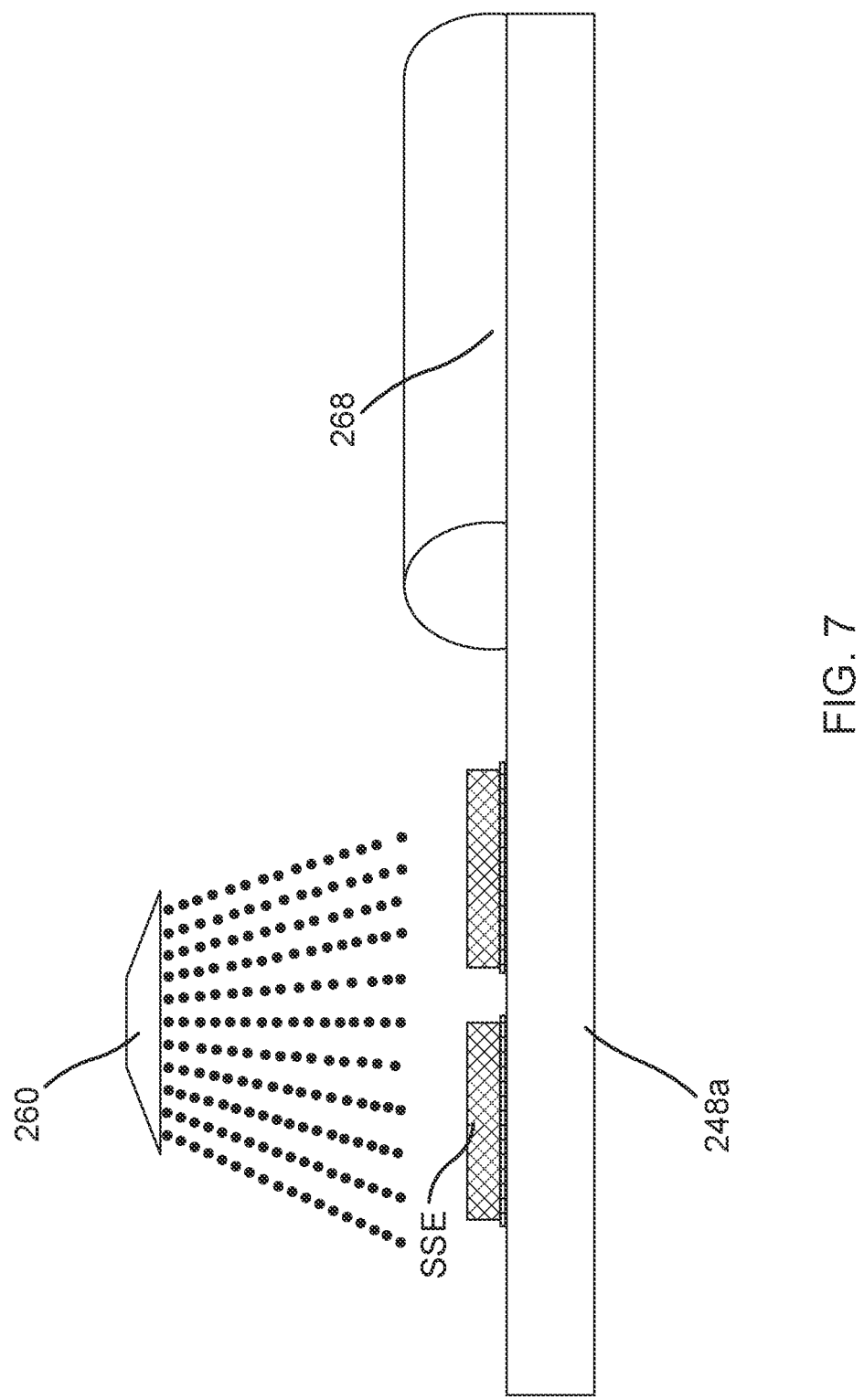
FIG. 7 is an illustration of a wetting device and a tunnel, according to an embodiment.

FIG. 7 is an illustration of a wetting device 260 and a tunnel 268, according to an embodiment. In some embodiments, the wetting device 260 and the tunnel 268 can be the same or substantially similar to the wetting device 160 and the tunnel 168, as described above with reference to FIG. 2. Thus, certain aspects of the wetting device 160 and the tunnel 168 are not described in greater detail herein. As shown, the wetting device 260 is a sprayer. In some embodiments, other wetting devices can be used, such as a hose or an ink jet. The wetting device 260 can dispense electrolyte or electrolyte solvent onto a semi-solid electrode being conveyed along the conveyor 248a. In some embodiments, the sprayed electrolyte or electrolyte solvent can replace solvent lost during other portions of the manufacturing process. The wetting with the electrolyte or electrolyte solvent can improve the electrochemical performance of the semi-solid electrode SSE and/or diffusivity within the SSE. The tunnel 268 can reduce solvent evaporation by limiting exposure to the outside atmosphere.

In some embodiments, the wetting device 260 can apply a liquid to the semi-solid electrode and/or the separator at a rate of at least about 0.5 mg/cm$^2$, at least about 1 mg/cm$^2$, at least about 1.5 mg/cm$^2$, at least about 2 mg/cm$^2$, or at least about 2.5 mg/cm$^2$. In some embodiments, the wetting device can apply a liquid to the semi-solid electrode and/or the separator at a rate of no more than about 3 mg/cm$^2$, no more than about 2.5 mg/cm$^2$, no more than about 2 mg/cm$^2$, no more than about 1.5 mg/cm$^2$, or no more than about 1 mg/cm$^2$. Combinations of the above-referenced amounts of liquid applied to the electrode and/or the separator are also possible (e.g., at least about 0.5 mg/cm$^2$ and no more than about 3 mg/cm$^2$ or at least about 1 mg/cm$^2$ and no more than about 2 mg/cm$^2$), inclusive of all values and ranges therebetween. In some embodiments, the wetting device 260 can apply a liquid to the semi-solid electrode and/or the separator at a rate of about 0.5 mg/cm$^2$, about 1 mg/cm$^2$, about 1.5 mg/cm$^2$, about 2 mg/cm$^2$, about 2.5 mg/cm$^2$, or about 3 mg/cm$^2$.

In some embodiments, the wetting device 260 can apply a liquid to the semi-solid electrode and/or the separator at a rate of at least about 0.5 μL/cm$^2$, at least about 1 μL/cm$^2$, at least about 1.5 µL/cm², at least about 2 µL/cm², or at least about 2.5 µL/cm². In some embodiments, the wetting device can apply a liquid to the semi-solid electrode and/or the separator at a rate of no more than about 3 µL/cm², no more than about 2.5 µL/cm², no more than about 2 µL/cm², no more than about 1.5 µL/cm², or no more than about 1 µL/cm². Combinations of the above-referenced amounts of liquid applied to the electrode and/or the separator are also possible (e.g., at least about 0.5 µL/cm² and no more than about 3 µL/cm² or at least about 1 µL/cm² and no more than about 2 µL/cm²), inclusive of all values and ranges therebetween. In some embodiments, the wetting device 260 can apply a liquid to the semi-solid electrode and/or the separator at a rate of about 0.5 µL/cm², about 1 µL/cm², about 1.5 µL/cm², about 2 µL/cm², about 2.5 µL/cm², or about 3 µL/cm².

Figure 8B:
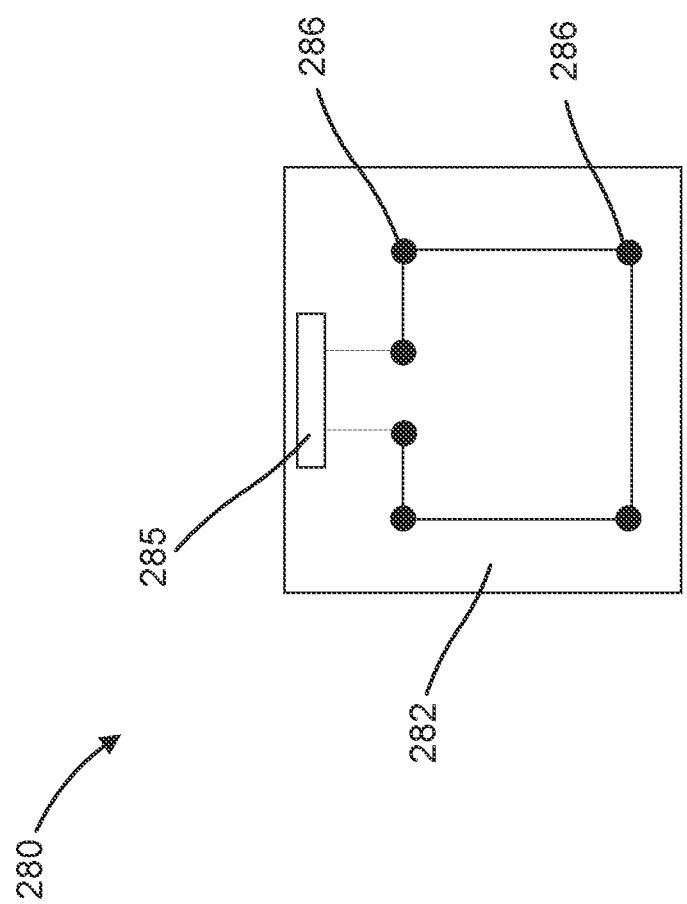

FIGS. 8A-8B show a pouch sealer 280, according to an embodiment. FIG. 8A shows a profile view of the pouch sealer 280, while FIG. 8B shows a bottom view of the pouch sealer 280. In some embodiments, the pouch sealer 280 can be the same or substantially similar to the pouch sealer 180, as described above with reference to FIG. 2. Thus, certain aspects of the pouch sealer 280 are not described in greater detail herein. As shown, the pouch sealer 280 includes a base 282, a heater frame 284, and a wire cartridge 285. In use, the base 282 moves toward an electrochemical cell EC while the electrochemical cell EC is being conveyed along the conveyor 248a. The heater frame 284 makes contact with the outer edges of the pouch material of the electrochemical cell EC while being heated via an impulse heater. This application of heat seals the outer edges of the pouch material in a single step. The base 282 is then raised and the heater frame 284 is removed from contact with the electrochemical cell EC. With the design of the heater frame 284 extending around the perimeter of the electrochemical cell EC, the heat sealing of the pouch material can be executed in a single step.

The heater frame 284 includes heating wire lining the outer perimeter of the heater frame 284. After a large number of heating cycles, the wire can become fatigued and unusable. The wire cartridge 285 allows for deployment of new wire to replace the worn wire. Once the wire becomes fatigued, the wire cartridge can dispense a length of new wire (e.g., via one or more wheels in contact with the new wire) from a first portion of the wire cartridge 285 and the worn wire can be fed back into the wire cartridge 285 at a second portion of the wire cartridge. This mechanism is analogous to an automatic plastic toilet seat changer.

Impulse heating of the wire of the heater frame 284 can cause the heater frame 284 to expand and/or move. In some embodiments, constraints 286 can be placed at various locations around the heater frame 284 to minimize movement of the heater frame 284 during impulse heating. In some embodiments, the constraints 286 can include pins welded to the heater frame 284 and/or the base 282.

Figure 9:
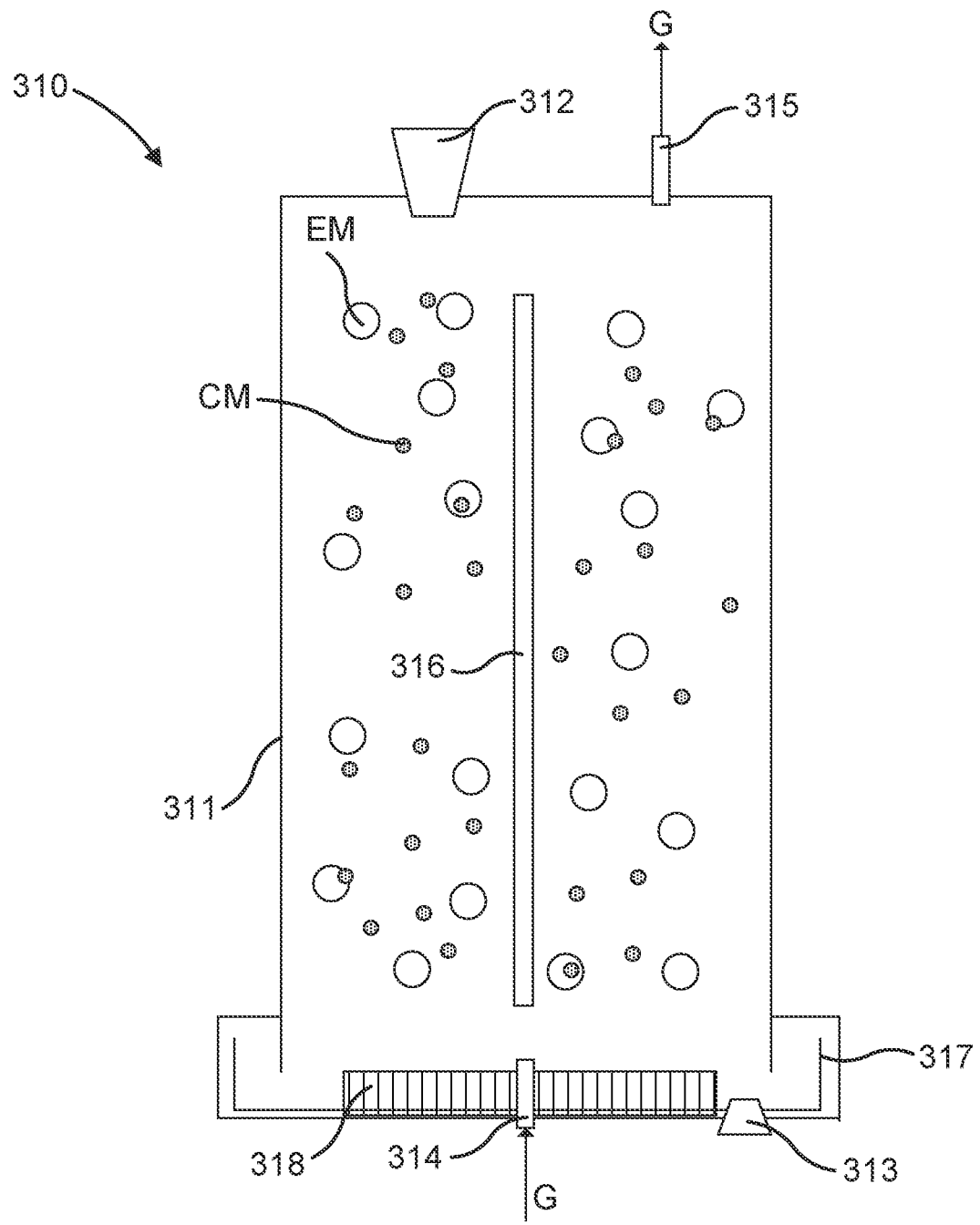
FIG. 9 is an illustration of a gravity dryer, according to an embodiment.

FIG. 9 is an illustration of a gravity dryer 310, according to an embodiment. As shown, the gravity dryer 310 includes a container 311, a powder loading port 312, a powder exhaust port 313, a gas inlet 314, a gas outlet 315, a vertical plate 316, a feeder tray 317, and a gas permeable floor 318. In some embodiments, the powder loading port 312, the powder exhaust port 313, the gas inlet 314, and the gas outlet 315 can be the same or substantially similar to the powder loading port 212, the powder exhaust port 231, the gas inlet 214, and the gas outlet 215, as described above with reference to FIG. 3. Thus, certain aspects of the powder loading port 312, the powder exhaust port 313, the gas inlet 314, and the gas outlet 315 are not described in greater detail herein. Active material AM and conductive material CM are shown passing through the gravity dryer 310, as well as gas G.

In some embodiments, the container 311 can have a cylindrical shape. A cylindrical shape and/or the inclusion of the vertical plate 316 can maintain a low but non-zero vertical solids stress on the powder inside the gravity dryer 310. Keeping a low, non-zero vertical solids stress on the powder inside the gravity dryer 310 can prevent the gas G from channeling. In other words, the gas G can begin to channel around the powder and not contribute to drying clusters of the powder. A cylindrical shape of the container 311 and/or the inclusion of the vertical plate 316 in the container 311 can aid in dispersion of the flow of the gas G to prevent channeling of the gas G and clustering of the powder.

The feeder tray 317 can be porous, such that the gas G flows through many pores on the feeder tray 317 into the container 311, rather than through a single orifice. The combination of the feeder tray 317 and the gas permeable floor 318 can aid in dispersing the gas G throughout the container 311. In some embodiments, the feeder tray 317 can have a circular shape.

Figure 10A:
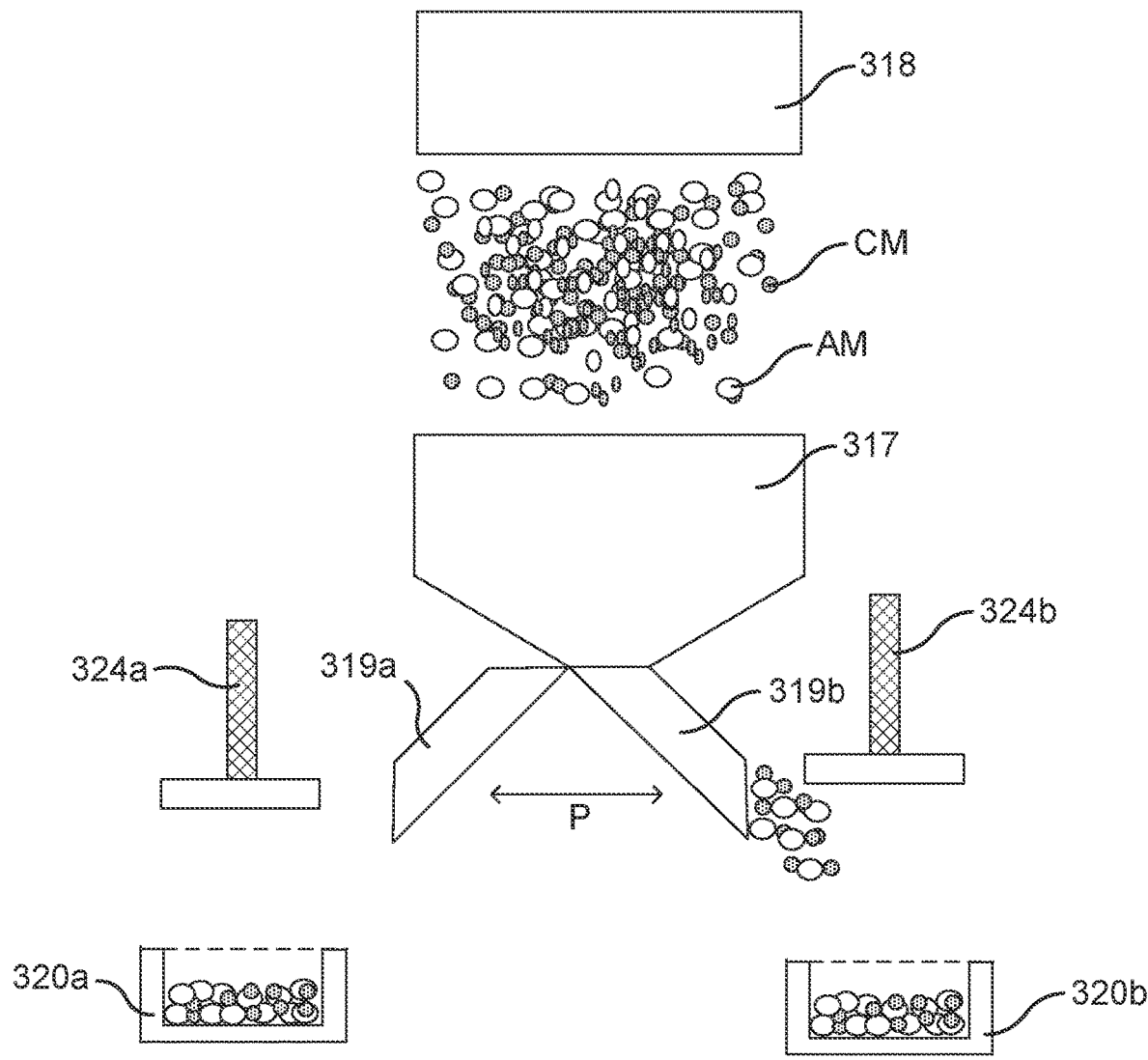
FIGS. 10A-10B are illustrations of components of a brick-forming system, according to an embodiment.
Figure 10B:
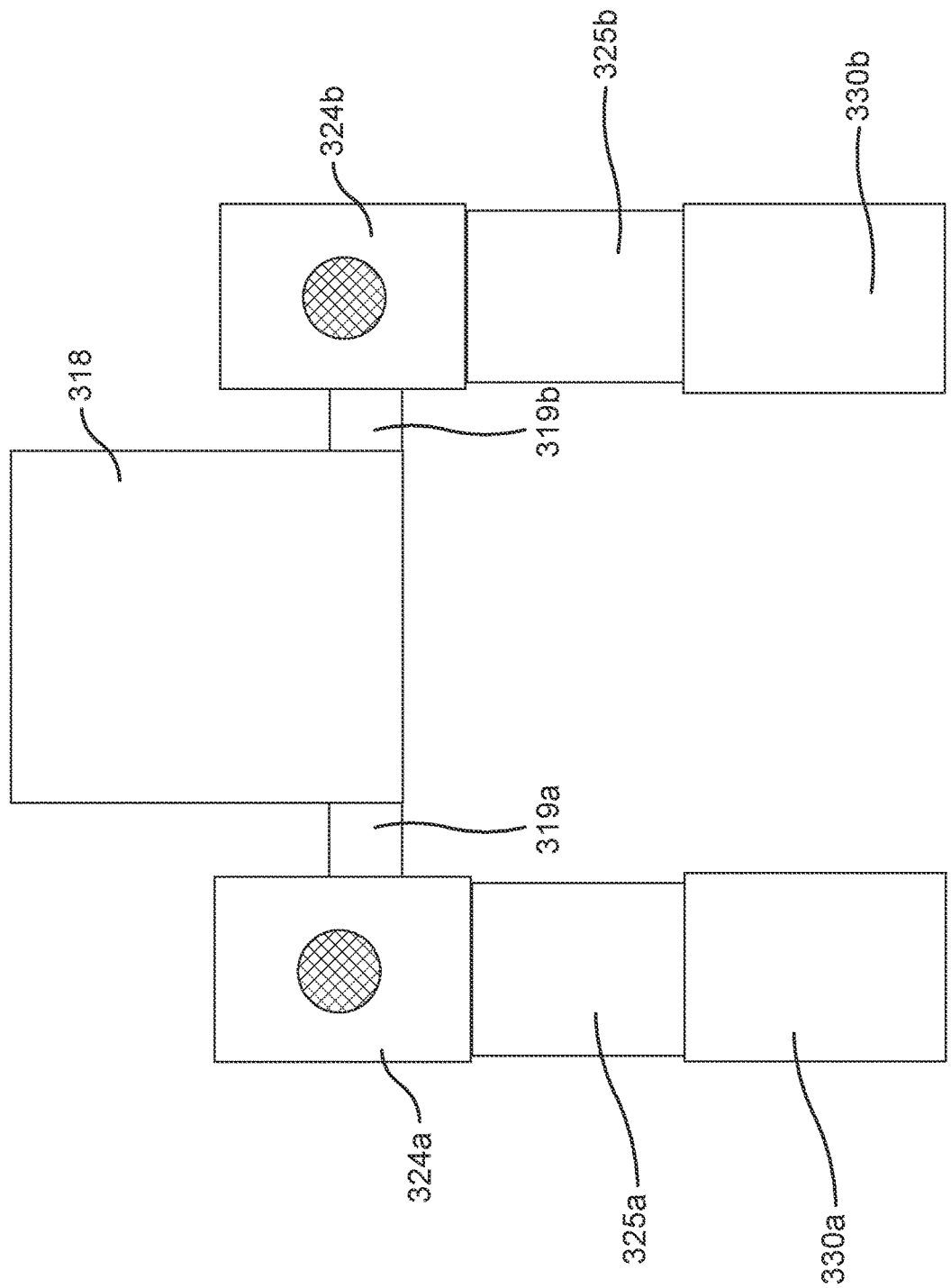

FIGS. 10A-10B are illustrations of components of a brick-forming system, according to an embodiment. FIG. 10A is a side view, while FIG. 10B is a top view of the components. As shown, the active material AM, the conductive material CM, and the electrolyte (not shown) pass from a mixer 318 to a hopper 317 after being mixed. In some embodiments, the mixer 318 can include a twin-screw extruder. In some embodiments, the mixer 318 can include a twin-screw kneader. From the hopper 317, the active material AM, the conductive material CM, and the electrolyte (active material AM, conductive material CM, and electrolyte collectively referred to herein as "semi-solid electrode material") passes through feeder 319a and/or feeder 319b (collectively referred to as feeders 319) to compressor 320a and/or compressor 320b (collectively referred to as compressors 320). In some embodiments, the compressors 320 can be brick-forming chambers, wherein the semi-solid electrode material can be pressed to form a semi-solid electrode brick. Once the semi-solid electrode material is in the compressors 320, brick-forming presses 324a, 324b (collectively referred to as brick-forming presses 324). As shown, the feeders 319 are adjustable and can move along line P to align either the feeder 319a or the feeder 319b with the hopper 317. The semi-solid electrode material flows to the compressor 320a via the feeder 319a and/or to the compressor 320b via the feeder 319b. In some embodiments, the semi-solid electrode material in the compressor 320a can be pressed by the brick-forming press 324a. In some embodiments, the semi-solid electrode material in the compressor 320b can be pressed by the brick-forming press 324b.

In some embodiments, the semi-solid electrode material can be subject a conductivity test at conductivity test stations 325a, 325b (collectively referred to as conductivity test stations 325). In some embodiments, the conductivity test can be performed with the semi-solid electrode material in the compressors 320. In some embodiments, the semi-solid electrode material can be removed from the compressors 320 prior to the conductivity test. After being subject to the conductivity test, the semi-solid electrode material can be fed to the cartridges 330a, 330b (collectively referred to as cartridges 330). In some embodiments, the cartridges 330 can be the same or substantially similar to the cartridge 230, as described above with reference to FIG. 5. Thus, certain aspects of the cartridges 330 are not described in greater detail herein.

FIGS. 11A-11F are illustrations of a compressor 420, according to an embodiment. Each of FIGS. 11A-11F show different portions of the brick forming process. As shown, the compressor 420 includes a container base 421, a container jacket 422, a sliding platform 423, and a piston 424. In some embodiments, the container jacket 422 and the piston 424 can be the same or substantially similar to the container 222 and the piston 224, as described above with reference to FIG. 4. Thus, certain aspects of the container jacket 422 and the piston 424 are not described in greater detail herein.

Figure 11B:
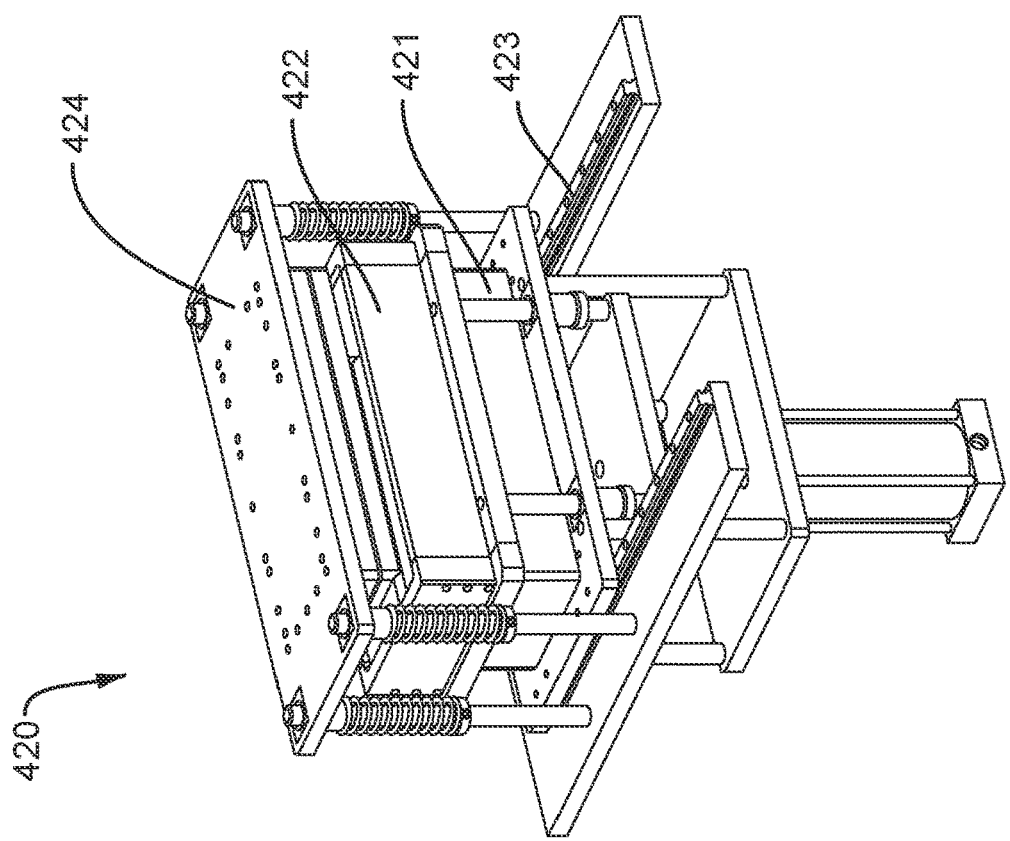
FIGS. 11A-11F are illustrations of a compressor, according to an embodiment.
Figure 11A:
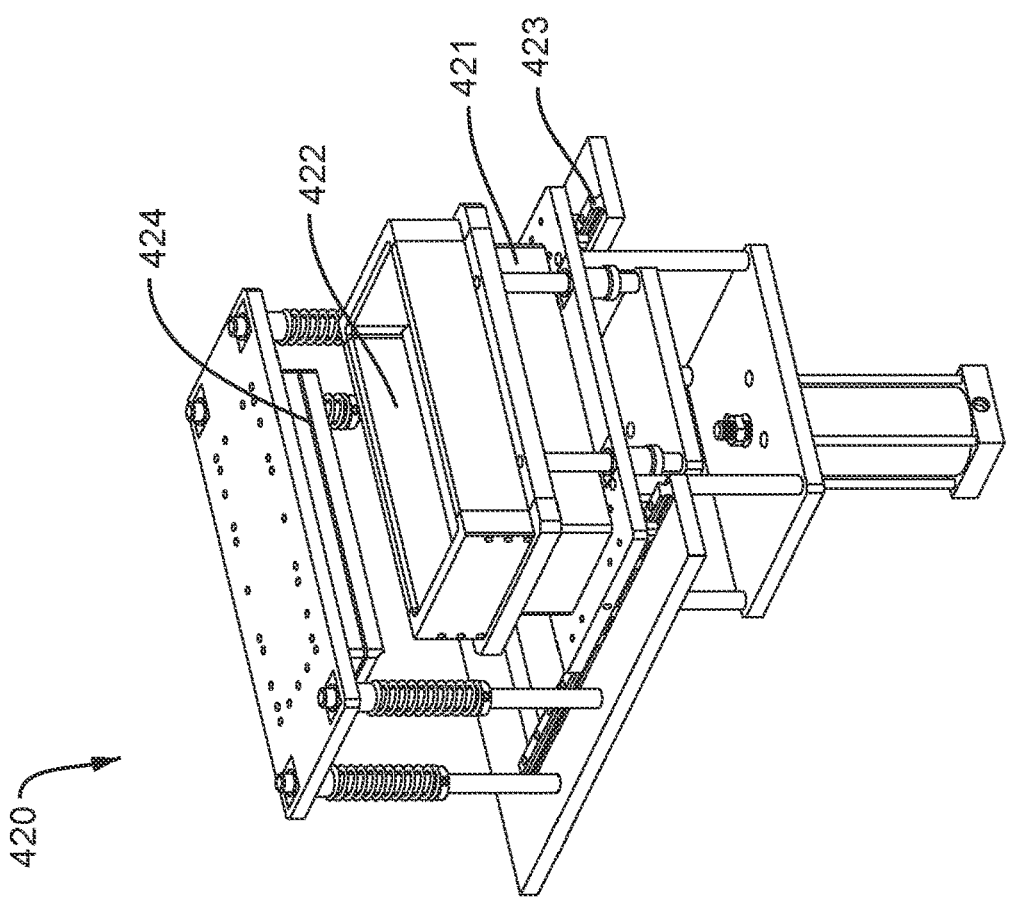

In use, as shown in FIG. 11A, the container jacket 422 is lifted. The container base 421 and the container jacket 422 are moved to a forward position along the sliding platform 423. While the container base 421 and the container jacket 422 are in the forward position, semi-solid electrode material can be loaded into the container jacket 422. In some embodiments, the forward position can be away from the piston 424 such that the piston 424 does not interfere with the loading of the semi-solid electrode material. The semi-solid electrode material is then loaded into the container jacket 422. After the semi-solid electrode material is loaded into the container jacket 422, the container base 421 and the container jacket 422 are slid into a back position along the sliding platform 423, as shown in FIG. 11B. In some embodiments, the back position can place the container base 421 and the container jacket 422 such that they are directly underneath the piston 424. After the container base 421 and the container jacket 422 are placed under the piston 424, the piston 424 is lowered, as shown in FIG. 11C. The piston 424 compresses the semi-solid electrode material to form a semi-solid electrode brick SSEB.

Figure 11D:
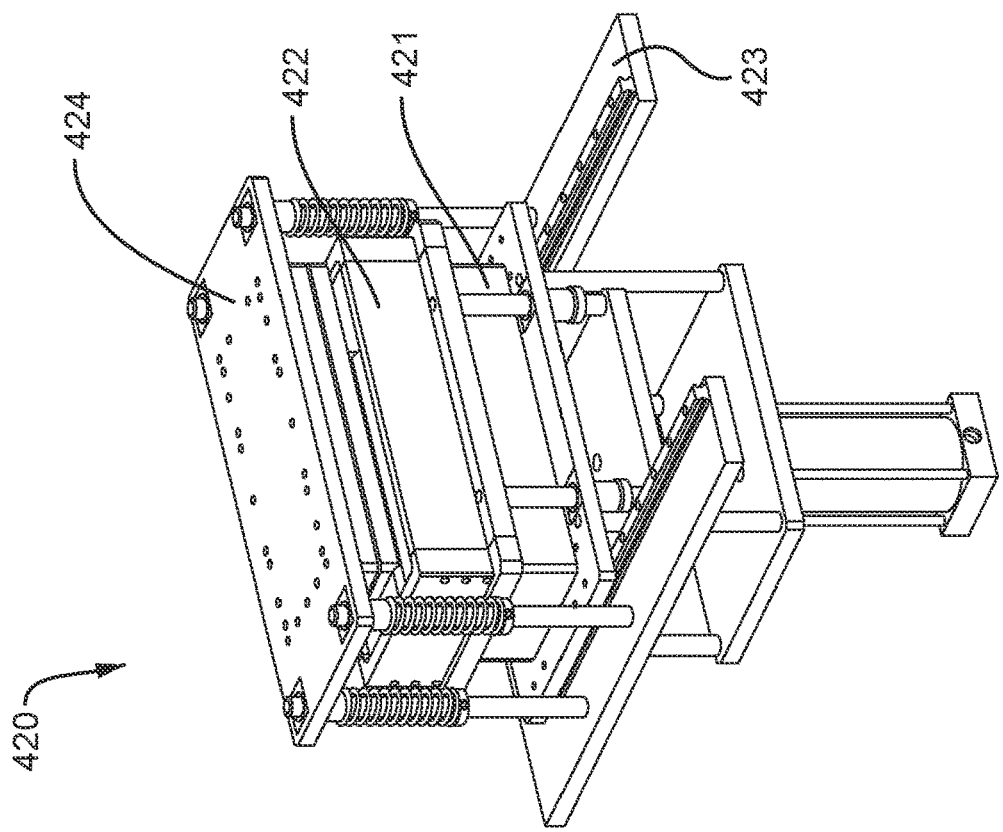
Figure 11C:
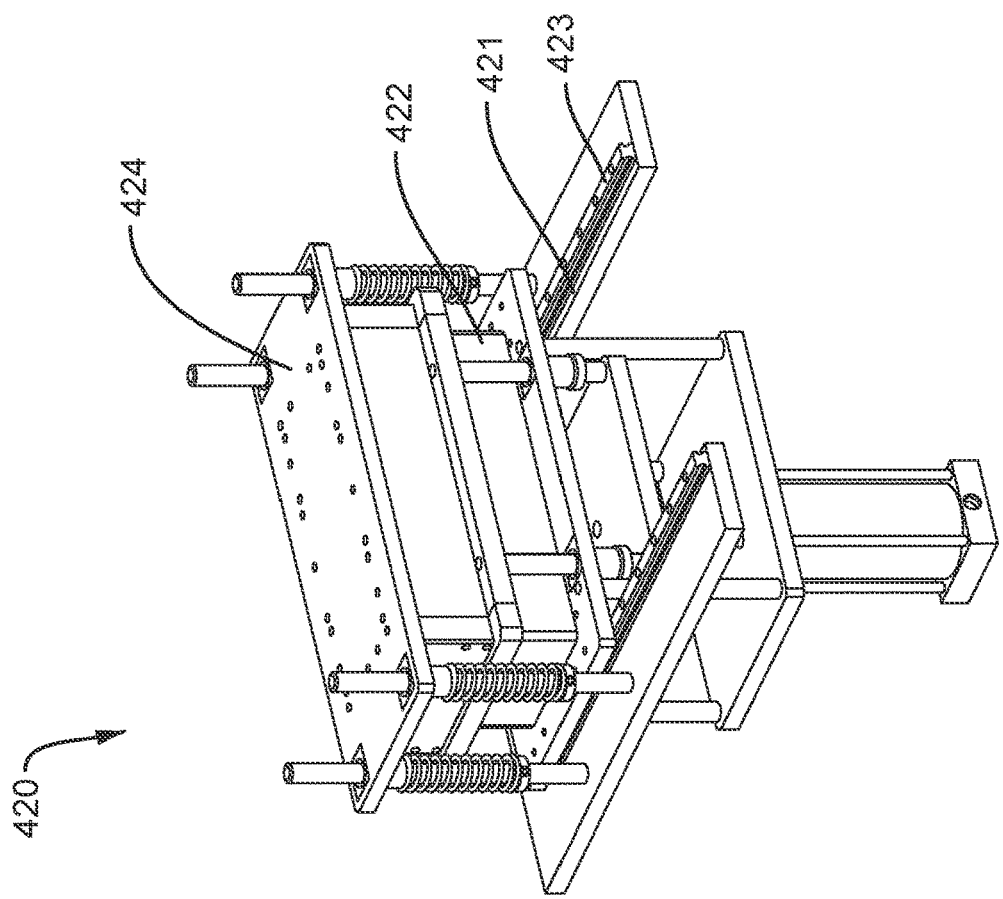
Figure 11F:
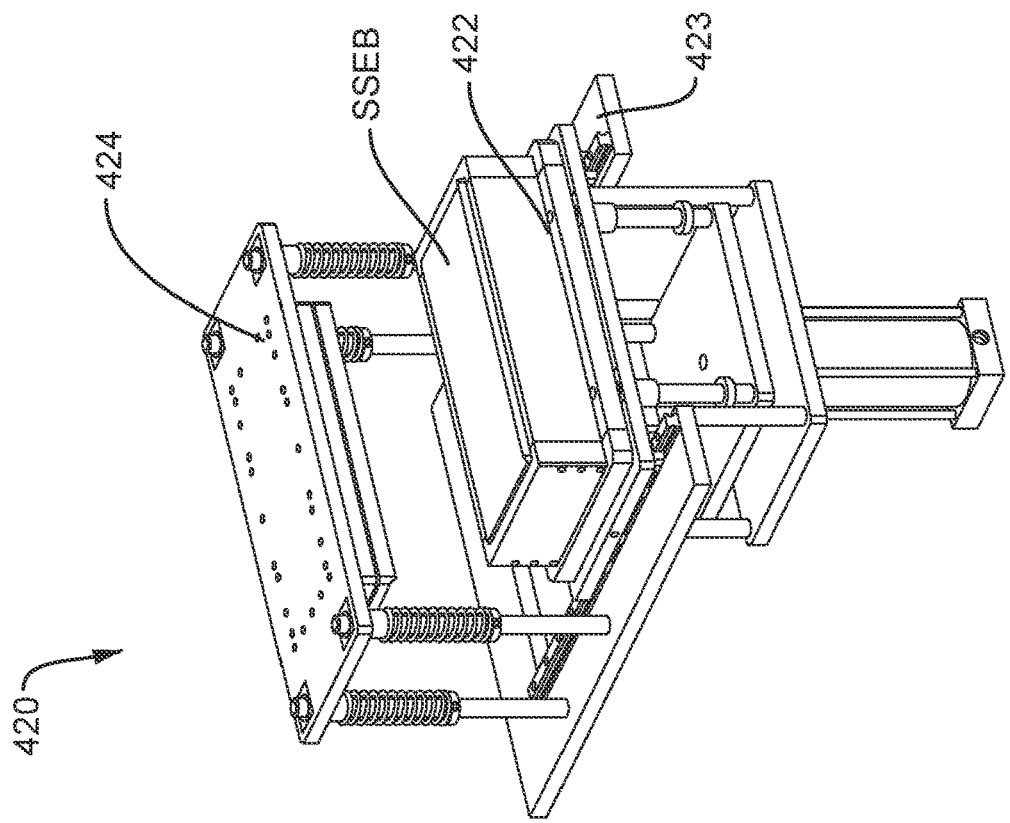
Figure 11E:
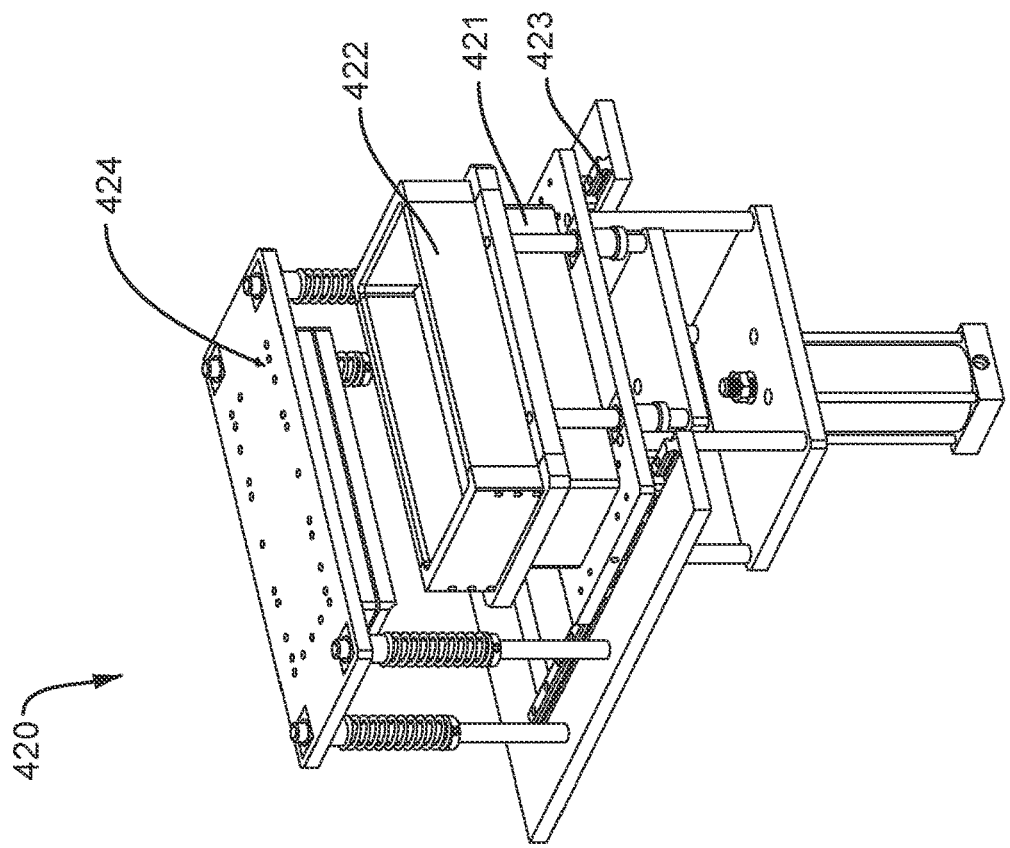

After the piston 424 has compressed the semi-solid electrode material to form the semi-solid electrode brick SSEB, the piston 424 is raised, as shown in FIG. 11D. After the piston 424 is raised, the container base 421 and the container jacket 422 are moved to the forward position along the sliding platform 423, as shown in FIG. 11E. The container jacket 422 is then lowered along an outside perimeter of the container base 421 to expose the semi-solid electrode brick SSEB, as shown in FIG. 11F. The semi-solid electrode brick SSEB can then be removed from the compressor 420 and placed into a cartridge (not shown).

FIGS. 12A-12E are illustrations of an extrusion system 430, according to an embodiment. As shown, the extrusion system 430 includes a dispenser 436 (e.g., a nozzle) and a rotating drum 441. The rotating drum 441 includes a plurality of pallets 442. The pallets 442 are coupled to a plate cam 443 via cam levers 445. In some embodiments, the plate cam 443 and the cam levers 445 rotate about a static anvil drum. The static anvil drum can be at or near the center of the rotating drum 441. A conveyor 448 is shown in contact with one or more of the pallets 442. FIG. 12A shows the pallets 442 near the dispenser 436 in an open position while FIG. 12B shows the pallets 442 near the dispenser 436 in a closed position. In use, a film and/or current collector material (not shown) can be placed on the conveyor 448 and advanced along the pallets 442 via the rotating drum 441. In some embodiments, a film and/or current collector material can act as the conveyor 448. In other words, the film and/or current collector material can move around the outside edge of the rotating drum 441 in the absence of a conveyor belt or other conveying device below the film and/or current collector. In some embodiments the film can be conveyed around the outside edge of the rotating drum 441. In some embodiments, the current collector material can be conveyed around the outside edge of the rotating drum 441. In some embodiments, the film and the current collector material can be conveyed around the outside edge of the rotating drum 441. By adjusting the pallets 442 from the open position to the closed position, the current collector can be pinched such that a portion of the film and/or current collector material is pinched between pallets 442. Semi-solid electrode material (not shown) can be dispensed from the dispenser 436 onto the current collector material. Upon advancement via the rotating drum 441, the pallets 442 can be separated again, leaving a current collector material with semi-solid electrodes separated from one another. In some embodiments, the pallets 442 can be attached or keyed together to absorb moments. In other words, the pallets 442 can collectively absorb a shock, rather than one pallet absorbing the shock. In some embodiments, the outer surface of the pallets 442 can be cylindrically precision ground.

In some embodiments, the cam levers 445 can control the positioning and timing of the pallets 442. In some embodiments, a pallet vacuum and/or chilled water can be fed through a multiple pass rotary union inside the rotating drum 441. In some embodiments, the pallets 442 can be ground on the rotating drum 441 to ensure height accuracy. In some embodiments, the position of each of the pallets 442 can be controlled by the plate cam 445 and cam levers 443, removing cumulative stack up error. In some embodiments, a film tucking mechanism can be included to synchronously tuck the current collector material and/or film between the pallets 442. In some embodiments, cylindrical supports provide stiffness to the pallets 442.

The size and breadth of the rotating drum 441 can make the rotating drum 441 robust and resistant to movement and deflection from outside forces (e.g., from casting or densification instrumentation) than a linear conveyance device (e.g., a flat belt). Additionally, the arch shape formed by adjacent pallets 442 can create a structural stability in the rotating drum 441 that can resist deflection. The anvil drum in the center of the rotating drum 441 can have a cylindrical shape, offering additional resistance to outside forces. Casting from the dispenser 436 can exert a substantial force (e.g., about 10 kN, about 20 kN, about 30 kN, about 40 kN, about 50 kN, about 60 kN, about 70 kN, about 80 kN, about 90 kN, or about 100 kN, inclusive of all values and ranges therebetween), and a conveyance device with a broad base can withstand a large amount of force. In some embodiments, the rotating drum 441 can have a diameter of at least about 5 cm, at least about 10 cm, at least about 15 cm, at least about 20 cm, at least about 25 cm, at least about 30 cm, at least about 35 cm, at least about 40 cm, at least about 45 cm, at least about 50 cm, at least about 55 cm, at least about 60 cm, at least about 65 cm, at least about 70 cm, at least about 75 cm, at least about 80 cm, at least about 85 cm, at least about 90 cm, at least about 95 cm, at least about 1 m, at least about 2 m, at least about 3 m, at least about 4 m, at least about 5 m, at least about 6 m, at least about 7 m, at least about 8 m, or at least about 9 m. In some embodiments, the rotating drum 441 can have a diameter of no more than about 10 m, no more than about 9 m, no more than about 8 m, no more than about 7 m, no more than about 6 m, no more than about 5 m, no more than about 4 m, no more than about 3 m, no more than about 2 m, no more than about 1 m, no more than about 95 cm, no more than about 90 cm, no more than about 85 cm, no more than about 80 cm, no more than about 75 cm, no more than about 70 cm, no more than about 65 cm, no more than about 60 cm, no more than about 55 cm, no more than about 50 cm, no more than about 45 cm, no more than about 40 cm, no more than about 35 cm, no more than about 30 cm, no more than about 25 cm, no more than about 20 cm, no more than about 15 cm, or no more than about 10 cm.

Combinations of the above-referenced diameters of the rotating drum 441 are also possible (e.g., at least about 5 cm and no more than about 10 m or at least about 20 cm and no more than about 40 cm), inclusive of all values and ranges therebetween. In some embodiments, the rotating drum 441 can have a diameter of about 5 cm, about 10 cm, about 15 cm, about 20 cm, about 25 cm, about 30 cm, about 35 cm, about 40 cm, about 45 cm, about 50 cm, about 55 cm, about 60 cm, about 65 cm, about 70 cm, about 75 cm, about 80 cm, about 85 cm, about 90 cm, about 95 cm, about 1 m, about 2 m, about 3 m, about 4 m, about 5 m, about 6 m, about 7 m, about 8 m, about 9 m, or about 10 m.

The robustness of the rotating drum 441 can aid in improving uniformity among electrodes produced. More specifically, the rotating drum 441 resists movement from the force of the casting. This resistance to movement can reduce the margin of error of the thickness of the electrode material when cast onto the conveyor 448. In other words, the deviation in thickness from one electrode to the next can be minimized. In some embodiments, the robustness of the rotating drum 441 and the uniformity of electrode thickness the rotating drum 441 affords can obviate a thickness inspection method (e.g., X-ray inspection) from the electrode production process. Keying or connecting the pallets 442 together can also improve this robustness. In some embodiments, the pallets 442 can be cylindrically ground to form the rotating drum 441. Upon manufacturing, the pallets 442 may have slight deviations in size from one pallet to another. The pallets 442 can be placed onto the plate cams 445, and then the rotating drum 441 can be cylindrically grinded to smooth the outer surface of the pallets 442. The smoothness of the outer surface of the pallets 442 can further improve uniformity of the electrodes cast onto the conveyor 448.

As shown, a gap G can be measured between the edges of adjacent pallets 442. In some embodiments, when the adjacent pallets 442 are not being pressed together, the gap G can be at least about 10 µm, at least about 20 µm, at least about 30 µm, at least about 40 µm, at least about 50 µm, at least about 60 µm, at least about 70 µm, at least about 80 µm, at least about 90 µm, at least about 100 µm, at least about 150 µm, at least about 200 µm, at least about 250 µm, at least about 300 µm, at least about 350 µm, at least about 400 µm, at least about 450 µm, at least about 500 µm, at least about 550 µm, at least about 600 µm, at least about 650 µm, at least about 700 µm, at least about 750 µm, at least about 800 µm, at least about 850 µm, at least about 900 µm, at least about 950 µm, at least about 1 mm, at least about 2 mm, at least about 3 mm, at least about 4 mm, at least about 5 mm, at least about 6 mm, at least about 7 mm, at least about 8 mm, or at least about 9 mm. In some embodiments, when the adjacent pallets 442 are not being pressed together, the gap G can be no more than about 1 cm, no more than about 9 mm, no more than about 8 mm, no more than about 7 mm, no more than about 6 mm, no more than about 5 mm, no more than about 4 mm, no more than about 3 mm, no more than about 2 mm, no more than about 1 mm, no more than about 950 µm, no more than about 900 µm, no more than about 850 µm, no more than about 800 µm, no more than about 750 µm, no more than about 700 µm, no more than about 650 µm, no more than about 600 µm, no more than about 550 µm, no more than about 500 µm, no more than about 450 µm, no more than about 400 µm, no more than about 350 µm, no more than about 300 µm, no more than about 250 µm, no more than about 200 µm, no more than about 150 µm, no more than about 100 µm, no more than about 90 µm, no more than about 80 µm, no more than about 70 µm, no more than about 60 µm, no more than about 50 µm, no more than about 40 µm, no more than about 30 µm, or no more than about 20 µm. Combinations of the above-referenced values of the gap G when the adjacent pallets 442 are not being pressed together are also possible (e.g., at least about 10 µm and no more than about 1 cm or at least about 100 µm and no more than about 1 mm), inclusive of all values and ranges therebetween. In some embodiments, when the adjacent pallets 442 are not being pressed together, the gap G can be about 10 µm, about 20 µm, about 30 µm, about 40 µm, about 50 µm, about 60 µm, about 70 µm, about 80 µm, about 90 µm, about 100 µm, about 150 µm, about 200 µm, about 250 µm, about 300 µm, about 350 µm, about 400 µm, about 450 µm, about 500 µm, about 550 µm, about 600 µm, about 650 µm, about 700 µm, about 750 µm, about 800 µm, about 850 µm, about 900 µm, about 950 µm, about 1 mm, about 2 mm, about 3 mm, about 4 mm, about 5 mm, about 6 mm, about 7 mm, about 8 mm, about 9 mm, or about 1 cm.

In some embodiments, when the adjacent pallets 442 are pressed together, the gap G can be no more than about 2 mm, no more than about 1 mm, no more than about 950 µm, no more than about 900 µm, no more than about 850 µm, no more than about 800 µm, no more than about 750 µm, no more than about 700 µm, no more than about 650 µm, no more than about 600 µm, no more than about 550 µm, no more than about 500 µm, no more than about 450 µm, no more than about 400 µm, no more than about 350 µm, no more than about 300 µm, no more than about 250 µm, no more than about 200 µm, no more than about 150 µm, no more than about 100 µm, no more than about 90 µm, no more than about 80 µm, no more than about 70 µm, no more than about 60 µm, no more than about 50 µm, no more than about 40 µm, no more than about 30 µm, no more than about 20 µm, no more than about 10 µm, no more than about 9 µm, no more than about 8 µm, no more than about 7 µm, no more than about 6 µm, no more than about 5 µm, no more than about 4 µm, no more than about 3 µm, no more than about 2 µm, or no more than about 1 µm.

In some embodiments, the rotating drum 441 can rotate at a rotational velocity of at least about 10 rpm, at least about 20 rpm, at least about 30 rpm, at least about 40 rpm, at least about 50 rpm, at least about 60 rpm, at least about 70 rpm, at least about 80 rpm, at least about 90 rpm, at least about 100 rpm, at least about 150 rpm, at least about 200 rpm, at least about 250 rpm, at least about 300 rpm, at least about 350 rpm, at least about 400 rpm, at least about 450 rpm, or at least about 500 rpm, inclusive of all values and ranges therebetween.

In some embodiments, the rotating drum 441 can include a vacuum therein, such that the vacuum can pull and tuck portions of the conveyor 448 (and current collector material disposed thereon) into the rotating drum 441, as shown in FIG. 12C. The vacuum tucking can pull portions of the conveyor 448 and the current collector material thereon inward to facilitate tucking of the current collector. Inducing tucking from within the rotating drum 441 can aid in preventing contamination of the electrode material dispensed on the current collector material. More specifically, a tucking arm or a tucking finger, if not timed just right, can contact electrode material disposed on the current collector material. This electrode material can become deposited on the tucking arm or the tucking finger. This deposited electrode material can contaminate later electrode materials that pass over the rotating drum 441. Including a vacuum in the rotating drum 441 can prevent a piece of material from contacting and contaminating other materials. Additionally, the vacuum inside the rotating drum 441 can aid in tucking the conveyor 448 and the current collector material deeper than a tucking arm or a tucking finger. The rotating drum 441 can move at high speeds (e.g., about 30 rpm, about 40 rpm, about 50 rpm, about 60 rpm, about 70 rpm, about 80 rpm, about 90 rpm, or about 100 rpm, inclusive of all values and ranges therebetween). These high speeds can make it difficult for a tucking arm or a tucking finger to precisely target and penetrate the spaces between the pallets 442 deeply enough such that the conveyor 448 and the current collector are fully tucked between the pallets.

In some embodiments, the tucking of the conveyor 448 can be time-staggered. In other words, the plate cams 445 can cause gaps to open and close between the pallets 442 over a relatively long time period. More specifically, two adjacent pallets 442 can travel around a significant portion of the outside edge of the rotating drum 441 while coupled together, before separating from each other. This time-staggered approach can allow for a longer period of time for the electrode material to be dispensed onto a tucked current collector material than if the pallets are simply tucked for a brief period of time (e.g., the length of time the rotating drum 441 needs to travel a distance of the width of one pallet 442). In some embodiments, adjacent pallets 442 can be coupled together for at least about 10%, at least about 15%, at least about 20%, at least about 25%, at least about 30%, at least about 35%, at least about 40%, at least about 45%, or at least about 50% of a full rotation around the center of the rotating drum 441. In some embodiments, one or more barrel cams can be used to execute the time-staggered tucking of the conveyor 448.

As shown in FIGS. 12A-12C, the dispenser 436 casts the electrode material vertically. In other words, the dispenser 436 casts in a direction perpendicular to the ground when the conveyor 448 is near its highest point on the rotating drum. In some embodiments, the dispenser 436 can cast horizontally (i.e., in a direction parallel to the ground). In some embodiments, the dispenser 436 can cast horizontally on a side of the conveyor 448, as shown in FIG. 12D. FIG. 12D shows angles relative to the vertical plane at the top of the rotating drum 441, for reference (0 degrees, 90 degrees, 180 degrees, 270 degrees. In some embodiments, the dispenser 436 can cast at an angle of about 5 degrees, about 10 degrees, about 15 degrees, about 20 degrees, about 25 degrees, about 30 degrees, about 35 degrees, about 40 degrees, about 45 degrees, about 50 degrees, about 55 degrees, about 60 degrees, about 65 degrees, about 70 degrees, about 75 degrees, about 80 degrees, about 85 degrees, about 90 degrees, about 95 degrees, about 100 degrees, about 105 degrees, about 110 degrees, about 115 degrees, about 120 degrees, about 125 degrees, about 130 degrees, about 135 degrees, about 140 degrees, about 145 degrees, about 150 degrees, about 155 degrees, about 160 degrees, about 165 degrees, about 170 degrees, about 175 degrees, about 180 degrees, about 185 degrees, about 190 degrees, about 195 degrees, about 200 degrees, about 205 degrees, about 210 degrees, about 215 degrees, about 220 degrees, about 225 degrees, about 230 degrees, about 235 degrees, about 240 degrees, about 245 degrees, about 250 degrees, about 255 degrees, about 260 degrees, about 265 degrees, about 270 degrees, about 275 degrees, about 280 degrees, about 285 degrees, about 290 degrees, about 295 degrees, about 300 degrees, about 305 degrees, about 310 degrees, about 315 degrees, about 320 degrees, about 325 degrees, about 330 degrees, about 335 degrees, about 340 degrees, about 345 degrees, about 350 degrees, or about 355 degrees relative to the vertical plane at the top of the rotating drum 441, inclusive of all values and ranges therebetween.

In some embodiments, the dispenser 436 can move to control casting gaps between the dispenser 436 and the conveyor 448 to a precision of less than 10 µm, less than 9 µm, less than 8 µm, less than 7 µm, less than 6 µm, less than 5 µm less than 4 µm, less than 3 µm, less than 2 µm, or less than 1 µm. In some embodiments, the gap between the dispenser 436 and the conveyor 448 can be adjusted (e.g., via a computer algorithm controlling movement of the dispenser 436) at distance intervals traveled by the conveyor 448. For example, the dispenser 436 can be adjusted once for every 10 mm the conveyor 448 travels. These quick adjustments can aid in creating uniformity in the thickness of resulting electrodes. In some embodiments, the position of the dispenser 448 relative to the can be adjusted once for about every 1 mm, about every 2 mm, about every 3 mm, about every 4 mm, about every 5 mm, about every 6 mm, about every 7 mm, about every 8 mm, about every 9 mm, about every 10 mm, about every 11 mm, about every 12 mm, about every 13 mm, about every 14 mm, about every 15 mm, about every 16 mm, about every 17 mm, about every 18 mm, about every 19 mm, about every 20 mm, about every 25 mm, about every 25 mm, about every 30 mm, about every 35 mm, about every 40 mm, about every 45 mm, or about every 50 mm the conveyor 448 travels, inclusive of all values and ranges therebetween.

As shown in FIG. 12D, the conveyor 448 circumnavigates around the outside edge of the rotating drum 441. In some embodiments, the conveyor 448 can have a current collector material (not shown) disposed thereon. In some embodiments, the current collector material can circumnavigate around the outside edge of the rotating drum 441 without the conveyor 448.

As shown in FIG. 12D, the conveyor 448 enters the rotating drum 441 at the bottom of the drum (i.e., at about 180 degrees, relative to the vertical plane at the top of the rotating drum 441). In some embodiments, the conveyor 448 can enter the rotating drum 441 at an angle of about 5 degrees, about 10 degrees, about 15 degrees, about 20 degrees, about 25 degrees, about 30 degrees, about 35 degrees, about 40 degrees, about 45 degrees, about 50 degrees, about 55 degrees, about 60 degrees, about 65 degrees, about 70 degrees, about 75 degrees, about 80 degrees, about 85 degrees, about 90 degrees, about 95 degrees, about 100 degrees, about 105 degrees, about 110 degrees, about 115 degrees, about 120 degrees, about 125 degrees, about 130 degrees, about 135 degrees, about 140 degrees, about 145 degrees, about 150 degrees, about 155 degrees, about 160 degrees, about 165 degrees, about 170 degrees, about 175 degrees, about 180 degrees, about 185 degrees, about 190 degrees, about 195 degrees, about 200 degrees, about 205 degrees, about 210 degrees, about 215 degrees, about 220 degrees, about 225 degrees, about 230 degrees, about 235 degrees, about 240 degrees, about 245 degrees, about 250 degrees, about 255 degrees, about 260 degrees, about 265 degrees, about 270 degrees, about 275 degrees, about 280 degrees, about 285 degrees, about 290 degrees, about 295 degrees, about 300 degrees, about 305 degrees, about 310 degrees, about 315 degrees, about 320 degrees, about 325 degrees, about 330 degrees, about 335 degrees, about 340 degrees, about 345 degrees, about 350 degrees, or about 355 degrees relative to the vertical plane at the top of the rotating drum 441, inclusive of all values and ranges therebetween.

As shown in FIG. 12D, the conveyor 448 exits the rotating drum 441 at the top of the drum (i.e., at about 0 degrees, relative to the vertical plane at the top of the rotating drum 441). In some embodiments, the conveyor 448 can exit the rotating drum 441 at an angle of about 5 degrees, about 10 degrees, about 15 degrees, about 20 degrees, about 25 degrees, about 30 degrees, about 35 degrees, about 40 degrees, about 45 degrees, about 50 degrees, about 55 degrees, about 60 degrees, about 65 degrees, about 70 degrees, about 75 degrees, about 80 degrees, about 85 degrees, about 90 degrees, about 95 degrees, about 100 degrees, about 105 degrees, about 110 degrees, about 115 degrees, about 120 degrees, about 125 degrees, about 130 degrees, about 135 degrees, about 140 degrees, about 145 degrees, about 150 degrees, about 155 degrees, about 160 degrees, about 165 degrees, about 170 degrees, about 175 degrees, about 180 degrees, about 185 degrees, about 190 degrees, about 195 degrees, about 200 degrees, about 205 degrees, about 210 degrees, about 215 degrees, about 220 degrees, about 225 degrees, about 230 degrees, about 235 degrees, about 240 degrees, about 245 degrees, about 250 degrees, about 255 degrees, about 260 degrees, about 265 degrees, about 270 degrees, about 275 degrees, about 280 degrees, about 285 degrees, about 290 degrees, about 295 degrees, about 300 degrees, about 305 degrees, about 310 degrees, about 315 degrees, about 320 degrees, about 325 degrees, about 330 degrees, about 335 degrees, about 340 degrees, about 345 degrees, about 350 degrees, or about 355 degrees relative to the vertical plane at the top of the rotating drum 441, inclusive of all values and ranges therebetween.

As shown in FIG. 12D, the conveyor 448 exits the rotating drum 441 about 180 degrees from where it entered the rotating drum 441. In other words, the conveyor 448 contacts or osculates the rotating drum 441 for about 180 degrees. In some embodiments, the conveyor 448 can contact the rotating drum 441 for about 5 degrees, about 10 degrees, about 15 degrees, about 20 degrees, about 25 degrees, about 30 degrees, about 35 degrees, about 40 degrees, about 45 degrees, about 50 degrees, about 55 degrees, about 60 degrees, about 65 degrees, about 70 degrees, about 75 degrees, about 80 degrees, about 85 degrees, about 90 degrees, about 95 degrees, about 100 degrees, about 105 degrees, about 110 degrees, about 115 degrees, about 120 degrees, about 125 degrees, about 130 degrees, about 135 degrees, about 140 degrees, about 145 degrees, about 150 degrees, about 155 degrees, about 160 degrees, about 165 degrees, about 170 degrees, about 175 degrees, about 180 degrees, about 185 degrees, about 190 degrees, about 195 degrees, or about 200 degrees, inclusive of all values and ranges therebetween.

The entry point of the conveyor 448 can be selected such that the conveyor 448 have enough space to flatten onto the outside surface of the pallets 442. Additionally, the greater the angle between the entry point and the exit point of the conveyor 448, the more space (and therefore time) the dispenser 436 has to cast the electrode material onto the conveyor 448. As shown, one dispenser 436 is casting electrode material onto the conveyor 448. In some embodiments, the extrusion system 430 can include multiple dispensers casting electrode material onto the conveyor 448.

FIG. 12D includes a section E, which is shown in greater detail in FIG. 12E. FIG. 12E shows a close-up view of two pallets 442 pressed together and pinching the conveyor 448. As shown, the conveyor 448 is tucked between the pallets 442. Each of the pallets 442 includes gaskets or deformable members 444 disposed on the outside edges of the pallets 442. The gaskets 444 can increase friction between adjacent pallets 442 in order to prevent the pallets 442 from sliding relative to each other. In some embodiments, the pallets 442 can be composed of stainless steel, aluminum, or similar metals or materials with smooth surfaces. If the smooth surfaces of the pallets 442 contact each other, they can move laterally (i.e., toward the center of the rotating drum 441 and away from the center of the rotating drum 441), relative to each other. In other words, the gaskets 444 prevent metal-to-metal contact and the sliding that can result therefrom. Additionally, the gaskets 444 can ensure that the pallets 442 are gripping the conveyor 448, current collector, and/or any film material being conveyed around the rotating drum 441 along the entire depth of the pallets 444. In some embodiments, the gaskets 444 can include O-rings. In some embodiments, the gaskets 444 can be composed of a deformable material, an elastomeric material, natural rubber, silicone rubber, neoprene rubber, neoprene sponge, cork, or any combination thereof. In some embodiments, the gaskets 444 can include a seal or a sealing member. This can prevent leaks of electrolyte or semi-solid electrode material into the pinched portion of the current collector and/or film material during production, while metal-to-metal contact may not be as thorough.

Figure 13:
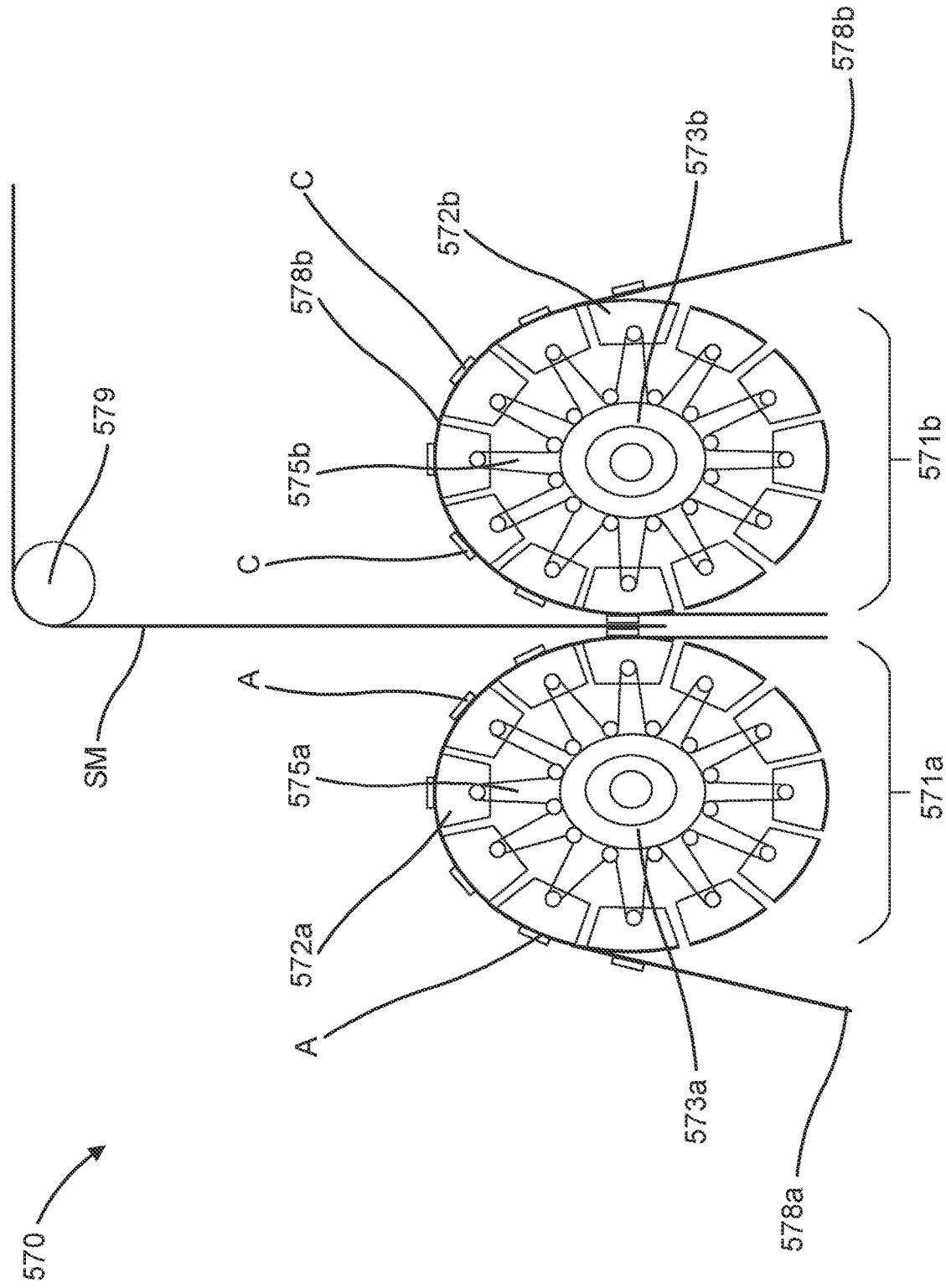
FIG. 13 shows an adjoining system with a set of rotating drums for assembly of an electrochemical cell, according to an embodiment.

FIG. 13 shows an adjoining system 570 with a set of rotating drums 571a, 571b for assembly of an electrochemical cell, according to an embodiment. FIG. 13 depicts an anode rotating drum 571a and a cathode rotating drum 571b. As shown, the anode rotating drum 571a includes pallets 572a, cam levers 573a, plate cams 575a, and a conveyor 578a with anodes A disposed thereon. As shown, the cathode rotating drum 571b includes pallets 572b, cam levers 573b, plate cams 575b, and a conveyor 578b with cathodes C disposed thereon. A separator material SM is dispensed between the anodes A and the cathodes C. The separator material SM is facilitated via a separator roller. In some embodiments, the rotating drums 571a, 571c, the pallets 572a, 572b, the cam levers 573a, 573b, the plate cams 575a, 575b, and the conveyors 578a, 578b can be the same or substantially similar to the rotating drum 441, the pallets 442, the cam levers 443, the plate cams 445, and the conveyors 448, as described above with reference to FIGS. 12A-12C. Thus, certain aspects of the rotating drums 571a, 571c, the pallets 572a, 572b, the cam levers 573a, 573b, the plate cams 575a, 575b, and the conveyors 578a, 578b are not described in greater detail herein. In some embodiments, casting can be performed on the rotating drums 571a, 571b. In some embodiments, casting can be performed on one or more different rotating drums from the rotating drums 571a, 571b.

As shown, the anodes A and the cathodes C are aligned with a portion of the separator material SM disposed therebetween. The cam levers 573a, 573b and the plate cams 575a, 575b can induce movements of the pallets 572a, 572b relative to the rest of the rotating drums 571a, 571b, such that the anodes A and the cathodes C can line up properly. This increases the margin of error for casting of the anodes A onto the pallets 572a and the cathodes C onto the pallets 572c. In other words, if the current collector material (not shown) on which the anodes A and the cathodes C are placed are moving out of phase with each other, the movement of the pallets 572a, 572b can aid in correcting this discrepancy. More specifically, errors in timing of dispensing the anodes A and the cathodes C can be compensated by inducing movements in the pallets 572a, 572b, such that the anodes A and the cathodes C can line up properly when producing the electrochemical cell. In some embodiments, the anode rotating drum 571*a* and/or the cathode rotating drum 571*b* can include a vacuum disposed therein. In some embodiments, the vacuum can aid in tucking the current collector material between the pallets 572*a*, 572*b*. In some embodiments, the vacuum can perpetuate movement of the pallets 572*a*, 572*b*, relative to the rest of the rotating drums 571*a*, 571*b*. In other words, an inward force exerted on the conveyors 578*a* and the current collector material disposed thereon can exert a force on the pallets 572*a* on the rotating drum 571*a* and push them apart from each other. Similarly, an inward force exerted on the conveyors 578*b* and the current collector material disposed thereon can exert a force on the pallets 572*b* on the rotating drum 571*b* and push them apart from each other.

In some embodiments, the movements of the pallets 572*a*, 572*b* can align the anodes A and the cathodes C in the formed electrochemical cell to a margin of error of less than about 1 mm. In other words, a center line running through the anode A can be less than about 1 mm from a center line running through the cathode C. In some embodiments, the margin of error can be less than about 900 µm, less than about 800 µm, less than about 700 µm, less than about 600 µm, less than about 500 µm, less than about 400 µm, less than about 300 µm, less than about 200 µm, or less than about 100 µm, inclusive of all values and ranges therebetween.

In some embodiments, fiducials or reference marks can be added to the anodes A, the cathodes C, the current collector material, and/or the film. The use of fiducials can aid in easing the alignment process of the anodes A and the cathodes C. For example, an imaging device (e.g., X-ray, CT machine, ultrasound) can detect fiducials on the anodes A and the cathodes C and can communicate with the plate cams 575*a*, 575*b* to adjust their positioning so that the anodes A and the cathodes C line up properly when brought together to form the electrochemical cell. Fiducials can also allow for a single-side inspection of completed electrochemical cells or completed electrodes with multiple layers. For example, if a current collector of a completed electrochemical cell has a fiducial visible on the outside, inspection of that fiducial can be sufficient to confirm proper alignment of the electrodes and other components of the electrochemical cell, because they would have been aligned earlier in the production process.

Figure 14A:
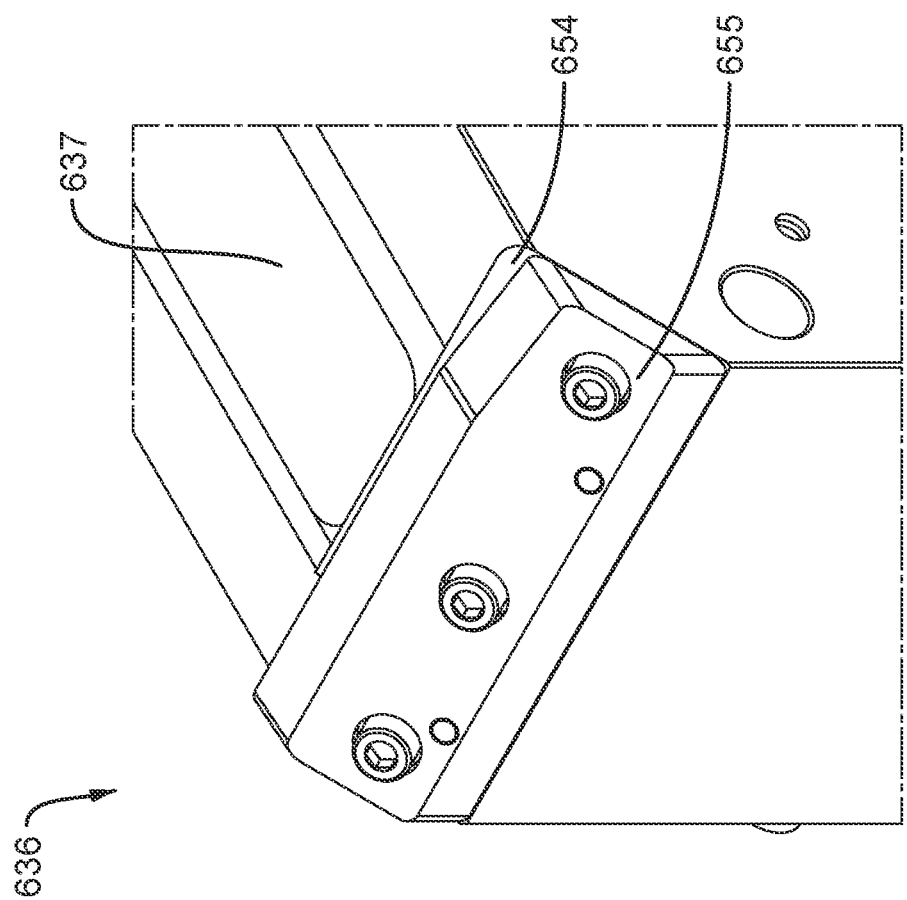
Figure 14C:
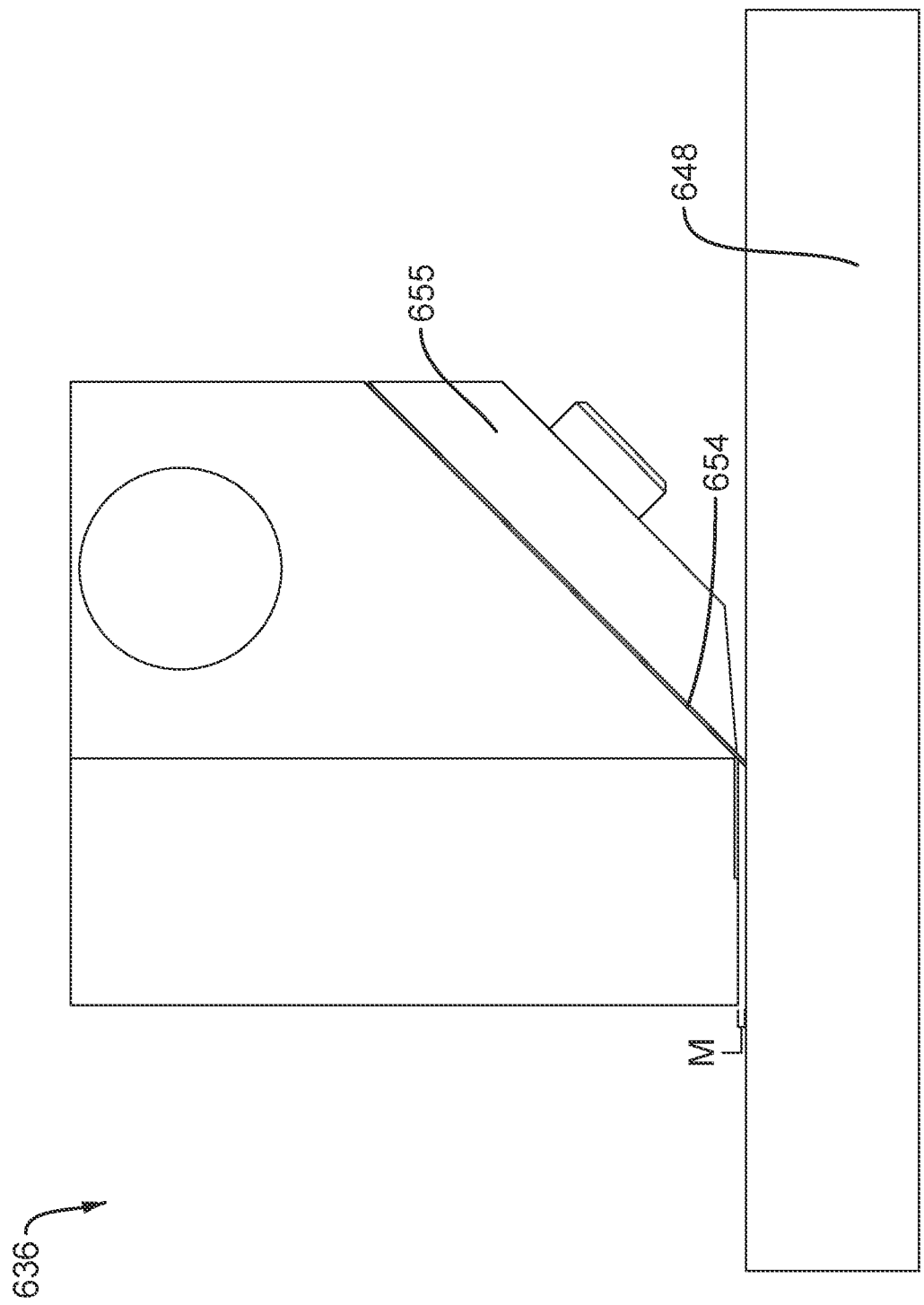

FIGS. 14A-14C show a nozzle 636, and various components thereof, according to an embodiment. The nozzle 636 includes a nozzle opening 637, a side plate 654, and a clamp 655. In some embodiments, the nozzle opening 637 and the side plate 654 can be the same or substantially similar to the nozzle opening 237 and the side plates 254, as described above with reference to FIG. 5. Thus, certain aspects of the nozzle opening 637 and the side plate 654 are not described in greater detail herein. FIG. 14A shows a view of a corner of the nozzle 636 with the side plate 654 affixed thereto via the clamp 655. FIG. 14B shows an exploded view of the side plate 654 and the clamp 655 detached from the nozzle 636. FIG. 14C shows a side view of the nozzle 636, showing the side plate 634 making contact with and applying a force to the conveyor 648, thereby forming a seal to prevent escape of semi-solid electrode material out the side of the nozzle 636.

As shown in FIG. 14C, the side plate 654 extends beyond a bottom edge of the nozzle 636 by a margin M. In some embodiments, the margin M can be at least about 0.5 mm, at least about 0.6 mm, at least about 0.7 mm, at least about 0.8 mm, or at least about 0.9 mm. In some embodiments, the margin M can be no more than about 1 mm, no more than about 0.9 mm, no more than about 0.8 mm, no more than about 0.7 mm, or no more than about 0.6 mm. Combinations of the above-referenced ranges for the margin M are also possible (e.g., at least about 0.5 mm and no more than about 1 mm or at least about 0.6 mm and no more than about 0.8 mm), inclusive of all values and ranges therebetween. In some embodiments, the margin M can be about 0.5 mm, about 0.6 mm, about 0.7 mm, about 0.8 mm, about 0.9 mm, or about 1 mm.

Figure 15:
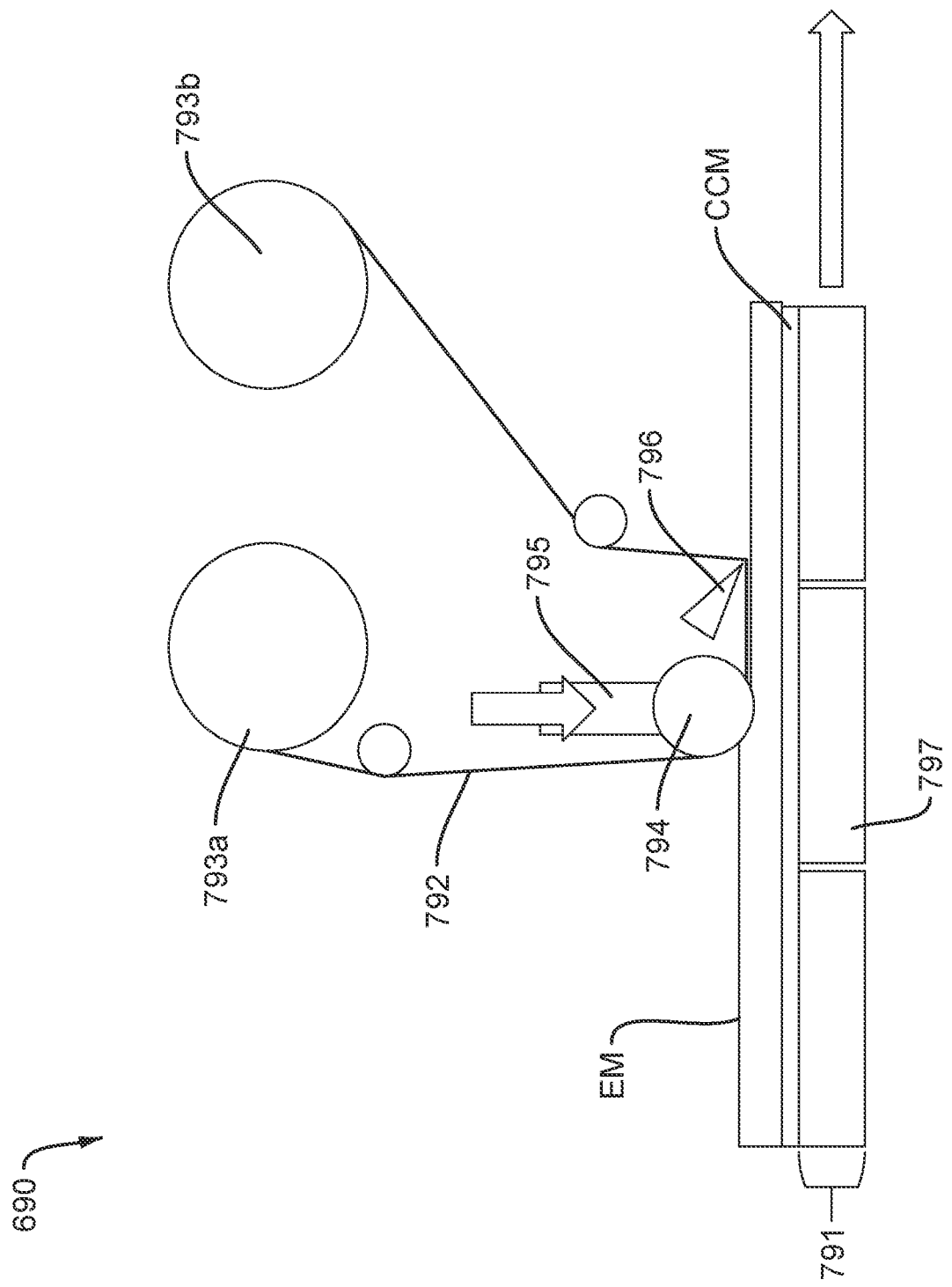
FIG. 15 is an illustration of a densification station, according to an embodiment.

FIG. 15 is an illustration of a densification station 790, according to an embodiment. In some embodiments, the densification station 790 can employ any of the electrode densification methods described in the '192 publication. As shown, the densification station 790 includes a conveyor 791 with pallets 797, an absorptive material 792, material spools 793*a*, 793*b* (collectively referred to as material spools 793), a contact spool 794, a contact spool press 795, and a tucking arm 796. In use, an electrode material EM is conveyed along the conveyor 791 while the absorptive material 792 is propelled adjacent to the conveyor 791 and in contact with the electrode material EM. As shown, the electrode material EM is disposed on a current collector material CCM. In some embodiments, the current collector material CCM is disposed on a film (not shown). The absorptive material 792 is fed from the material spool 793*a* and is received by the material spool 793*b*. The absorptive material 792 contacts the contact spool 794 and the tucking arm 796. The contact spool 794 is positioned above the conveyor 791 to place the absorptive material 792 in contact with the electrode material EM. A portion of the liquid in the electrode material EM transfers to the absorptive material 792. The contact spool press 795 can adjust the position of the contact spool 794 in relation to the conveyor. For example, if a larger amount of densification and/or liquid absorption is desired, the contact spool press 795 can push down on the contact spool 794 with an increased force. In some embodiments, the horizontal distance between the contact spool 794 and the tucking arm 796 can be adjustable. The horizontal distance between the contact spool 794 and the tucking arm 796 can be adjusted based on how much contact area between the absorptive material 792 and the electrode material EM is desired. As shown, the densification station 790 is included in the cathode casting station. In some embodiments, the anode casting station can include a densification station. In some embodiments, both the anode casting station and the cathode casting station can include densification stations.

As shown, the densification station 790 is implemented on a flat surface. In some embodiments, the densification station 790 can be implemented on a rotating drum (e.g., the rotating drum 441, as described above with reference to FIGS. 12A-12E). As noted above, rotating drums can be constructed broadly and robustly such that they can withstand forces imposed from densifying. In some embodiments, the film and/or the current collector material CCM can be tucked between the pallets 797 during the densifying. In some embodiments, the densifying can be performed on the same rotating drum as the casting. In other words, the densifying can be performed on the electrode material EM immediately after the electrode material EM is cast.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure. Where methods and steps described above indicate certain events occurring in a certain order, those of ordinary skill in the art having the benefit of this disclosure would recognize that the ordering of certain steps may be modified and such modification are in accordance with the variations of the invention. Additionally, certain of the steps may be performed concurrently in a parallel process when possible, as well as performed sequentially as described above. The embodiments have been particularly shown and described, but it will be understood that various changes in form and details may be made.

The invention claimed is:

1. A method, comprising:
rotating a current collector material around a plurality of pallets disposed around an outside edge of a rotating drum, the rotating drum including a plate cam, the plurality of pallets coupled to the plate cam, the plurality of pallets including a first pallet and a second pallet;
drawing a vacuum on the current collector material from within the rotating drum to draw a portion of the current collector material into a gap between the first pallet and the second pallet;
frictionally engaging the portion of the current collector between an edge of the first pallet and an edge of the second pallet;
dispensing a semi-solid electrode material onto the first pallet and the second pallet; and
separating the edge of the first pallet from the edge of the second pallet to form two discrete portions of electrode material.

2. The method of claim 1, wherein the current collector material osculates about 90 degrees to about 180 degrees of the rotating drum.

3. The method of claim 1, wherein a film is disposed between the current collector material and the outside edge of the rotating drum.

4. The method of claim 1, wherein frictionally engaging the portion of the current collector is via movement of a first cam lever coupled to the first pallet and the plate cam and a second cam lever coupled to the second pallet and the plate cam.

5. The method of claim 1, wherein the first pallet and/or the second pallet include a deformable member to increase friction between the first pallet and the second pallet.

6. The method of claim 5, wherein the deformable member includes an O-ring.

7. The method of claim 1, wherein the dispensing is approximately horizontal and in a direction tangential to the movement of the current collector material.

8. The method of claim 1, wherein the dispensing is approximately vertical and in a direction tangential to the movement of the current collector material.

9. The method of claim 1, further comprising:
laser cutting a portion of the current collector material between a first discrete portion of electrode material of the two discrete portions of electrode material and a second discrete portion of electrode material of the two discrete portions of electrode material to form a first electrode and a second electrode.

10. A method, comprising:
rotating a current collector material around a plurality of pallets disposed around an outside edge of a rotating drum, the rotating drum including a plate cam, the plurality of pallets including a first pallet and a second pallet coupled to the plate cam;
drawing a vacuum on the current collector material from within the rotating drum to draw a portion of the current collector material into a gap between the first pallet and the second pallet;
moving the first pallet relative to the second pallet, such that the first pallet and the second pallet pinch the portion of the current collector between an edge of the first pallet and an edge of the second pallet;
dispensing a semi-solid electrode material onto the first pallet and the second pallet; and
separating the edge of the first pallet from the edge of the second pallet to form two discrete portions of electrode material such that the portion of the current collector material is removed from between the first pallet and the second pallet, the portion not coated with the electrode material.

11. The method of claim 10, wherein the current collector material osculates about 90 degrees to about 180 degrees of the rotating drum.

12. The method of claim 10, further comprising:
laser cutting a portion of the current collector material between the first discrete portion of electrode material and the second discrete portion of electrode material to form a first electrode and a second electrode.

13. The method of claim 10, wherein a film is disposed between the current collector material and the outside edge of the rotating drum.

14. The method of claim 10, wherein the first pallet and/or the second pallet include a deformable member to increase friction between the first pallet and the second pallet.

15. The method of claim 14, wherein the deformable member includes an O-ring.

16. The method of claim 10, wherein the dispensing is approximately horizontal and in a direction tangential to the movement of the current collector material.

17. The method of claim 10, wherein the dispensing is approximately vertical and in a direction tangential to the movement of the current collector material.

* * * * *